US008197726B2

(12) United States Patent
Hashimoto et al.

(10) Patent No.: US 8,197,726 B2

(45) Date of Patent: Jun. 12, 2012

(54) CELLULOSE ACYLATE FILM AND METHOD FOR PRODUCING SAME

(75) Inventors: Kiyokazu Hashimoto, Minami-ashigara (JP); Zemin Shi, Minami-ashigara (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 1000 days.

(21) Appl. No.: 11/793,014

(22) PCT Filed: Dec. 22, 2005

(86) PCT No.: PCT/JP2005/023590

§ 371 (c)(1), (2), (4) Date: Jun. 14, 2007

(87) PCT Pub. No.: WO2006/068221

PCT Pub. Date: Jun. 29, 2006

(65) Prior Publication Data

US 2008/0111954 A1 May 15, 2008

(30) Foreign Application Priority Data

Dec. 24, 2004 (JP) ................................ 2004-374306
May 17, 2005 (JP) ................................ 2005-144374

(51) Int. Cl.
*B29D 7/01* (2006.01)
*B29C 47/60* (2006.01)

(52) U.S. Cl. ...... 264/1.34; 264/1.6; 264/2.7; 264/210.1; 264/211.23; 264/288.4; 264/290.2; 428/1.1; 428/1.31; 428/1.6

(58) Field of Classification Search ........................ None
See application file for complete search history.

(56) References Cited

U.S. PATENT DOCUMENTS

| | | | | |
|---|---|---|---|---|
| 2,702,410 | A * | 2/1955 | Brown | 264/211.21 |
| 4,178,337 | A * | 12/1979 | Hall et al. | 264/28 |
| 4,431,598 | A * | 2/1984 | Korpman | 264/40.7 |
| 4,830,219 | A * | 5/1989 | Siemann | 222/55 |
| 4,994,223 | A * | 2/1991 | Hestehave et al. | 264/211.21 |
| 5,219,510 | A * | 6/1993 | Machell et al. | 264/210.6 |
| 5,711,807 | A * | 1/1998 | Suzuki et al. | 118/413 |
| 6,977,275 | B2 * | 12/2005 | Buchanan et al. | 524/37 |
| 2003/0072891 | A1 * | 4/2003 | Murakami et al. | 427/569 |

(Continued)

FOREIGN PATENT DOCUMENTS

JP 11-302388 A 11/1999

(Continued)

OTHER PUBLICATIONS

Giles et al., The Definitive Processing Guide and Handbook, pp. 13-22, William Andrew Publishing, 2005.*

(Continued)

*Primary Examiner* — Jeffrey Wollschlager

(74) *Attorney, Agent, or Firm* — Buchanan Ingersoll & Rooney PC

(57) ABSTRACT

A cellulose acylate film in which the number of V-shaped thickness-uneven portions having a variation width in the thickness direction of 0.1 to 10% of a film thickness and a width in the in-plane direction of 1 to 20 mm is in the range of 0 to 10 per 100 m in the length direction of the film. A display unevenness is solved in a liquid crystal display device having the cellulose acylate film.

9 Claims, 1 Drawing Sheet

U.S. PATENT DOCUMENTS

2004/0174474 A1* 9/2004 Tachibana et al. .............. 349/96
2004/0212112 A1* 10/2004 Tsujimoto .................... 264/1.34

FOREIGN PATENT DOCUMENTS

JP 2000-344904 A 12/2000
JP 2000-352620 A 12/2000
JP 2002-210767 A 7/2002
JP 2003-226761 A 8/2003
JP 2003-236915 A 8/2003

OTHER PUBLICATIONS

Rosato, Extruding Plastics—A Practical Processing Handbook, pp. 93-98, Springer-Verlag, 1998.*

International Search Report of JP2005/023590 (Apr. 2005).

Form PCT/IB/338 [(Notification of Transmittal of Translation of the IPRP (Chapter I or Chapter II of the PCT)] and Form PCT/IB/373 (International Preliminary Report on Patentability) mailed Jul. 5, 2007, in corresponding International Patent Application No. PCT/JP2005/023590, with attached Form PCT/ISA/237 (Translation of Written Opinion), IB of WIPO, Geneva, CH.

Official Action dated Feb. 22, 2011, issued in corresponding Japanese Patent Application No. 2005-144374, and English language translation of the Official Action.

* cited by examiner

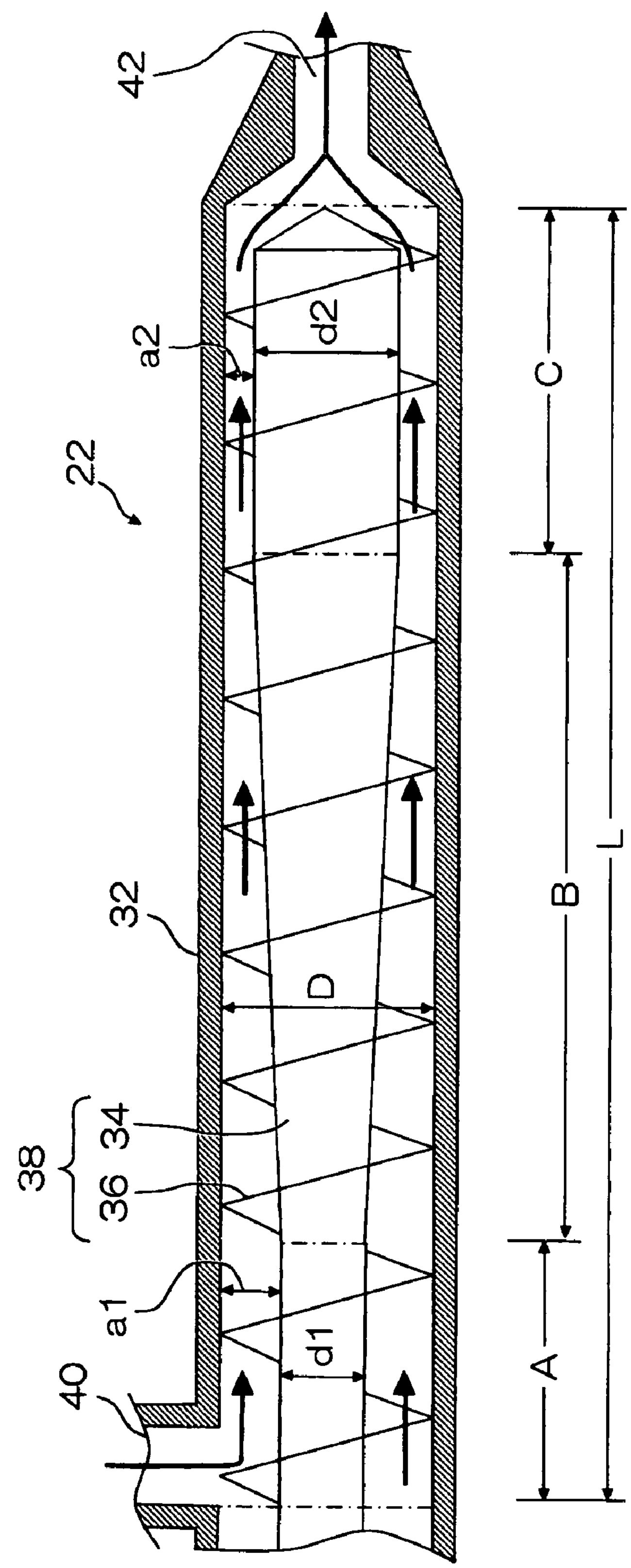
42
22
a2
d2
C
B
L
32
D
38
34
36
a1
d1
A
40

CELLULOSE ACYLATE FILM AND METHOD FOR PRODUCING SAME

TECHNICAL FIELD

The present invention relates to a cellulose acylate film having an excellent surface state and a method for producing the cellulose acylate film, and more particularly, to a cellulose acylate film creating a less display unevenness at the time of attaching the cellulose acylate film to a liquid crystal display device and a method for producing the cellulose acylate film.

BACKGROUND ART

Heretofore, in producing cellulose acylate films for use in liquid-crystal image display devices, a solution-casting method has been principally carried out, which comprises dissolving cellulose acylate in a chlorine-containing organic solvent such as dichloromethane, casting it on a substrate, and drying it to form a film. Dichloromethane, a type of a chlorine-containing organic solvent has been favorably used as a solvent for cellulose acylate, since it is a good solvent for cellulose acylate and has a low boiling point (about 40° C.), therefore having the advantage of easy vaporization in a film formation step and in a drying step.

Recently, however, from the viewpoint of environmental protection, it has become strongly required to retard release of chlorine-containing organic solvent and other organic solvents. Accordingly, some countermeasures have heretofore been tried and employed for retarding the release of organic solvent as much as possible, for example, by using a more severely-controlled closed system enough to prevent the leakage of organic solvent from it, or by leading the organic solvent, if any, leaked out from a system into a gas absorption column to adsorb it before the organic solvent is released in outdoor air, or by burning the organic solvent with flames, or by decomposing it with electron beams. Even by these countermeasures, however, it is still impossible to completely prevent the release of organic solvent, and further improvements are required.

Accordingly, as a film forming method of cellulose acylate not using a chlorine-based organic solvent, a method of producing a film by forming a film out of a solution using a dope in which cellulose acylate is dissolved in a non-chlorine-based organic solvent containing alcohol having 1 to 4 carbons has been disclosed (see Patent Document 1). According to the method, at least the non-emission of the chlorine-based organic solvent can be accomplished.

A melt-casting method of producing a film of a specific cellulose acylate has been proposed as a film formation method not using an organic method (Patent Document 1). According to the method, the carbon chain of the ester group in cellulose acylate is prolonged so as to lower the melting point of the polymer for easy melt-casting film formation of the polymer. Concretely, cellulose acetate is changed into cellulose propionate or cellulose butyrate, thereby enabling melt-casting film formation of the polymer. We, the present inventors tried forming a polarizer, using a film produced according to the melt-casting film formation method described in this patent document, and tried building the polarizer in a liquid-crystal display device, but we knew formation of blurry images. Accordingly, the improvement was desired.

Patent Document 1: JP-A-2000-344904
Patent Document 2: JP-A-2000-352620

DISCLOSURE OF THE INVENTION

However, the methods described in the above-mentioned patent documents have additional technical problems to be solved.

According to the method described Patent Document 1, the non-emission of the chlorine-based organic solvent can be satisfactorily accomplished. However, since a large amount of non-chlorine-based organic solvent is used, enormous facility investment and work are required for accomplishing the non-emission of the organic solvent. The cellulose acylate film produced using the method described in Patent Document 1 has a problem in that cracks can be generated at the time of performing a punching process thereon after conservation.

The method described in Patent Document 2 has an advantage that the non-emission of the organic solvent can be easily accomplished, but has a problem in that a display unevenness occurs at the time of mounting a liquid crystal display device with a polarizing plate formed of the cellulose acylate film produced using the method. Such a problem is particularly marked at the time of mounting the polarizing plate on a large-sized liquid crystal display panel of 25 inch or more, thereby serving as an obstacle to an increase in size. The method causes a problem of easily varying a visual characteristic with a change in humidity.

In view of the above-mentioned problems, it is an object of the invention to provide a cellulose acylate film capable of solving the display unevenness occurring at the time of mounting the cellulose acylate film on a liquid crystal display device. Another object of the invention is to provide a cellulose acylate film which has an excellent processible property after conservation, as well as which is capable of solving the display unevenness. Still another object of the invention is to provide a method of efficiently producing such a cellulose acylate film.

As a result of extensive and intensive studies, the inventors found out that the above-mentioned objects could be achieved by the invention having the following configurations.

[1] A cellulose acylate film in which the number of V-shaped thickness-uneven portions having a variation width in the thickness direction that is in the range of 0.1 to 10% of a film thickness and a width in an in-plane direction that is in the range of 1 to 20 mm is in the range of 0 to 10 per 100 m in a length direction of the film.

[2] The cellulose acylate film according to [1], which comprises a remaining solvent in an amount of 0.01% by mass or less.

[3] The cellulose acylate film according to [1] or [2], wherein the cellulose acylate film satisfies Formulae (1) to (3):

$$2.6 \leqq X+Y \leqq 3.0; \quad \text{Formula (1)}$$

$$0 \leqq X \leqq 2.8; \text{ and} \quad \text{Formula (2)}$$

$$0.3 \leqq Y \leqq 3 \quad \text{Formula (3)}$$

where X represents a substitution degree for an acetyl group and Y represents the sum of the substitution degrees for a propionyl group, a butyryl group, a pentanoyl group and a hexanoyl group.

[4] A method for producing the cellulose acylate film according to [3], which comprises forming a film by a melt-casting with use of a melt extruder having a screw in which a portion corresponding to 5 to 34% of the entire length of the screw from the most upstream end of the screw is cooled to a temperature of Tg or less of the cellulose acylate and the ratio of the length of a feed zone to the length of a compression zone is in the range of 1.2:1 to 10:1.

[5] The method according to [4], wherein the film is formed under the condition that the ratio of the maximum value and the minimum value in storage modulus (G') of the molten cellulose acylate in the melt extruder is in the range of 3:1 to 100:1 and the minimum value thereof is in the range of 1,000 Pa to 80,000 Pa.

[6] The method according to [4] or [5], wherein the film is formed under the condition that the ratio of the maximum value and the minimum value in loss modulus (G") of the molten cellulose acylate in the melt extruder is in the range of 1.1:1 to 50:1 and the maximum value thereof is in the range of 1,000 Pa to 100,000 Pa.

[7] The method according to any one of [4] to [6], wherein the film is formed under the condition that the ratio of the maximum value and the minimum value in tan δ (G"/G') of the molten cellulose acylate in the melt extruder is in the range of 1.5:1 to 12:1 and the maximum value thereof is in the range of 0.1 to 6.

[8] The method according to any one of [4] to [7], wherein the film is formed under the condition that the ratio of the maximum value and the minimum value in viscosity (η) of the molten cellulose acylate in the melt extruder is in the range of 1.2:1 to 30:1 and the maximum value thereof is in the range of 1,000 Pa·s to 23,000 Pa·s.

[9] The method according to any one of [4] to [8], further comprising stretching the film in at least one direction by 1% to 300% after forming the film.

[10] A cellulose acylate film which is obtained by stretching the cellulose acylate film according to any one of [1] to [3] in at least one direction by 1 to 300%.

[11] The cellulose acylate film according to any one of [1] to [3] and [10], which is formed by a melt-casting with use of a melt comprising 1% to 20% by mass of a compound having two or more aromatic rings and a molecular weight of 100 to 3,000.

[12] The cellulose acylate film according to any one of [1] to [3], [10] and [11], wherein the cellulose acylate film satisfies Formulae (1a) to (1c):

$$Re \leqq Rth; \quad \text{Formula (1a)}$$

$$0 \leqq Re \leqq 200; \text{ and} \quad \text{Formula (1b)}$$

$$0 \leqq Rth \leqq 500. \quad \text{Formula (1c)}$$

[13] A polarizing plate in which at least one layer of the cellulose acylate film according to any one of [1] to [3] and [10] to [12] is laminated on a polarizing film.

[14] An optical compensatory film for a liquid crystal display device comprising the cellulose acylate film according to any one of [1] to [3] and [10] to [12] as a substrate.

[15] An anti-reflection film comprising the cellulose acylate film according to any one of [1] to [3] and [10] to [12] as a substrate.

[16] A liquid crystal display device comprising the cellulose acylate film according to any one of [1] to [3] and [10] to [12].

By manufacturing a liquid crystal display device using the cellulose acylate film according to the invention, it is possible to solve the display unevenness. Since the cellulose acylate film according to the invention has an excellent processible property after conservation, cracks or the like can be hardly generated even at the time of performing a punching process thereon after the conservation. In addition, it is possible to efficiently produce the cellulose acylate film by the use of the producing method according to the invention.

BEST MODE FOR CARRYING OUT THE INVENTION

The cellulose acylate grains, the cellulose acylate film, and their production methods and their applications are described in detail hereinunder. The description of the constitutive elements of the invention given hereinunder may be for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

<Method of Suppressing V-Shaped Streaks from Being Generated on Cellulose Acylate Film>

When a cellulose acylate film produced by a known solution-film formation method is mounted on a liquid crystal display device, a display unevenness is generated. The display unevenness is observed as V-shaped streaks having a width of 1 to 20 mm in a direction. The inventor has found out that the display unevenness is generated due to the V-shaped streaks existing on the surface of the cellulose acylate film. A V-streak is a V-shaped thickness unevenness crossing the film surface over a whole width of the film when being observed, and the variation width thereof in a thickness direction is in the range of 0.1 to 10% of a film thickness, and the in-plane width thereof is in the range of 1 to 20 mm. The angle of V is in the range of 5 to 150°. In addition, the depth of V (a distance between the straight line connecting both ends of V and the vertex of V) is in the range of 5 to 100% of a distance between both ends (film width) of V. The number of V-shaped streaks may be one or plural. When 3 or more of V-shaped streaks are observed, the vertexes of Vs are arranged in a straight line.

The inventor has carried out studies about a cause of such V-shaped streak generation on a cellulose acylate film, and found out the following fact.

A cellulose acylate film is produced in such a manner that a melt (molten cellulose acylate) led from a melt extruder to a die passes through a slit of the front edge of the die and is extruded onto a casting drum. At this time, it was proven out that a streak (irregularity) crossing the film surface over a whole width of the film is generated since a pulsation (unevenness of an extruded amount) is generated in the melt extruder and the pulsation moves the melt extruded from the slit of the front edge of the die onto the casting drum. The streak has a straight line shape when the pulsations simultaneously reach the slit of the front end of the die. However, since the front end of the die is wider than an entrance, the pulsations rapidly reach the center of the slit which is shorter from the entrance than both ends of the slit. As a result, an irregularity is formed from the center of the film, and extended in an oblique direction toward the both ends while a drum is rotated. Therefore, a V-shaped streak having a point corresponding to the die center as a vertex of V is formed.

The generation of V-shaped streak is a unique problem generated when a cellulose acylate resin is used to produce a film. That is, the cause of the above-mentioned problem is that a melt viscosity of cellulose acylate greatly varies with a temperature. The invention is to provide a cellulose acylate film having a small number of V-shaped streaks by suppressing a pulsation of melt in consideration of the characteristic of cellulose acylate. The cellulose acylate film according to the invention has V-shaped streaks in the range of 0 to 10 streaks/100 m, preferably in the range of 0 to 8 streaks/100 m, and more preferably in the range of 0 to 5 streaks/100 m.

When the cellulose acylate film according to the invention has V-shaped streaks in the range of 0 to 10 streaks/100 m, the detailed producing condition thereof is not particularly limited. However, the cellulose acylate film according to the invention can be preferably produced when the following condition is employed. Particularly, the following method of (2) is preferably employed.

(1) Temperature Control in Inlet of Extruder

The above-described cellulose acylate resin is melt-extruded using, for example, a melt extruder 22 having a screw as shown in FIG. 1. In general, the cellulose acylate resin, as pellets, supplied into a cylinder 32 through a supply hole 40 of a hopper, and led to a screw 38 in a direction of arrows. The interior of the cylinder 32 is configured with a feed zone (section A) for quantitatively transporting the cellulose acylate resin supplied from a supply hole, a compression zone (section B) for melting, kneading and compressing the cellulose acylate resin, and a metering zone (section C) for measuring the molten, kneaded and compressed cellulose acylate resin, in an order from the supply hole 40.

In FIG. 1, when the heated screw 38 contacts with the pellets, the exterior of pellets is immediately heated, but the interior of pellets has a low temperature due to delay of thermal conduction. Since the melt viscosity of cellulose acylate greatly varies with a temperature, the exterior of pellets becomes a liquid state, but the interior thereof exists in a solidlike state due to the high viscosity. As a result, the molten resin of the exterior of pellets serves as glue and adheres to the screw, while the interior of pellets is a hard solid, and thus the pellets block the interior of extruder to obstruct the supply of the pellets from the hopper. However, when a heat is applied to the interior of the pellets blocking the interior of extruder as time passes, the cellulose acylate resin starts to move and the supply of the pellet from the hopper starts again. The resin supply pulsation, resulting from the repetition of the above-mentioned process, becomes a cause to generate V-shaped streaks on a cellulose acylate film.

Accordingly, a screw upstream portion (inlet side) is cooled to a temperature of Tg or less of the cellulose acylate, in the range of 5 to 34% of the entire length of the screw, more preferably in the range of 10 to 34%, and even more preferably in the range of 16 to 34%. In the specification, the length is referred to as a cooling length as well. The pellets are prevented from adhering to the screw by the cooling, thereby solving the blocking of the pellets in the inlet of the extruder. The temperature control for the screw upstream portion can be performed by allowing the interior of screw to have a hollow and using refrigerant introducing means for introducing a refrigerant (solution such as water or air) of which the temperature is adjusted to the hollow portion.

(2) Design Adjustment for Each Section of Extruder

A partial difference in viscosity is easily generated in accordance with a small difference in temperature in the interior of extruder. As a result, a partial high-viscosity area is formed in the interior of extruder due to a small temperature unevenness, and thus the move of a melt is obstructed. Therefore, an unevenness is generated in an extruded amount of melt, thus it becomes a cause to generate V-shaped streaks on a cellulose acylate film.

Accordingly, a ratio (A/B) of the feed zone length and the compression zone length is preferably in the range of 1.2 to 10, more preferably in the range of 1.5 to 8, and even more preferably in the range of 1.8 to 6. As shown in FIG. 1, the melt extruder 22 generally is configured with three sections including the feed zone A in which the screw diameter is constant, the compression zone B in which the screw diameter is increased, and the metering zone C in which the screw diameter is constant again. Here, the "constant" means that the variation in diameter is 10% or less of the average diameter value. A normal ratio of a feed zone length and a compression zone length of a screw is in the range of 0.5:1 to 1:1 in order to lengthen the compression zone melting a pellet as much as possible. However, when the ratio of the feed zone length and the compression zone length is adjusted in the above-mentioned ranges, the melt can be rapidly compressed even if a partial concentration unevenness caused by the above-described variation in temperature is generated. Accordingly, since the melt can force to be extruded, a variation in an extruded amount thereof can be controlled.

For the extruder used in the invention, the compression ratio of the compression zone is preferably in the range of 2 to 15, more preferably in the range of 3 to 12, and even more preferably in the range of 4 to 10. The term here "compression ratio of compression zone" is (depth of groove of screw in feed zone)/(depth of groove of screw in compression zone). In addition, a ratio (C/B) of a metering zone length to a compression zone length is preferably in the range of 0.5 to 10, more preferably in the range of 1 to 5, and even more preferably in the range of 1.4 to 3.5.

(3) Controlling of Viscoelasticity of Molten Cellulose Acylate in Melt Extruder

In the invention, it is preferable that a gradient is given to a viscoelasticity of molten cellulose acylate in the melt extruder. As a result, the melt is more hardened from the inlet side to the outlet side, a force extruded from the inlet toward the outlet becomes strong, and thus the melt is smoothly moved in the extruder thereby suppressing the generation of V-shaped streaks. The viscoelasticity of molten cellulose acylate in the melt extruder can be preferably adjusted by controlling a storage modulus (G'), a loss modulus (G"), tan δ, and a viscosity (η) as follows.

A ratio of the maximum value and the minimum value of a storage modulus (G') of molten cellulose acylate in the melt extruder is preferably in the range of 2:1 to 500:1, more preferably in the range of 4:1 to 100:1, and even more preferably in the range of 6:1 to 50:1. The minimum value of G' is preferably in the range of 100 to 50000 Pa, more preferably in the range of 500 to 30000 Pa, and even more preferably in the range of 1000 to 10000 Pa. In the invention, it is preferable to increase G' of the melt extruder inlet side.

A ratio of the maximum value and the minimum value of a loss modulus (G") of molten cellulose acylate in the melt extruder is preferably in the range of 3:1 to 100:1, more preferably in the range of 4:1 to 80:1, and even more preferably in the range of 5:1 to 50:1. The minimum value of G' is preferably in the range of 1000 to 80000 Pa, more preferably in the range of 2000 to 40000 Pa, and even more preferably in the range of 5000 to 20000 Pa. In the invention, it is preferable to increase G" of the melt extruder inlet side.

A ratio of the maximum value and the minimum value of tan δ (G"/G') of molten cellulose acylate in the melt extruder is preferably in the range of 1.5:1 to 12:1, more preferably in the range of 2:1 to 10:1, and even more preferably in the range of 2.5:1 to 5:1. The maximum value of tan δ is preferably in the range of 0.5 to 6, more preferably in the range of 1 to 5, and even more preferably in the range of 1.2 to 4. In the invention, it is preferable to increase tan δ of molten cellulose acylate of the melt extruder outlet side. The maximum value and the minimum value of tan δ is obtained by measuring G' and G" at each temperature and selecting the maximum value and the minimum value among the obtained values of tan δ at each temperature. That is, the maximum value and the minimum value of tan δ is not obtained from the maximum value of G" and the minimum value of G' and the maximum value of G' and the minimum value of G".

A ratio of the maximum value and the minimum value of a viscosity (η) of molten cellulose acylate in the melt extruder is preferably in the range of 1.2:1 to 30:1, more preferably in the range of 1.5:1 to 20:1, and even more preferably in the range of 2:1 to 12:1. The maximum value of the viscosity (η) is preferably in the range of 1000 to 23000 Pa·s, more preferably in the range of 2000 to 15000 Pa·s, and even more preferably in the range of 3000 to 10000 Pa·s. In the invention, it is preferable to increase η of molten cellulose acylate of the melt extruder outlet side.

The viscoelasticity and the gradient thereof of molten cellulose acylate can be obtained by applying a temperature gradient to a barrel including the screw of the melt extruder. At this time, it is preferable to increase a temperature of the outlet side than a temperature of the inlet side. A melting temperature is preferably in the range of 170 to 250° C., more preferably in the range of 175 to 240° C., and even more preferably in the range of 180 to 230° C., and the temperature of the outlet side is higher than the temperature of the inlet side preferably by the range of 5 to 80° C., more preferably by the range of 10 to 60° C., and even more preferably by the range of 15 to 40° C. In this manner, a gradient can be applied to a melt viscoelasticity, and the number of V-shaped streaks can be greatly reduced by combining this method with the above method of (2) for synergistic effects.

(4) Addition of Low Molecular Compound

In the invention, it is preferable to mix a low molecular compound (herein, referred to as "low molecular compound according to the invention"), which has two or more of aromatic rings, a molecular weight in the range of 100 to 1000 and a melting point in the range of 55 to 250° C., with the pellets or the melt. The use amount of the low molecular compound according to the invention is preferably in the range of 1 to 20% by mass, more preferably in the range of 2 to 10% by mass, and even more preferably in the range of 3 to 8% by mass. The low molecular compound according to the invention prevents the melt from adhering to the screw, so that the melt is smoothly moved and the generation of V-shaped streaks is suppressed.

Preferable and specific examples of the low molecular compound according to the invention include a compound described in paragraph number [0016] to [0107] in JP-A-2001-166144 and a compound described in paragraph number [0007] to [0043] in JP-A-2002-296421. In addition, the following compounds in which two aromatic rings are connected by —COO— can be also preferably used as the low molecular compound according to the invention.

[Formula 1]

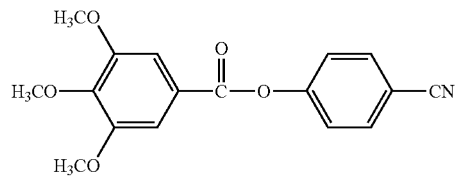

A-1

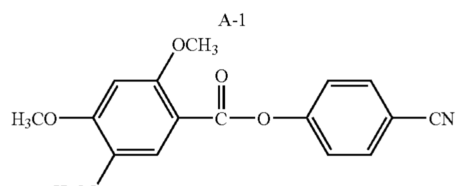

A-2

-continued

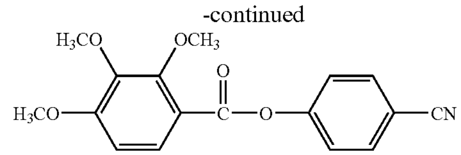

A-3

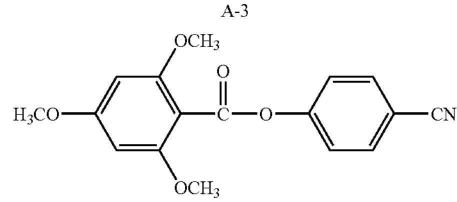

A-4

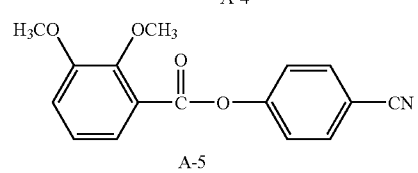

A-5

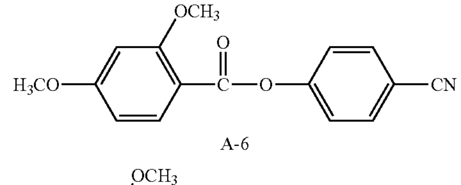

A-6

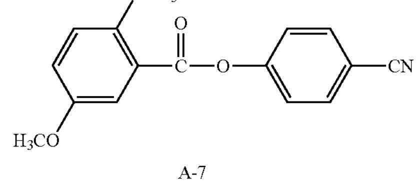

A-7

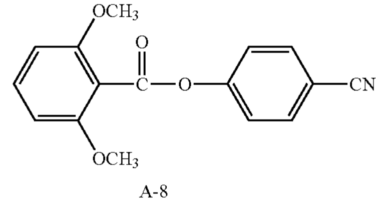

A-8

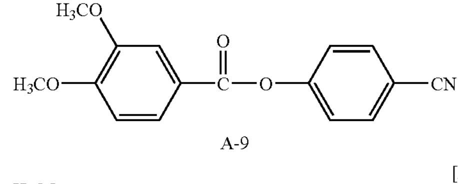

A-9

[Formula 2]

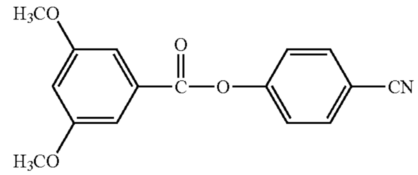

A-10

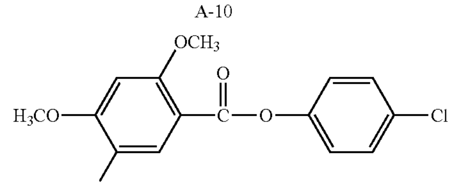

A-11

-continued
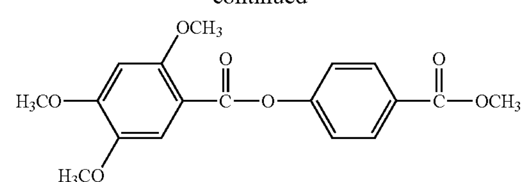
A-12
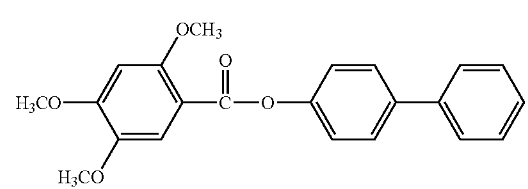
A-13
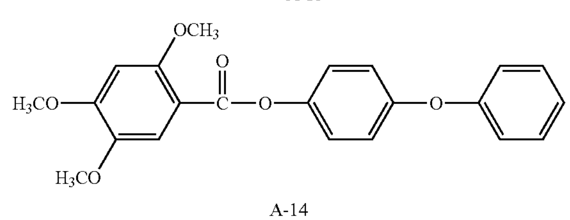
A-14
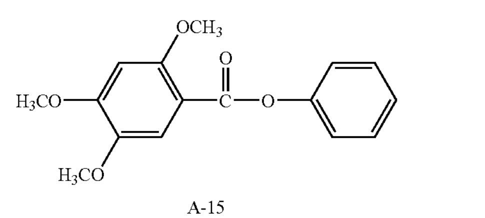
A-15
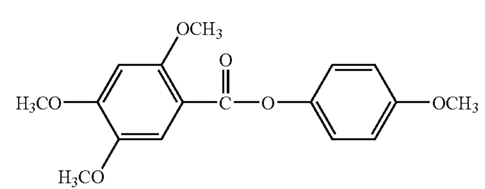
A-16
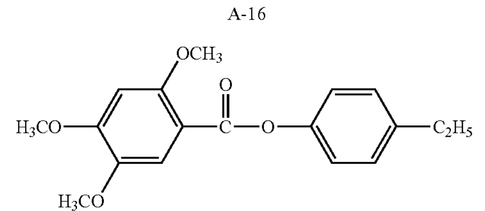
A-17
[Formula 3]
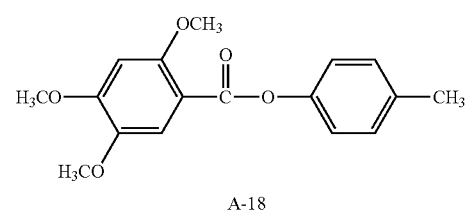
A-18
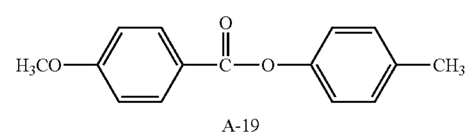
A-19
-continued
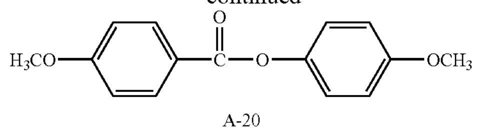
A-20
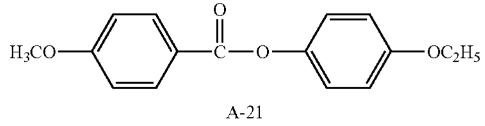
A-21
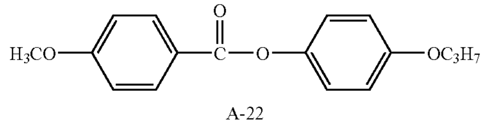
A-22
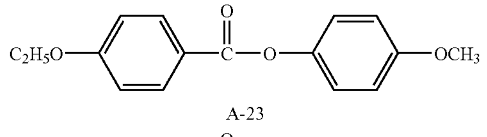
A-23
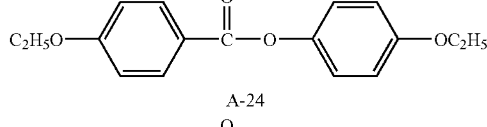
A-24
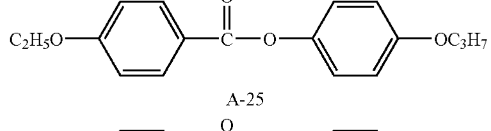
A-25
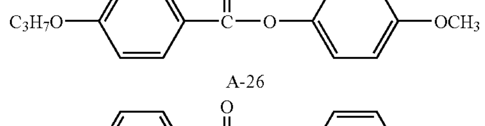
A-26
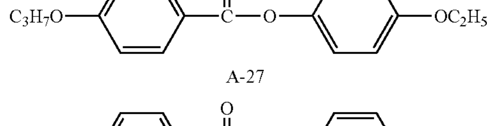
A-27
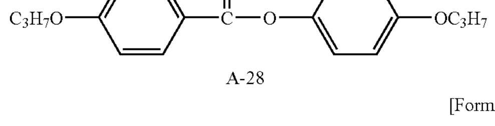
A-28
[Formula 4]
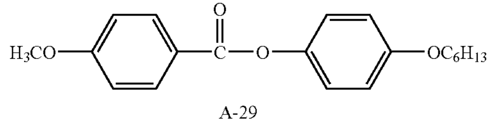
A-29
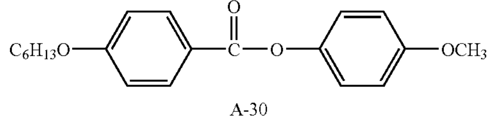
A-30
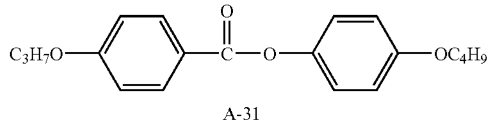
A-31
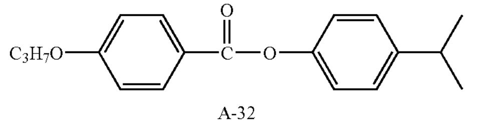
A-32

-continued
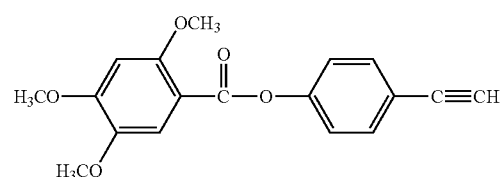
A-33
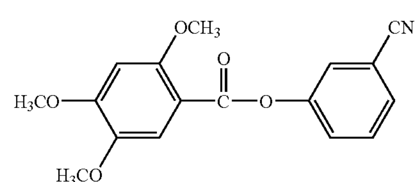
A-34
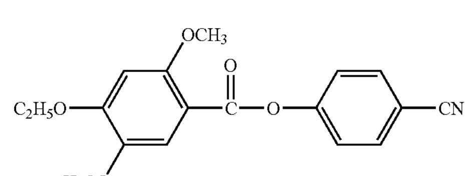
A-35
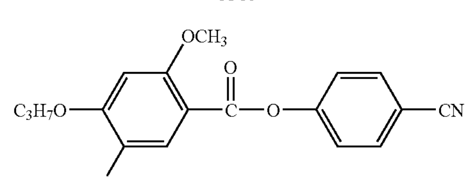
A-36
[Formula 5]
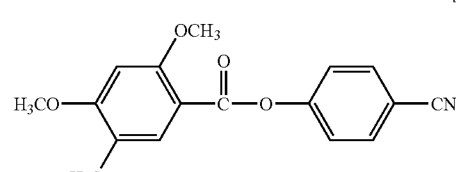
A-37
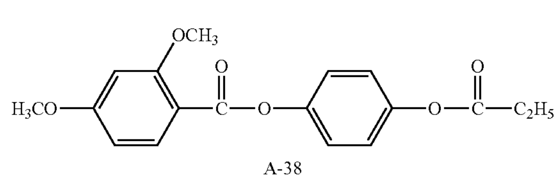
A-38
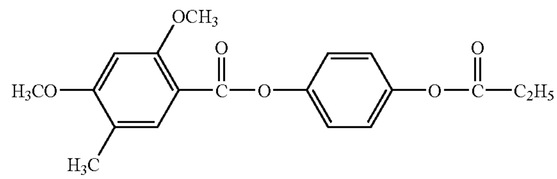
A-39
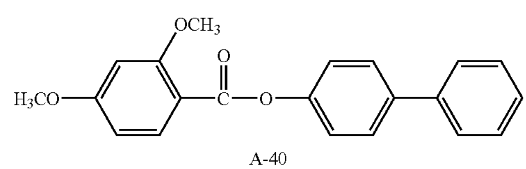
A-40
-continued
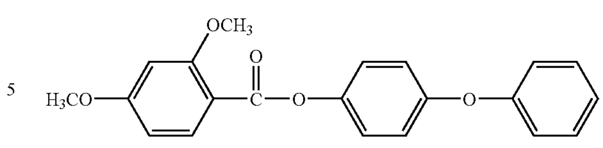
A-41
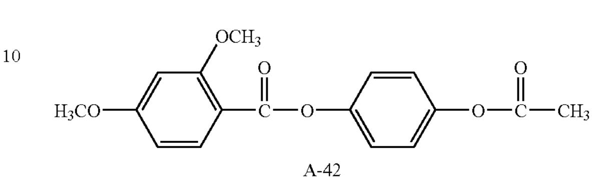
A-42
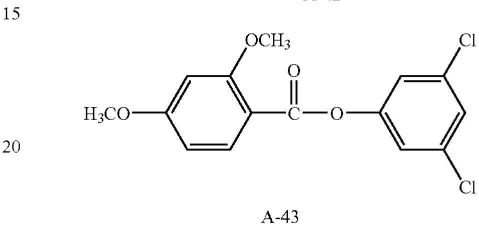
A-43
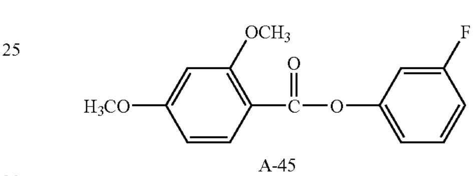
A-45
[Formula 6]
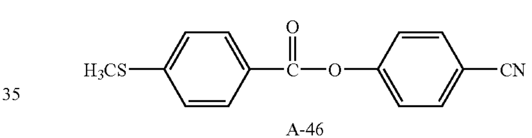
A-46
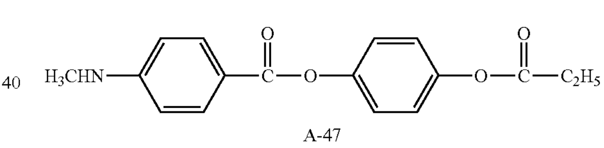
A-47
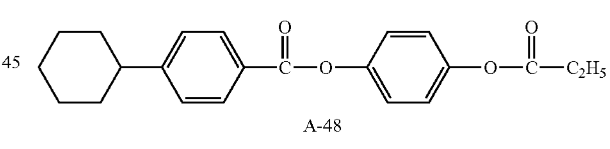
A-48
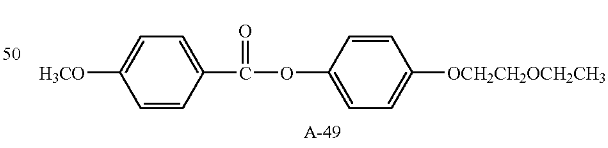
A-49
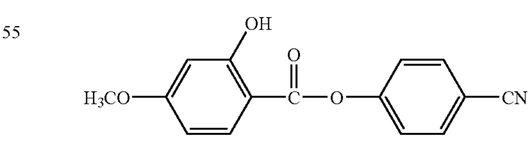
A-50
In addition, the following compounds in which three aromatic rings are connected one another by —COO— or —CONR'— can be preferably used.

[Formula 7]
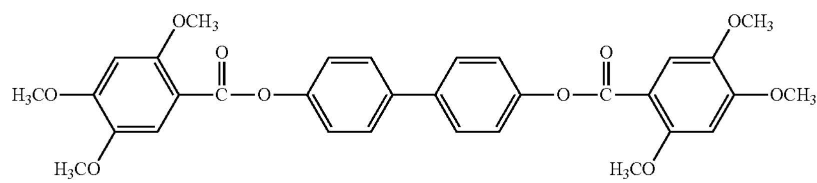
A′-1
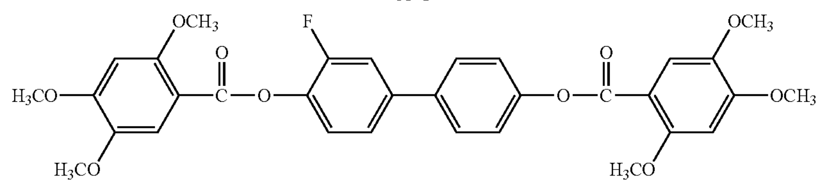
A′-2
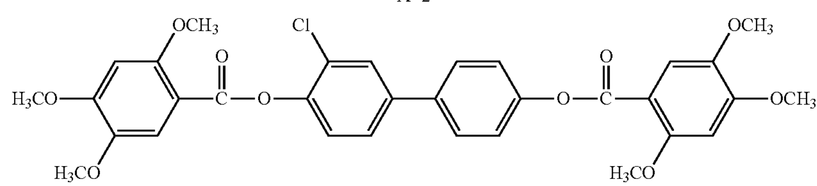
A′-3
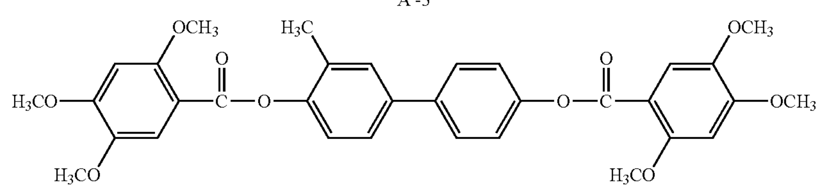
A′-4
[Formula 8]
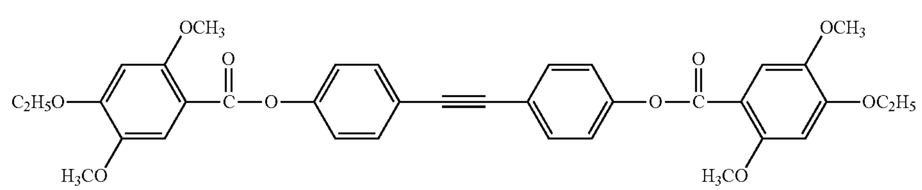
A′-5
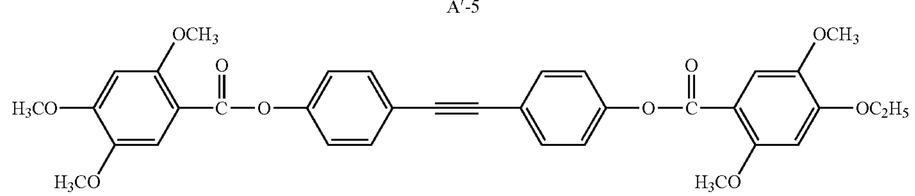
A′-6
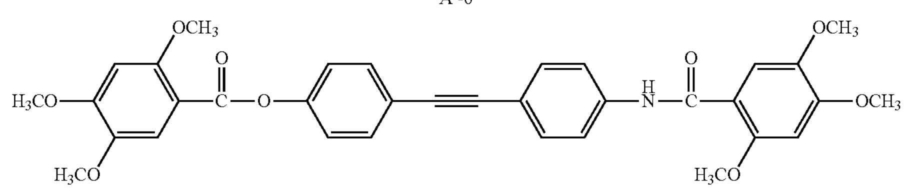
A′-7
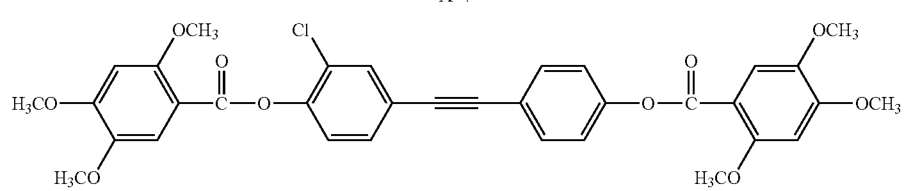
A′-8

-continued
[Formula 9]
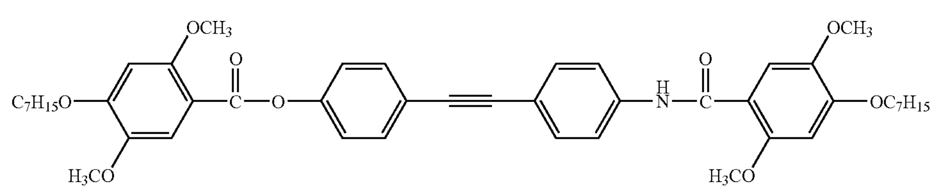
A'-9
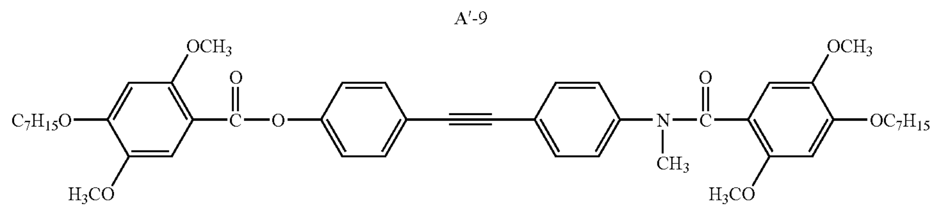
A'-10
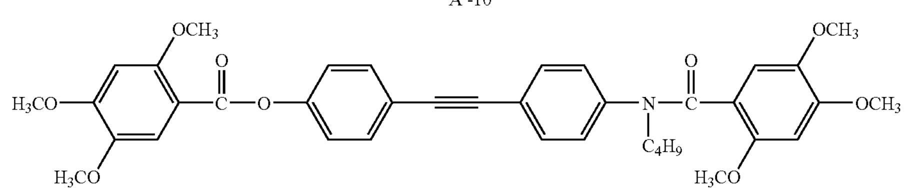
A'-11
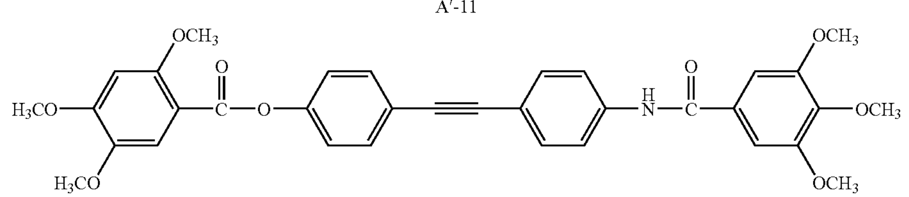
A'-12
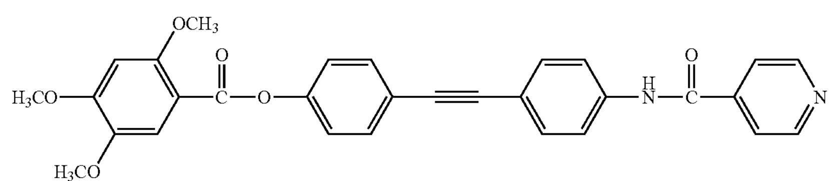
A'-13
[Formula 10]
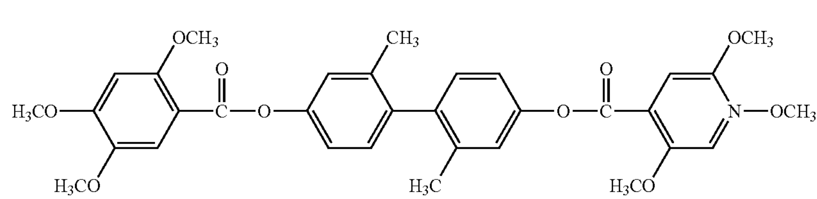
A'-14
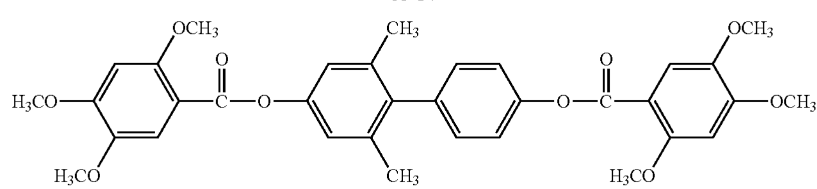
A'-15
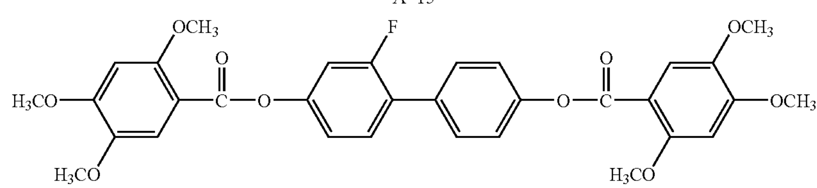
A'-16

-continued
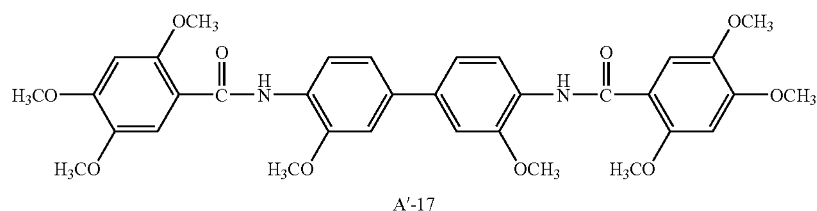
A'-17
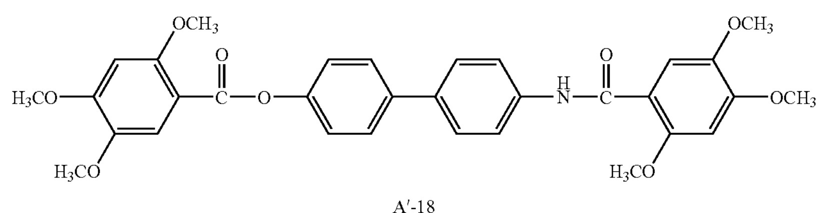
A'-18
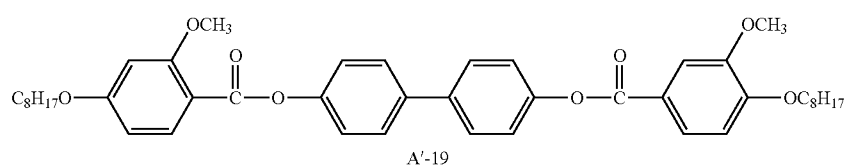
A'-19
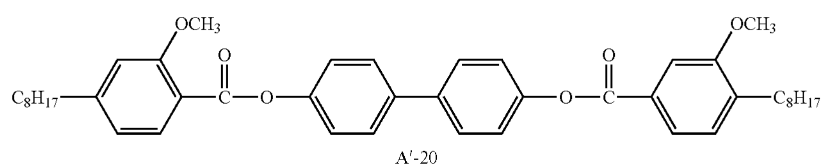
A'-20
[Formula 11]
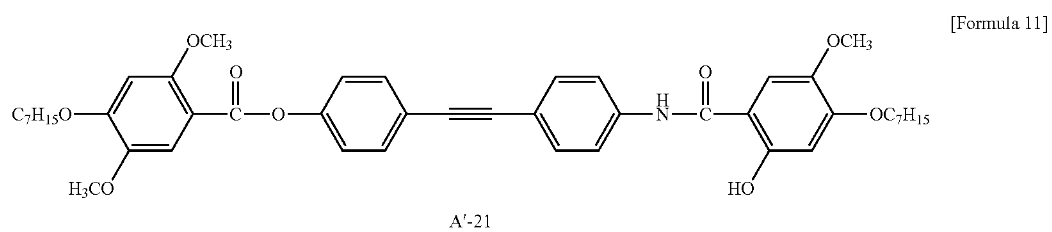
A'-21
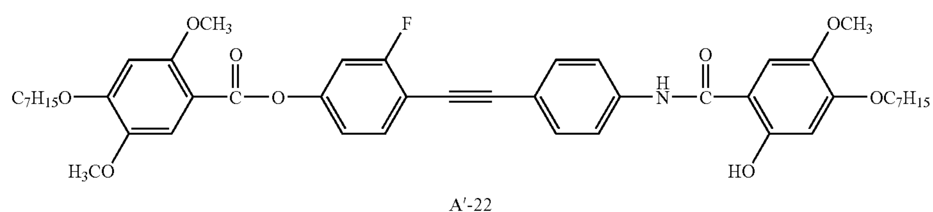
A'-22
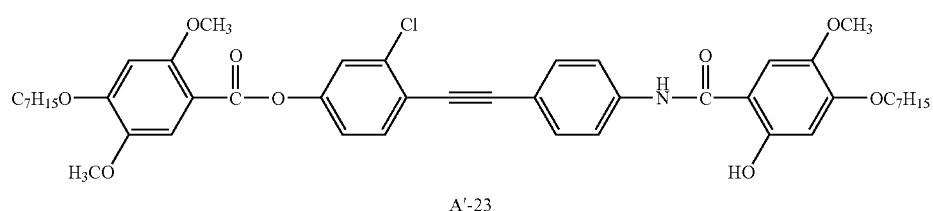
A'-23
In addition, the following compound in which a triazine derivative is substituted with three arylamino groups can be preferably used.

[Formula 12]
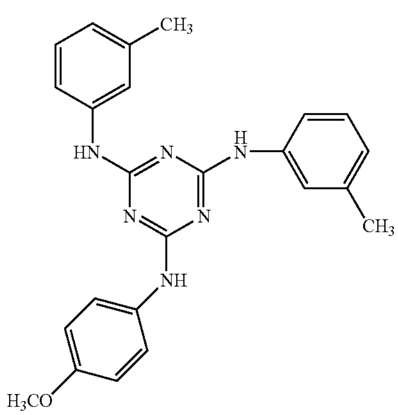
In addition, the low molecular compound according to the invention can be exemplified by the following compounds in which a plurality of aromatic rings are linearly connected one another.
[Formula 13]
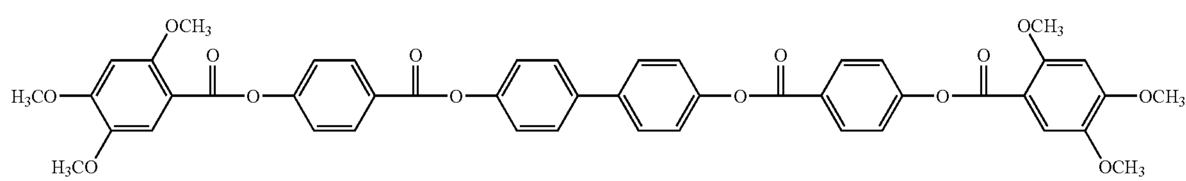
(1)
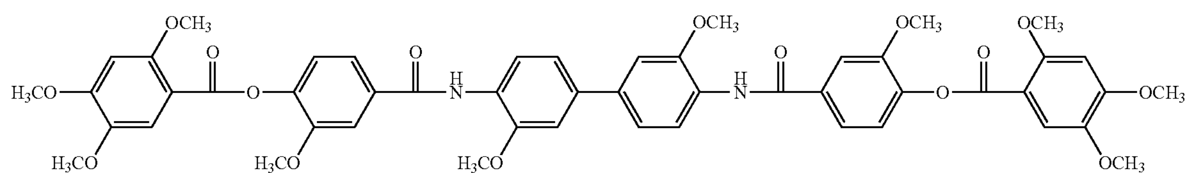
(2)
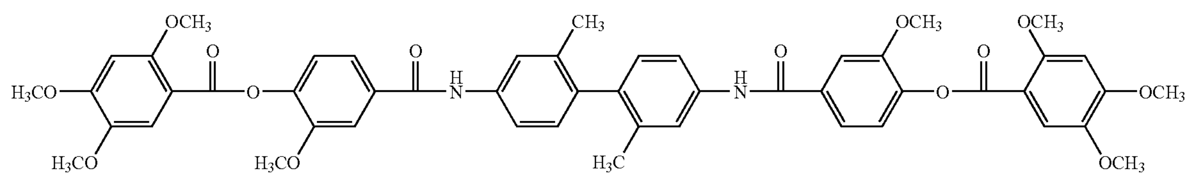
(3)
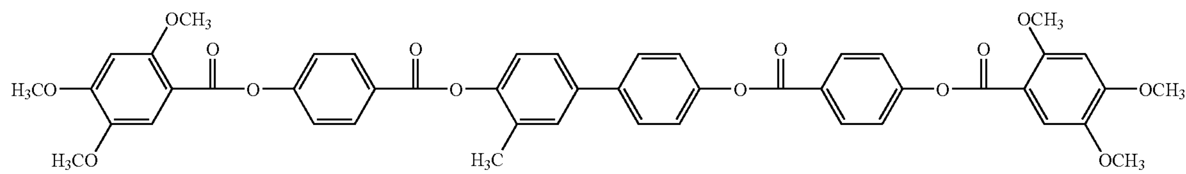
(4)
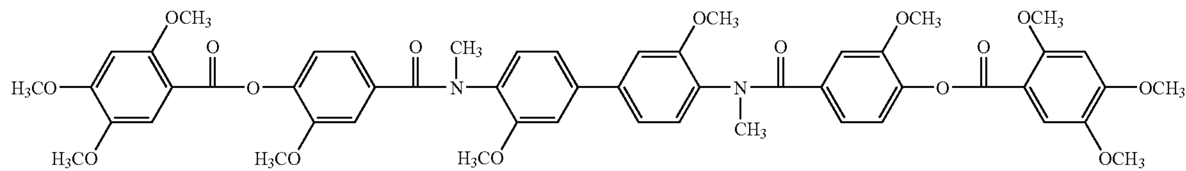
(5)

-continued
[Formula 14]
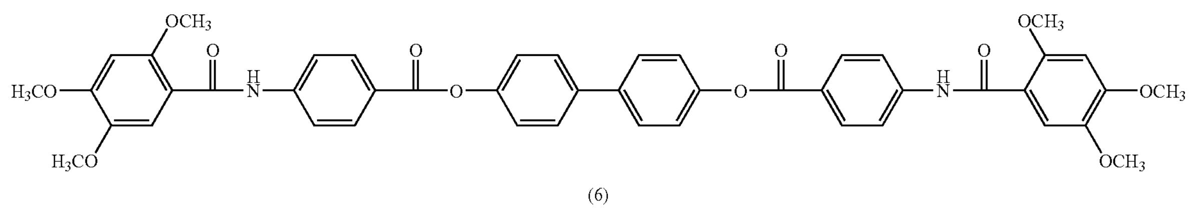
(6)
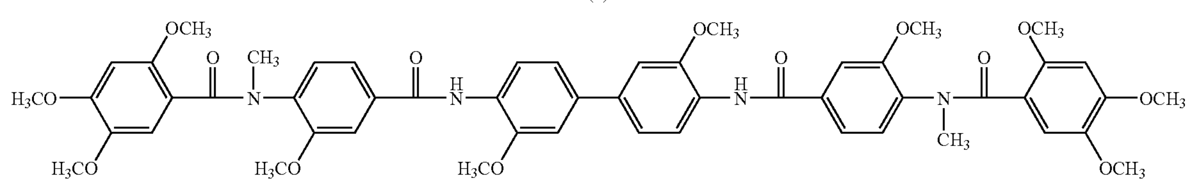
(7)
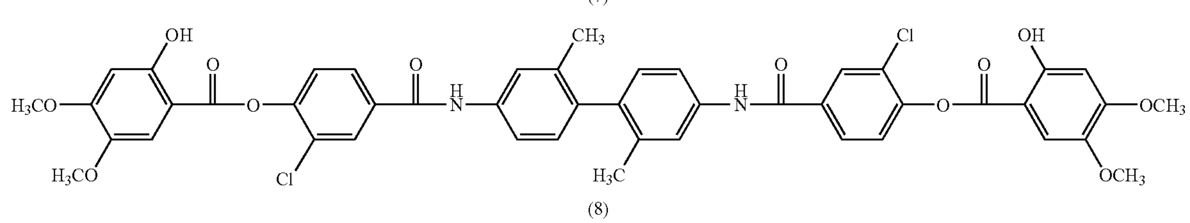
(8)
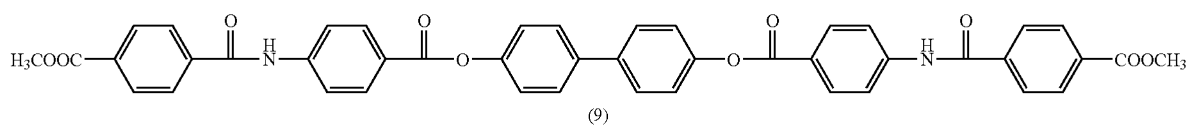
(9)
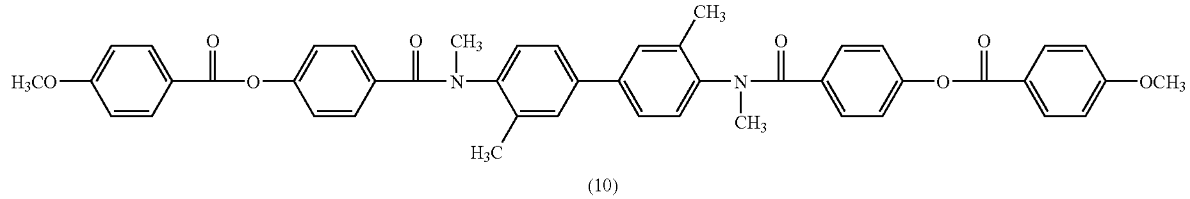
(10)
[Formula 15]
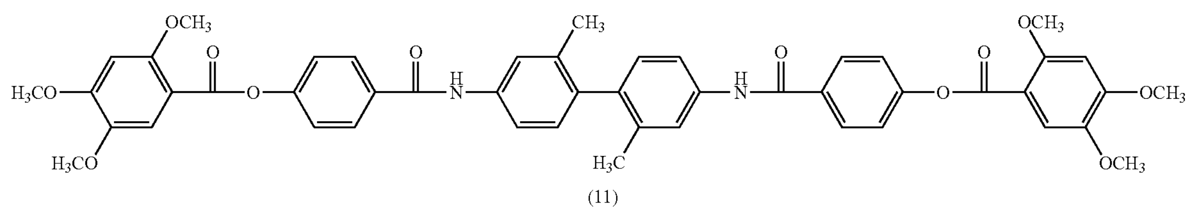
(11)
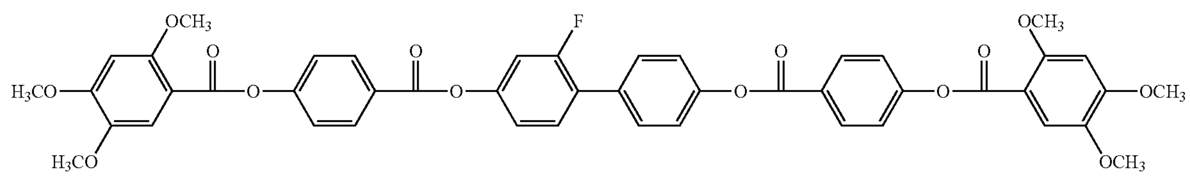
(12)
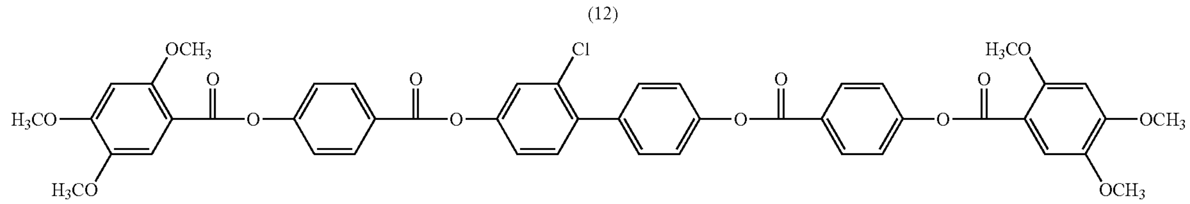
(13)

-continued
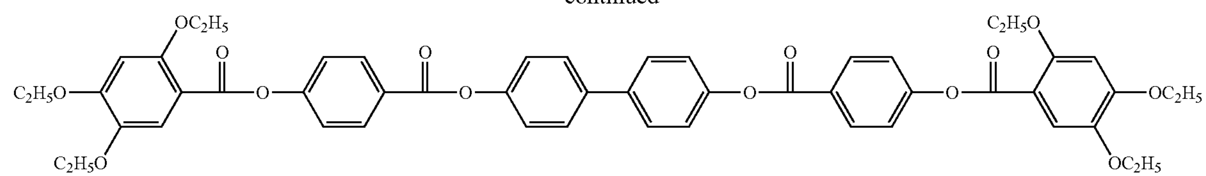
(14)
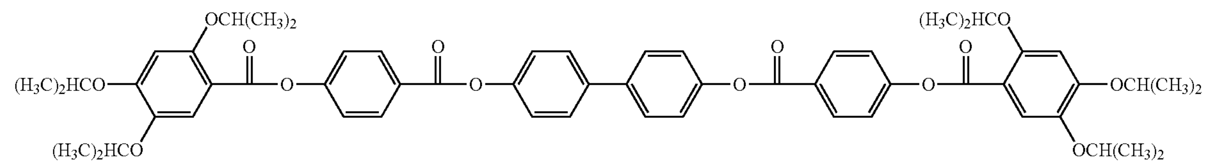
(15)
[Formula 16]
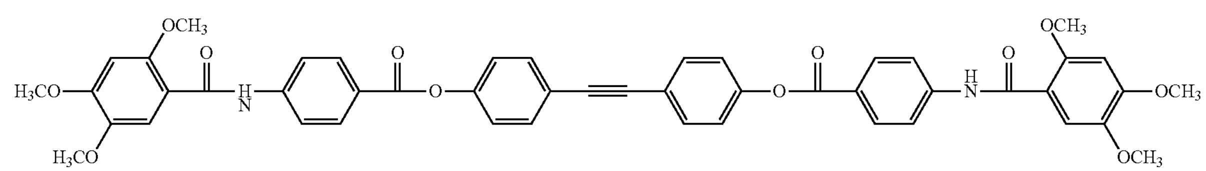
(16)
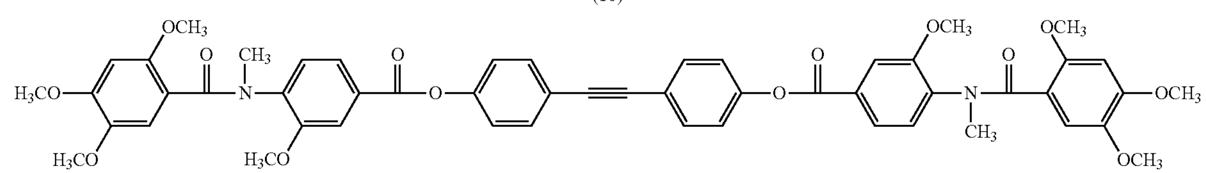
(17)
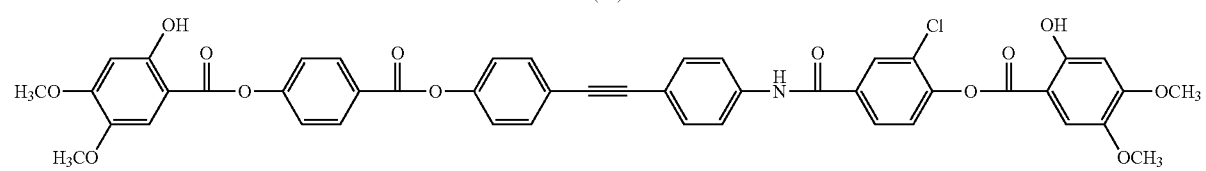
(18)
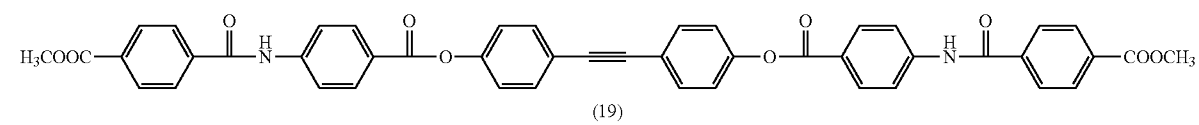
(19)
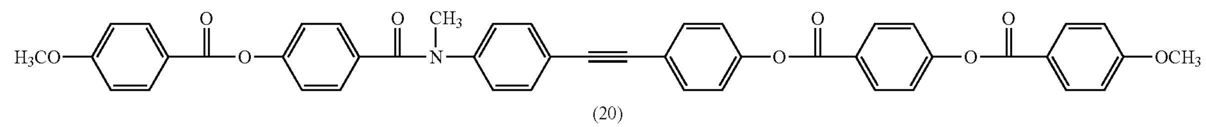
(20)
[Formula 17]
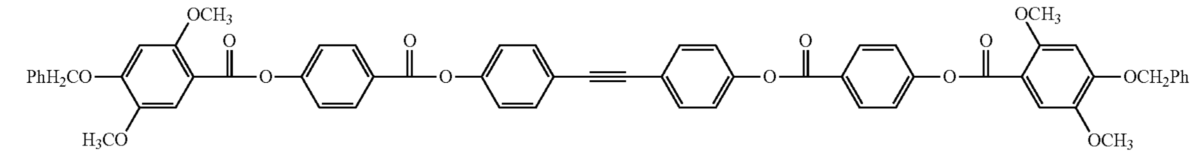
(21)
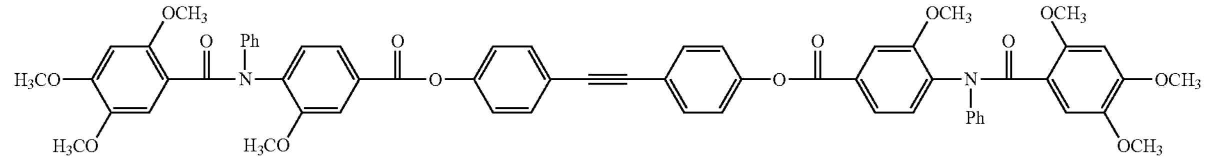
(22)

-continued
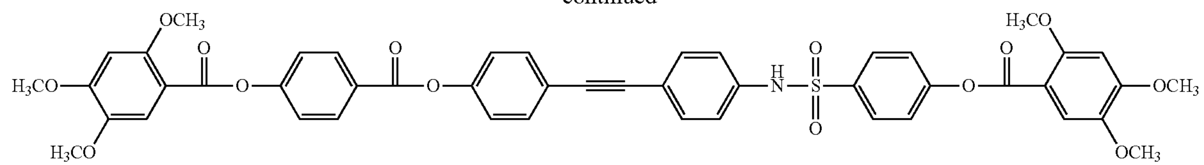
(23)
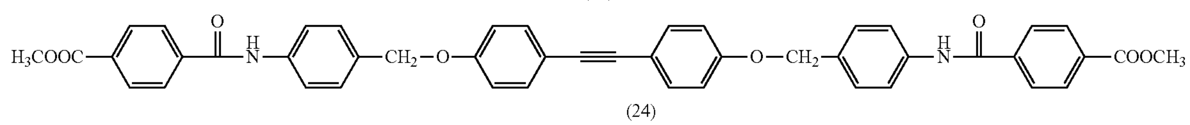
(24)
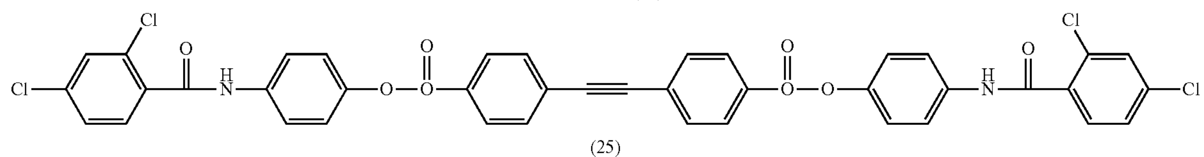
(25)
[Formula 18]
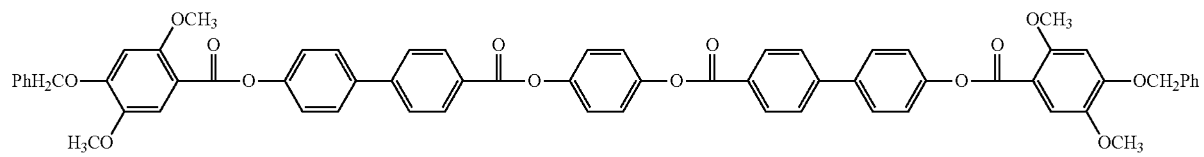
(26)
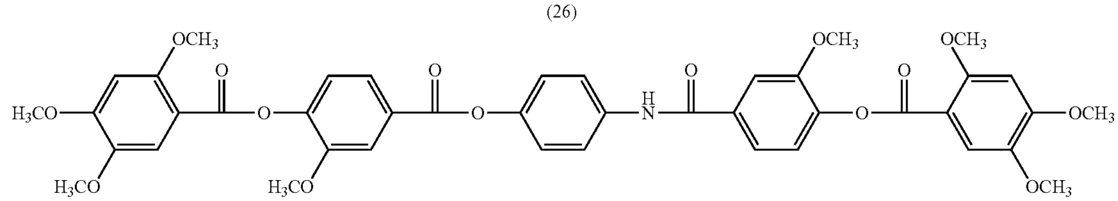
(27)
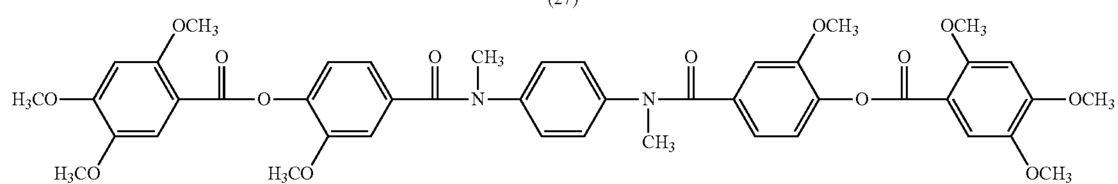
(28)
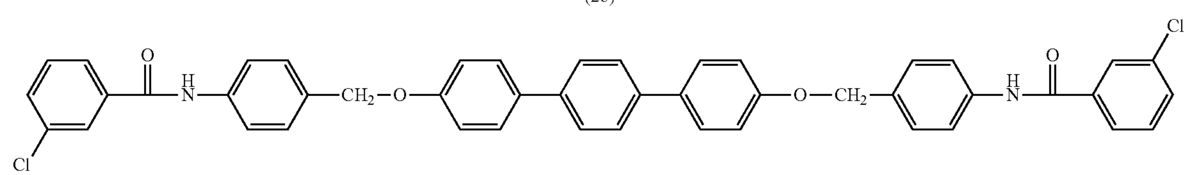
(29)
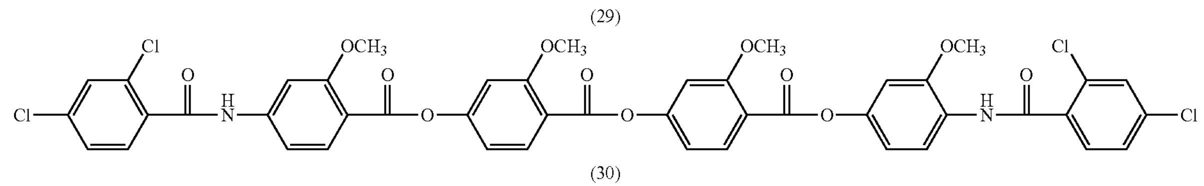
(30)
[Formula 19]
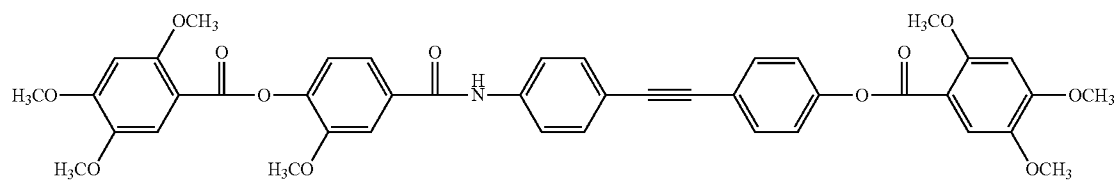
(31)

-continued
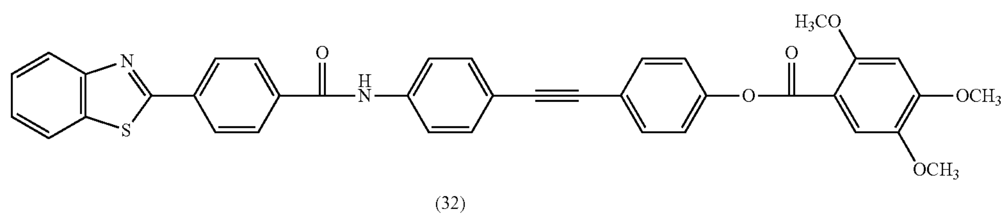
(32)
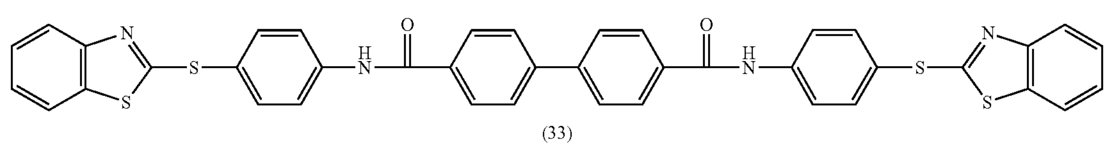
(33)
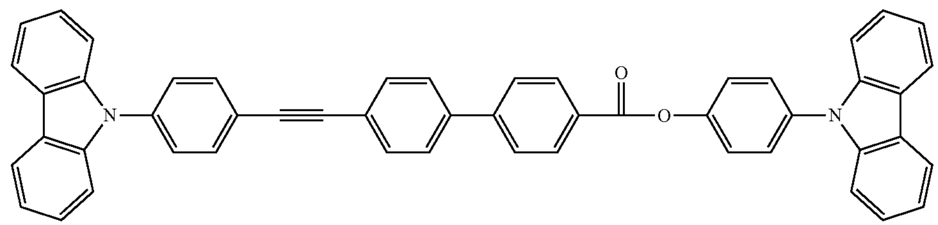
(34)
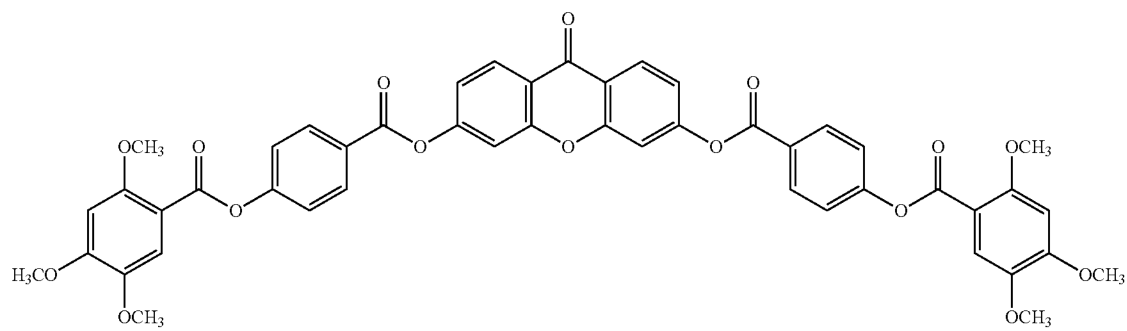
(35)
[Formula 20]
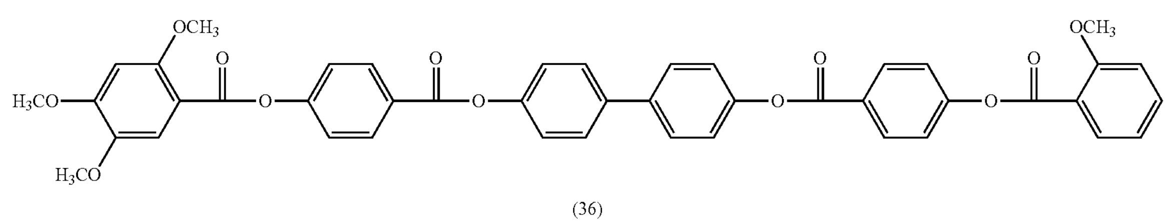
(36)
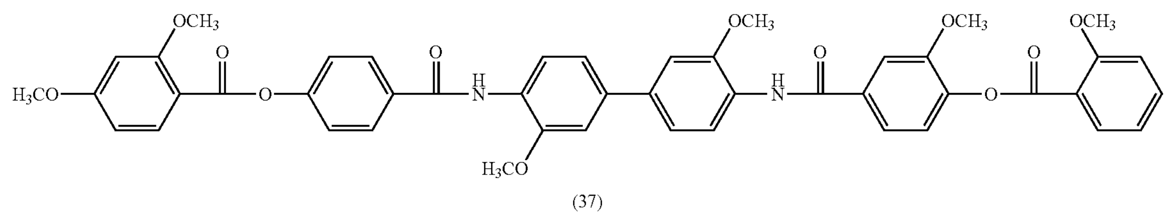
(37)
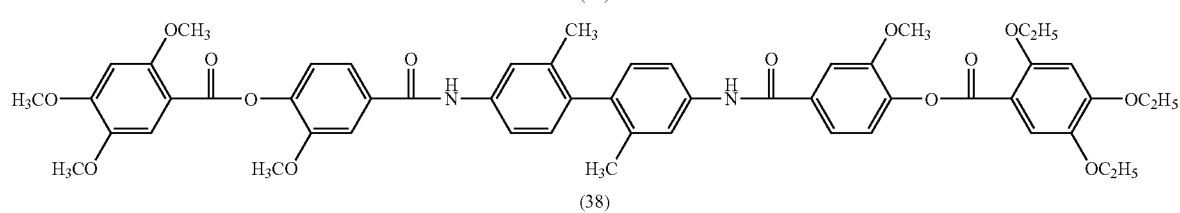
(38)

-continued

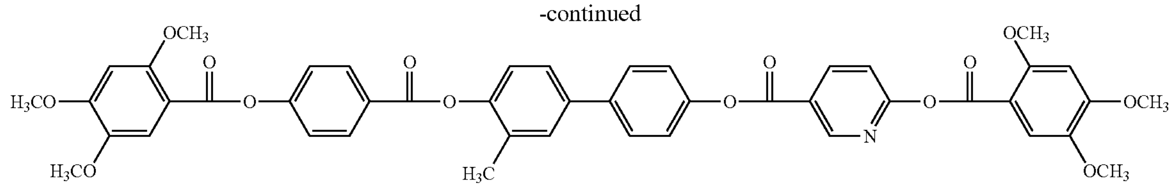

(39)

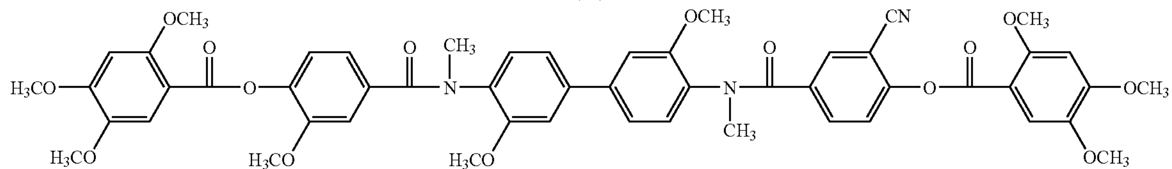

(40)

These low molecular compounds according to the invention may be used alone, and the mixture thereof also may be used. These compounds have an optical anisotropy (retardation) generation promoting effect, in addition to a V-shaped streak generation suppressing effect. The effects can not be obtained even when a plasticizer (for example, a phosphate-based compound, a phthalate-based compound, and a glycolic acid ester-based compound) or a UV absorbent (for example, a benzophenone-based compound and a benzotriazole-based compound) are used.

<Cellulose Acylate Resin>

(Structure of Cellulose Acylate)

Cellulose Acylate (hereinafter, referred to as "cellulose acylate according to the invention") used in the invention will be described in detail.

β-1,4 binding-glucose unit, which constitutes cellulose, has free hydroxyl groups on 2-, 3- and 6-positions. Cellulose acylate is a polymer in which all or a part of hydroxyl groups is esterified. In the specification, a substitution degree and a total substitution degree are used to show an esterification ratio of hydroxyl groups. The substitution degree is an esterification ratio of cellulose on each 2-, 3- and 6-position (the substitution degree is 1, when cellulose is esterified at 100%), and the total substitution degree is a total of the substitution degrees (the total substitution degree is 3, when cellulose is esterified at 100%).

Preferably, the cellulose acylate for use in the invention satisfies the following formulae (1) to (3), as it may reduce fine projections and depressions in its film. In particular, Y is preferably at least 0.3.

$$2.6 \leqq X+Y \leqq 3.0, \quad \text{Formula (1)}$$

$$0 \leqq X \leqq 2.8, \quad \text{Formula (2)}$$

$$0.3 \leqq Y \leqq 3; \quad \text{Formula (3)}$$

wherein X represents a substitution degree for an acetyl group; Y represents a total substitution degree for a propionyl group, a butyryl group, a pentanoyl group and a hexanoyl group.

When at least ½ of Y is a propionyl group, then the polymer preferably satisfies the following formulae (4) to (6) or the following formulae (7) to (9):

$$2.6 \leqq X+Y \leqq 2.95, \quad \text{Formula (4)}$$

$$0.1 \leqq X \leqq 1.45, \quad \text{Formula (5)}$$

$$1.5 \leqq Y \leqq 2.95. \quad \text{Formula (6)}$$

Or $$2.6 \leqq X+Y \leqq 2.95, \quad \text{Formula (7)}$$

$$2.0 \leqq X \leqq 2.8, \quad \text{Formula (8)}$$

$$0.1 \leqq Y \leqq 1.1. \quad \text{Formula (9)}$$

When less than ½ of Y is a propionyl group, then the polymer preferably satisfies the following formulae (10) to (12):

$$2.6 \leqq X+Y \leqq 2.95, \quad \text{Formula (10)}$$

$$0.5 \leqq X \leqq 1.8, \quad \text{Formula (11)}$$

$$1.3 \leqq Y \leqq 2.7. \quad \text{Formula (12)}$$

When at least ½ of Y is a propionyl group, then more preferably the polymer satisfies the following formulae (13) to (15) or the following formulae (16) to (18):

$$2.6 \leqq X+Y \leqq 2.95, \quad \text{Formula (13)}$$

$$0.1 \leqq X \leqq 0.95, \quad \text{Formula (14)}$$

$$2.0 \leqq Y \leqq 2.95. \quad \text{Formula (15)}$$

Or $$2.6 \leqq X+Y \leqq 2.95, \quad \text{Formula (16)}$$

$$2.0 \leqq X \leqq 2.8, \quad \text{Formula (17)}$$

$$0.1 \leqq Y \leqq 1.0. \quad \text{Formula (18)}$$

When less than ½ of Y is a propionyl group, then more preferably the polymer satisfies the following formulae (19) to (21):

$$2.6 \leqq X+Y \leqq 2.95, \quad \text{Formula (19)}$$

$$0.5 \leqq X \leqq 1.8, \quad \text{Formula (20)}$$

$$1.3 \leqq Y \leqq 2.5. \quad \text{Formula (21)}$$

Even more preferred is a cellulose acylate satisfying the following condition. Specifically, when at least ½ of Y is a propionyl group, then the polymer preferably satisfies the following formulae (22) to (24) or the following formulae (25) to (27):

$$2.7 \leqq X+Y \leqq 2.95, \quad \text{Formula (22)}$$

$$0.2 \leqq X \leqq 0.75, \quad \text{Formula (23)}$$

$$2.4 \leqq Y \leqq 2.9. \quad \text{Formula (24)}$$

Or $$2.7 \leqq X+Y \leqq 2.95, \quad \text{Formula (25)}$$

$$2.2 \leqq X \leqq 2.7, \quad \text{Formula (26)}$$

$$0.2 \leqq Y \leqq 0.6. \quad \text{Formula (27)}$$

When less than ½ of Y is a propionyl group, then the polymer preferably satisfies the following formulae (28) to (30):

$$2.7 \leqq X+Y \leqq 2.95, \quad \text{Formula (28)}$$

$$0.7 \leqq X \leqq 1.4, \quad \text{Formula (29)}$$

$$1.3 \leqq Y \leqq 2.0. \quad \text{Formula (30)}$$

An acyl group having carbon atoms in the range of 2 to 6 included in the cellulose acylate according to the invention may be an aliphatic acyl group or an aromatic acyl group. The acyl group is preferably exemplified by an acetyl group, a propionyl group, a butyryl group, a pentanoyl group, a hexanoyl group, an isobutyryl group, a tert-butyryl group, or the like. The acyl group is more preferably exemplified by an acetyl group, a propionyl group, and a butyryl group.

The cellulose acylate according to the invention may be a mixed ester having plural kinds of esters in one molecule. Preferable examples of the mixed ester include cellulose acetate propionate, cellulose acetate butylate, cellulose propanoate butylate, cellulose acetate hexanoate, cellulose acetate cyclohexanoate and the like. More preferable examples of the mixed ester include cellulose acetate propionate, cellulose acetate butylate and the like. An even more preferable example of the mixed ester includes cellulose acetate butylate.

The number of V-shaped streaks is reduced when the acyl group in these cellulose acylate is a propionyl group other than a butyryl group. A substitution degree for a propionyl group is preferably 1.5 or more, and more preferably 2.0 or more. In addition, the number of V-shaped streaks is reduced when cellulose acylate having a polymerization degree of preferably 250 or less, more preferably 210 or less, and even more preferably 200 or less is used. In spite of not using the “low molecular compound”, it is possible to reduce the number of V-shaped streaks only with a melting condition when such cellulose acylate is used.

Next, a method for preparing cellulose acylate according to the invention will be described in detail. A raw material cotton for the cellulose acylate according to the invention and a synthesizing method thereof are described in detail in Hatsumei Kyokai Disclosure Bulletin (No. 2001-1745, published by Hatsumei Kyokai, on Mar. 15, 2001) pages 7 to 12.

(Raw Material for Cellulose Acylate and Pretreatment)

The raw material for cellulose is preferably originated from hardwood pulp, softwood pulp, and cotton linter. As the raw material for cellulose, it is preferable to use a high-purity material in which the content of α-cellulose is in the range of 92 to 99.9% by mass. In a case where the raw material for cellulose has a flake form or a block form, it is preferable that the raw material for cellulose is dissolved in advance, and it is preferable that the dissolution continues until the form of cellulose is to be a fluff form.

(Activation)

Before acylation, it is preferable that the raw material for cellulose is treated to be contacted to an activating agent (activation). It is possible to use a carboxylic acid or water as an activating agent. When water is used, a process of excessively adding an acid anhydride for dehydration, a process of washing with the carboxylic acid for the purpose of substituting water, or a process of adjusting conditions for acylation is preferably carried out after the activation. The activating agent may be added at any adjusted temperature, and may be added in a spray manner, a falling-drop manner, a dipping manner or the like, selectively.

Preferable examples of the carboxylic acid as an activating agent include a carboxylic acid having carbon atoms in the range of 2 to 7 (for example, acetic acid, propionic acid, butyric acid, 2-methylpropionic acid, valeric acid, 3-methylbutyric acid, 2-methylbutyric acid, 2,2-dimethylpropionic acid (pivalic acid), hexane acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptane acid, and cyclohexanecarboxylic acid, and benzoic acid), more preferable examples of the carboxylic acid include acetic acid, propionic acid, or butyric acid, and even more preferable example of the carboxylic acid includes acetic acid.

At the time of activation, a bronsted acid such as a sulfuric acid may be also added as required. However, when a strong acid such as a sulfuric acid is added, depolymerization may be promoted. Accordingly, the strong acid is added in cellulose in a proportion of preferably 0.1 to 10% by mass. Two kinds or more of activating agents may be combined for use herein, or a carboxylic acid anhydride having carbon atoms in the range of 2 to 7 may be added.

The activating agent is added in cellulose in a proportion of preferably 5% by mass or more, more preferably 10% by mass or more, and even more preferably 30% by mass or more. A preferable content of the activating agent is 5% by mass or more, since troubles such as reduction in activation degree of cellulose do not occur. The upper limit of the content of the activating agent is not particularly limited so long as productivity is not lowered, but the activating agent is included in cellulose preferably in a proportion of 100 times or less, more preferably in a proportion of 20 times or less, and even more preferably in a proportion of 10 times or less in mass. The activating agent is excessively added to cellulose for activation, and then a process including filtration, air blowing and drying, heating and drying, distillation and removal under a reduced pressure, or solvent substitution is carried out to reduce the content of the activating agent.

Time for activation is preferably 20 minutes or more, and the upper limit thereof is not particularly limited so long as the upper limit has no effect on the productivity. However, the upper limit is preferably 72 hours or less, more preferably 24 hours or less, and even more preferably 12 hours or less. The activation temperature is preferably in the range of 0 to 90° C., more preferably in the range of 15 to 80° C., and even more preferably in the range of 20 to 60° C. The process of activating the cellulose may be carried out under a condition of pressurization or depressurization, and electromagnetic wave such as microwave and infrared radiation may be used as heating means.

(Acylation)

In a method for preparing the cellulose acylate according to the invention, the carboxylic acid anhydride is preferably added to the cellulose and reacted using a lewis acid or the bronsted acid as a catalyst, and thus the hydroxyl groups of the cellulose are acylated.

The synthesis of cellulose acylate having a large substitution degree on 6-position is described in JP-A-11-5851, JP-A-2002-212338, and JP-A-2002-338601.

As other synthesis methods of the cellulose acylate, a method of reacting the carboxylic acid anhydride or a carboxylic acid halide with the cellulose in the presence of a base (sodium hydroxide, potassium hydroxide, barium hydroxide, sodium carbonate, pyridine, triethylamine, tert-butoxy potassium, sodium methoxide, and sodium ethoxide) and a method of using a mixed acid anhydride (a mixed anhydride of carboxylic and trifluoroacetic acids and a mixed anhydride of carboxylic and methanesulfonic acids) as an acylating agent may be used. In particular, the latter method is available when an acyl group having a great number of carbon atoms or an acyl group having a difficulty to be applied in a liquid-state acylating method with a carboxylic acid anhydride-acetic acid-sulfuric acid catalyst is introduced.

For obtaining mixed cellulose acylate, for example, employable is a method of reacting cellulose with two kinds of carboxylic acid anhydrides both serving as an acylating agent, as their mixture or by successively adding them; a method of using a mixed acid anhydride of two kinds of carboxylic acids (i.e. mixed acetic/propionic acid anhydride); a method of reacting a carboxylic acid with a different carboxylic acid anhydride (e.g., acetic acid and propionic acid anhydride) in a reaction system to synthesize a mixed acid anhydride (i.e. mixed acetic/propionic acid anhydride) followed by further reacting it with cellulose; or a method of once preparing cellulose acylate having a substitution degree of less than 3, and then further acylating it with an acid anhydride or an acid halide at its remaining hydroxyl group.

(Acid Anhydride)

For the carboxylic acid anhydride, the carboxylic acid preferably has carbon atoms in the range of 2 to 7. The carboxylic acid anhydride is preferably exemplified by acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexanecarboxylic anhydride, benzoic anhydride or the like, more preferably exemplified by the acetic anhydride, the propionic anhydride, the butyric anhydride, the valeric anhydride, hexanoic anhydride, heptanoic anhydride or the like, and even more preferably exemplified by the acetic anhydride, the propionic anhydride, the butyric anhydride or the like.

For the purpose of preparing the mixed ester, these acid anhydrides are preferably combined for use herein. The mixing ratio thereof is preferably determined on the basis of the substitution ratio of the intended cellulose acylate. An excess equivalent of acid anhydrides is preferably added to the cellulose in general. In addition, the acid anhydride is preferably added to the cellulose in an amount of from 1.2 to 50 equivalents to the hydroxyl group of the cellulose, more preferably from 1.5 to 30 equivalents, even more preferably from 2 to 10 equivalents.

(Catalyst)

The bronsted acid or the lewis acid is preferably used as the catalyst for acylation used in the process of preparing the cellulose acylate according to the invention. The definitions for the bronsted acid and the lewis acid are described in, for example, "Dictionary of Physics and Chemistry", 5th edition (2000). The bronsted acid is preferably exemplified by sulfuric acid, perchloric acid, phosphoric acid, methanesulfonic acid, benzenesulfonic acid, p-toluenesulfonic acid or the like. The lewis acid is preferably exemplified by zinc chloride, tin chloride, antimony chloride, magnesia chloride or the like.

The sulfuric acid or the perchloric acid is preferably used as the catalyst, and even more preferable is the perchloric acid. In addition, its preferred amount to be added is in the range of 0.1 to 30% by mass, more preferably in the range of 1 to 15% by mass, even more preferably in the range of 3 to 12% by mass.

(Solvent)

A solvent may be added at the time of acylation for adjusting viscosity, reaction velocity, stirring property, acyl substation ratio, etc. While dichloromethane, chloroform, carboxylic acid, acetone, ethyl methyl ketone, toluene, dimethyl sulfoxide or sulfolane can, for example, be used as the solvent, carboxylic acid is preferred, including, for example, carboxylic acid having carbon atoms in the range of 2 to 7 {for example, acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methyl-valeric acid, 2,2-dimethylbutyric acid, 2,3-dimethylbutyric acid, 3,3-dimethylbutyric acid, cyclopentanecarboxylic acid or the like}. Acetic acid, propionic acid, butyric acid, etc. are more preferred, and a mixture of the catalysts also may be used.

(Reaction Condition for Acylation)

Although the acylation may be carried out by mixing a mixture of an acid anhydride, a catalyst and a solvent, if required, with cellulose, or by mixing them one after another with cellulose, it is usually preferable to prepare a mixture of an acid anhydride and a catalyst, or a mixture of an acid anhydride, a catalyst and a solvent as an acylating agent and react it with cellulose. It is preferable to cool the acylating agent beforehand to restrain any temperature increase in the reaction vessel by the heat of the acylation reaction. It is preferably cooled to a temperature in the range of −50 to 20° C., more preferably in the range of −35 to 10° C., and even more preferably in the range of −25 to 5° C. The acylating agent may be added in a liquid state, or may be frozen and added in a solid state in crystal, flake or block form.

The acylating agent may be added to cellulose all at a time, or may be added thereto a plurality of times. Alternatively, cellulose may be added to the acylating agent all at a time, or may be added thereto a plurality of times. When the acylating agent is added a plurality of times, it is possible to use a single kind of acylating agent or a plurality of acylating agents differing from one another in composition. Preferred cases include 1) adding first a mixture of an acid anhydride and a solvent, and then a catalyst, 2) adding first a mixture of an acid anhydride, a solvent and a part of a catalyst, and then a mixture of the remaining catalyst and the solvent, 3) adding first a mixture of an acid anhydride and a solvent, and then a mixture of a catalyst and the solvent, and 4) adding first a solvent, and then a mixture of an acid anhydride and a catalyst, or a mixture of the acid anhydride, catalyst and solvent.

Although the acylation of cellulose is an exothermic reaction, it is preferable that a maximum temperature of 50° C. not be exceeded by acylation in the method for producing the cellulose acylate according to the invention. The reaction temperature not exceeding that level is preferable for avoiding any inconvenience such as the progress of depolymerization making it difficult to obtain cellulose acylate having a polymerization degree suited for the purpose of the invention. The maximum temperature not to be exceeded by acylation is preferably 45° C., more preferably 40° C., and even more preferably 35° C. The reaction temperature may be controlled by using a temperature controller, or by controlling the initial temperature of the acylating agent. It is also possible to depressurize the reaction vessel and control the reaction temperature by the heat generated by the evaporation of the liquid component in the reaction system. It is also effective to employ cooling during the initial period of the reaction and heating thereafter, since the generation of heat by acylation is remarkable during the initial period of the reaction. The end point of acylation can be determined by means of light transmittance, solution viscosity, temperature variation in the reaction system, solubility of the reaction product in an organic solvent, observation through a polarizing microscope, etc.

The minimum temperature of the reaction is preferably −50° C. or more, more preferably −30° C. or more, and even more preferably −20° C. or more. Time for acylation is preferably in the range of 0.5 to 24 hours, more preferably in the range of 1 to 12 hours, and even more preferably in the range of 1.5 to 6 hours. When it is less than 0.5 hour, the reaction does not proceed satisfactorily under the usual reaction conditions, while no time exceeding 24 hours is desirable for industrial production.

(Reaction Terminator)

According to the method for producing cellulose acylate used in the invention, the acylation reaction is preferably followed by the addition of a reaction terminator.

The reaction terminator may be anything that can decompose an acid anhydride, and preferred examples are water, alcohol (for example ethanol, methanol, propanol or isopropyl alcohol) or a composition containing them. When the reaction terminator is added, the addition of a mixture of a carboxylic acid such as acetic, propionic or butyric acid and water is preferable to the direct addition of water or alcohol for avoiding the generation of a large amount of heat exceeding the cooling capacity of the reaction apparatus and causing inconveniences, such as a reduction in the polymerization degree of cellulose acylate and any undesired sedimentation of cellulose acylate. Acetic acid is preferable to any other carboxylic acid. While any ratio of carboxylic acid to water can be employed, the proportion of water is preferably in the range of 5 to 80% by mass, more preferably in the range of 10 to 60% by mass, and even more preferably in the range of 15 to 50% by mass.

The reaction terminator may be added to the reaction vessel for acylation, or alternatively, the reaction mixture may be added to a vessel for the reaction terminator. The addition of the reaction terminator preferably takes from three minutes to three hours. Its addition taking 3 minutes or more is preferable for avoiding any inconvenience, such as the generation of so large an amount of heat as to cause reduction in the polymerization degree, insufficient hydrolysis of the acid anhydride or reduction in stability of cellulose acylate. Its addition not taking more than 3 hours is preferable for avoiding any problem, such as a reduction in industrial productivity. Its addition preferably takes from 4 minutes to 2 hours, more preferably from 5 minutes to 1 hour and even more preferably from 10 to 45 minutes. While the addition of the reaction terminator does not essentially require any cooling of the reaction vessel, its cooling is preferable for restraining any undesirable temperature increase and thereby any depolymerization. The reaction terminator is preferably cooled, too.

(Neutralizing Agent)

A neutralizing agent (for example, the carbonate, acetate, hydroxide or oxide of calcium, magnesium, iron, aluminum or zinc) or a solution thereof may be added after the step of terminating the acylation to hydrolyze any excessive carboxylic acid anhydride remaining in the system and neutralize all or a part of the acylation catalyst. Preferred examples of solvents for the neutralizing agent are water, alcohols (for example, ethanol, methanol, propanol and isopropyl alcohol), carboxylic acids (for example, acetic acid, propionic acid and butyric acid), ketones (for example, acetone and ethyl methyl ketone), dimethylsulfoxide and other polar solvents, and a mixture thereof.

(Partial Hydrolysis)

As the cellulose acylate obtained as described above has a total substitution degree for hydroxyl groups of the cellulose of nearly 3, it is usual practice to hold it at a temperature in the range of 20 to 90° C. for several minutes to several days in the presence of a small amount of catalyst (usually an acylation catalyst, such as the remaining sulfuric acid) and water for hydrolyzing the ester bonds partially and changing the acyl substitution degree of cellulose acylate to a desired level (that is, aging it). As the process of the partial hydrolysis causes the hydrolysis of the sulfuric acid ester of cellulose, too, it is possible to reduce the amount of the sulfuric acid ester bonded to cellulose by controlling the conditions of the hydrolysis.

(Termination of Partial Hydrolysis)

When the desired cellulose acylate has been obtained, it is preferable to neutralize the catalyst remaining in the system completely by using a neutralizing agent as described above or a solution thereof to terminate the partial hydrolysis. The addition of a neutralizing agent (for example, magnesium carbonate or magnesium acetate) forming a salt having a low solubility in the reacted solution is desirable for the effective removal of the catalyst (for example, sulfuric acid ester) in the solution or bonded to cellulose.

(Filtration)

The reaction mixture (the dope) after acylation is preferably subjected to filtration for removing or reducing any unreacted matter, sparingly soluble salt and any other foreign matter from the cellulose acylate. The filtration may be carried out at any process from the completion of acylation to reprecipitation. Its dilution with a suitable solvent prior to the filtration is preferable for controlling its filtration pressure and its ease of handling.

(Reprecipitation)

The cellulose acylate solution as obtained is mixed in a poor solvent such as water or an aqueous solution of a carboxylic acid (e.g. acetic acid or propionic acid), or a poor solvent is mixed in the cellulose acylate reaction solution, so that cellulose acylate may be reprecipitated, and its washing and stabilization treatment give the intended cellulose acylate. The reprecipitation may be carried out continuously, or on a batch basis by increments. It is preferable to adjust the concentration of the cellulose acylate solution and the composition of the poor solvent by the mode of substitution of cellulose acylate or its polymerization degree to thereby control the form of the reprecipitated cellulose acylate and its molecular weight distribution.

In order to e.g. achieve an improved refining result and a controlled molecular weight distribution or apparent density, it is effective to dissolve the reprecipitated cellulose acylate again in its good solvent (for example, acetic acid or acetone) and react its solution with a poor solvent (for example, water) for reprecipitation, which operation may be repeated one or a plurality of times as required.

(Washing)

The cellulose acylate as prepared is preferably washed. Any washing solvent may be used if it dissolves cellulose acylate and yet can remove impurities therefrom, though water or warm water is usually used. Washing water preferably has a temperature in the range of 25 to 100° C., more preferably in the range of 30 to 90° C., and even more preferably in the range of 40 to 80° C. Washing treatment may be performed on a batch basis by repeating the filtration and the exchange of the washing solution, or by using a continuous washing apparatus. The waste solution resulting from the reprecipitation process and washing process is preferably reused as a poor solvent for another reprecipitation process, or distilled or otherwise treated so that a solvent, such as carboxylic acid, may be recovered for reuse.

While any method can be used for checking the progress of washing, preferred examples thereof include hydrogen ion concentration, ion chromatography, electrical conductivity, ICP, elemental analysis and atomic absorption spectrum.

Such treatment makes it possible to remove the catalyst (such as sulfuric acid, perchloric acid, trifluoroacetic acid, p-toluenesulfonic acid, or methanesulfonic acid), the neutralizing agent (such as the carbonate, acetate, hydroxide or oxide of calcium, magnesium, iron, aluminum or zinc), the reaction product of the neutralizing agent and the catalyst, the carboxylic acid (such as acetic acid, propionic acid or butyric acid), the reaction product of the neutralizing agent and the carboxylic acid, etc. from cellulose acylate, and is, therefore, effective for increasing the stability of cellulose acylate (in particular, decomposition of an ester bond resulting from a high-temperature and humidity).

(Stabilization)

The cellulose acylate which has been washed by warm water treatment is preferably treated with e.g. an aqueous solution of a weak alkali (for example, carbonate, hydrogen carbonate, hydroxide or oxide of sodium, potassium, calcium, magnesium or aluminum) in order to be further improved in stability, or remove any odor of carboxylic acid.

The amount of the remaining impurities can be controlled by the amount of the washing solution, washing temperature, washing time, a method of stirring, the shape of a washing container, and the composition and concentration of the stabilizing agent.

The condition for the acylation, the partial hydrolysis, and washing were particularly preferably set so that the amount of remaining sulfate (as the amount of sulfur molecule) can be within the range of 0 to 500 ppm.

(Drying)

The cellulose acylate according to the invention is preferably dried to have its water content adjusted to a desired level. While any drying method can be employed if it enables the intended water content to be obtained, it is preferable to perform drying treatment efficiently by using a method such as heating, air blowing, depressurization or stirring, or a combination thereof. Drying treatment is preferably performed at a temperature in the range of 0 to 200° C., more preferably in the range of 40 to 180° C., and even more preferably in the range of 50 to 160° C. The cellulose acylate according to the invention, which can be obtained by drying, preferably has a water content of 2% by mass or less, more preferably 1% by mass or less, and even more preferably 0.7% by mass or less.

(Form)

The cellulose acylate according to the invention may have various forms such as a particulate form, a powdery form, a fibrous form and a block form. However, cellulose acylate after being dried may be crushed or sieved to have a uniform particle size and an improved property of handling, from the viewpoint that a raw material for producing a film preferably has a particulate form or a powdery form. When cellulose acylate is particulate, at least 90% by mass or more of its particles to be used preferably have a particle size in the range of 0.5 to 5 mm. Moreover, at least 50% by mass or more of its particles to be used preferably have a particle size in the range of 1 to 4 mm. The cellulose acylate particles are preferably as close to spherical in shape as possible they could. In addition, an apparent density of the cellulose acylate particles according to the invention is preferably in the range of 0.5 to 1.3, more preferably in the range of 0.7 to 1.2, even more preferably in the range of 0.8 to 1.15. A measurement method for the apparent density is provided in JIS K-7365.

An angle of repose of the cellulose acylate particles according to the invention is preferably in the range of 10 to 70°, more preferably in the range of 15 to 60°, and even more preferably in the range of 20 to 50°.

(Polymerization Degree)

Referring to the polymerization degree of the cellulose acylate preferred for use by the invention, its number-average polymerization degree is in the range of 120 to 400, preferably in the range of 150 to 300, and more preferably in the range of 180 to 260. Its average polymerization degree can be determined by e.g. the limiting viscosity method of UDA et al (Kazuo UDA and Hideo SAITO: Journal of the Society of Fibers, Vol. 18, No. 1, pages 105 to 120, 1962), or a method of determining a molecular weight distribution by gel permeation chromatography (GPC). For further details, reference is made to JP-A-9-95538.

According to the invention, the weight-average polymerization degree/number-average polymerization degree of cellulose acylate as determined by GPC is preferably in the range of 1.6 to 3.6, more preferably in the range of 1.7 to 3.3 and even more preferably in the range of 1.8 to 3.2.

The cellulose acylate may be used in one kind only, or in a mixture of two kinds or more. In addition, a mixture in which high molecular components other than cellulose acylate are properly mixed may be used. It is preferable that the high molecular components as mixed is excellent in compatibility with cellulose acylate, and a transmittance of a film formed with the high molecular components is preferably 80% or more, more preferably 90% or more, and even more preferably 92% or more.

<Additives>

In addition to the above-mentioned low molecular weight compound of the invention, following additives may be added.

(1) Plasticizer

As the plasticizer, those described in JP-A-2000-352620 may be used, and its amount may be from 0.1 to 25% by mass relative to cellulose acylate, more preferably from 1 to 20% by mass, even more preferably from 3 to 15% by mass.

The plasticizer includes, for example, alkylphthalylalkyl glycolates, phosphates and carboxylates.

The alkylphthalylalkyl glycolates include, for example, methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate.

The phosphates include, for example, triphenyl phosphate, tricresyl phosphate, phenyl diphenyl phosphate. Further, the phosphate plasticizers described in JP-T-6-501040, claims 3-7 are also preferably used herein. As mentioned in the above, phosphates are effective for promoting crystallization of cellulose acylate to produce streaks, but combined with the low-molecular compound in the invention, such their effect may be prevented. Accordingly, the low-molecular compound in the invention may be combined with a phosphate.

The carboxylates include, for example, phthalates such as dimethyl phthalate, diethyl phthalate, dibutyl phthalate, dioctyl phthalate and diethylhexyl phthalate; citrates such as acetyltrimethyl citrate, acetyltriethyl citrate, acetyltributyl citrate; as well as adipates such as dimethyl adipate, dibutyl adipate, diisobutyl adipate, bis(2-ethylhexyl) adipate, diisodecyl adipate and bis(butyl diglycoladipate). In addition, also preferably, butyl oleate, methylacetyl ricinoleate, dibutyl sebacate and triacetin may be used either singly or as combined with the above.

Polyalcohol plasticizers are also preferably used herein. The polyalcohol plasticizers include glycerin-type ester compounds such as glycerin esters, diglycerin esters; polyalkylene glycols such as polyethylene glycol, polypropylene glycol; and compounds of polyalkylene glycols with an acyl group bonding to the hydroxyl group thereof, which are well compatible with cellulose fatty acid esters and which remarkably exhibit their thermo-plasticization effect. Though not comparable to the above-mentioned "low-molecular compound, in the invention, these polyalcohol plasticizers are effective for preventing the melt from sticking to a screw and for enabling a smooth flow of the melt to prevent the generation of V-shaped streaks.

Concretely, the glycerin esters include glycerin diacetate stearate, glycerin diacetate palmitate, glycerin diacetate myristate, glycerin diacetate laurate, glycerin diacetate caprate, glycerin diacetate nonanoate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanoate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate myristate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, glycerin oleate propionate, to which, however, the invention should not be limited. One or more of these may be used herein either singly or as combined.

Of the above, preferred are glycerin diacetate caprylate, glycerin diacetate pelargonate, glycerin diacetate caprate, glycerin diacetate laurate, glycerin diacetate myristate, glycerin diacetate palmitate, glycerin diacetate stearate, glycerin diacetate oleate.

Examples of the diglycerin esters are mixed acid esters of diglycerin and others, for example, diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramyristate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate myristate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate dipentanoate, diglycerin diacetate dicaprylate, diglycerin diacetate dipelargonate, diglycerin diacetate dicaprate, diglycerin diacetate dilaurate, diglycerin diacetate dimyristate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimyristate, diglycerin acetate tripalmitate, diglycerin acetate tristearate, diglycerin acetate trioleate, diglycerin laurate, diglycerin stearate, diglycerin caprylate, diglycerin myristate, diglycerin oleate, to which, however, the invention should not be limited. One or more of these may be used herein either singly or as combined.

Of the above, preferred are diglycerin tetraacetate, diglycerin tetrapropionate, diglycerin tetrabutyrate, diglycerin tetracaprylate, diglycerin tetralaurate.

Examples of the polyalkylene glycols are polyethylene glycol and polypropylene glycol having a mean molecular weight of from 200 to 1000, to which, however, the invention should not be limited. One or more of these may be used herein either singly or as combined.

Examples of the compounds of polyalkylene glycols with an acyl group bonding to the hydroxyl group thereof are polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanoate, polyoxyethylene caprate, polyoxyethylene laurate, polyoxyethylene myristate, polyoxyethylene palmitate, polyoxyethylene stearate, polyoxyethylene oleate, polyoxyethylene linolate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanoate, polyoxypropylene caprate, polyoxypropylene laurate, polyoxypropylene myristate, polyoxypropylene palmitate, polyoxypropylene stearate, polyoxypropylene oleate, polyoxypropylene linolate, to which, however, the invention should not be limited. One or more of these may be used herein either singly or as combined.

The use amount of the plasticizers in a cellulose acylate film is preferably in the range of 0 to 20% by mass, more preferably in the range of 1 to 20% by mass, and even more preferably 2 to 15% by mass. If necessary, the plasticizers may be used in combination of two kinds or more as needed.

(2) Matte Agent

Fine particles are preferably added as a matte agent. Examples of fine particles used in the invention can include silicon dioxide, titanium dioxide, oxidized aluminum, oxidized zirconium, calcium carbonate, talc, clay, calcined kaolin, calcined calcium silicate, calcium silicate hydrate, aluminium silicate, magnesium silicate, and calcium phosphate. Fine particles preferably include silicon and more preferably include silicon dioxide in that turbidity is reduced. It is preferable that fine particles of silicon dioxide have an average primary particle size of 20 nm or less, and an apparent specific gravity of 70 g/L or more. It is more preferable that the average diameter of primary particles is as small as in the range of 5 to 16 nm because a haze of a film can be reduced. The apparent specific gravity is preferably in the range of 90 to 200 g/L or more, and more preferably in the range of 100 to 200 g/L or more. A greater apparent specific gravity is preferable from the viewpoint of preparing a high concentration dispersion and making an improvement in a haze and aggregates.

In general, the fine particles form secondary fine particles having an average particle size in the range of 0.1 to 3.0 μm. In a film, the secondary fine particles exist as aggregates of the first particles, and form an irregularity of from 0.1 to 3.0 μm on a film surface. An average secondary particle size is preferably in the range of 0.2 to 1.5 μm, more preferably in the range of 0.4 to 1.2 μm, and even more preferably in the range of 0.6 to 1.1 μm. Particles in a film are observed with a scanning electron microscope and diameters of circles externally contacting the particles are set as the primary and secondary particle sizes. In a different place, 200 particles are observed and the average value thereof is set as the average particle size.

As fine particles of silicon dioxide, a commercialized product exemplified by AEROSIL R972, R972V, R974, R812, 200, 200V, 300, R202, OX50, TT600 (produced by NIPPON AEROSIL CO., LTD) or the like can be used. For fine particles of oxidized zirconium, products such as AEROSIL R976 and R811 (produced by NIPPON AEROSIL CO., LTD.) are available in the market, and can be used.

Among them, AEROSIL 200V and AEROSIL R972V are fine particles of silicon dioxide having an average primary particle size of 20 nm or less, and an apparent specific gravity of 70 g/L or more. AEROSIL 200V and AEROSIL R972V are particularly preferable to maintain low turbidity and reduce a friction coefficient of an optical film.

(3) Other Additives

In addition to the above-mentioned additives, other various additives (e.g., UV inhibitor, antioxidant, optical anisotropic controlling agent, fine particles, IR absorbent, surfactant, stench-trap agent) may be added. IR absorbent dyes, for example, as in JP-A-2001-194522 are usable herein; and UV absorbents, for example, as in JP-A-2001-151901 are usable herein. The amount thereof is preferable from 0.001 to 5% by mass of cellulose acylate. Preferably, the fine particles for use herein have a mean particle size of from 5 to 3000 nm, and they may be formed of a metal oxide or a crosslinked polymer. Their amount to be in cellulose acylate is preferably from 0.001 to 5% by mass of the polymer. The amount of the antioxidant is preferably from 0.0001 to 2% by mass of cellulose acylate. Optical anisotropic controlling agents, for example, as in JP-A-2003-66230, JP-A-2002-49128 are usable herein. The amount thereof is preferable from 0.1 to 15% by mass of cellulose acylate.

For stabilizers for thermal degradation inhibition or discoloration inhibition, herein usable are epoxy compounds, weak organic acids, phosphates, thiophosphate compounds, phosphites (e.g., as in JP-A-51-70316, 10-306175, 57-78431, 54-157159, 55-13765), phosphite compounds (as in JP-A-2004-182979). One or more of these may be used herein either singly or as combined.

(Pelletization)

Before melt-casting film formation, it is preferable that the cellulose acylate and additive are palletized into pellets. Pelletization may be attained as follows: the cellulose acylate and additive are melted at a temperature in the range of 150 to 250° C. with a double-screw kneading extruder and extruded out in a form of noodles, and then they are solidified in water and pelletized into pellets. The sectional area of a pellet is in the range of 1 to 300 mm$^2$ and the length of a pellet is in the range of 1 to 30 mm, as a preferable pellet size.

<Production and Process of Cellulose Acylate Film>

(Film Formation Method)

The cellulose acylate film according to the invention can be preferably formed using the pellets of cellulose acylate prepared as above with a melt-casting film formation method.

Since the cellulose acylate film according to the invention can be formed by the melt-casting film formation method, the film can be excellent in a processible property after a long-time storage. When the above-described known cellulose acylate film was stored for a long time of six months or more and then punched, cracks were formed thereon and a reduction in processing suitability became evident. The inventor carried out the cause of the above problem, and has found out that a certain amount of solvent remains on the film formed in solution-film formation and allows cellulose acylate molecules to flow in a long-time storage so as to promote crystallization. Since the cellulose acylate film is stored in a form of a roll, the remaining solvent is not volatilized and causes the crystallization to be promoted for long periods of time. Such problem can be solved by the melt-casting film formation. When the above-described low molecular compound according to the invention is added, it is more effective to suppress crystal growth. The reason is because the low molecular compound according to the invention is absorbed around cellulose acylate molecules and suppresses the crystallization of the cellulose acylate molecules.

The amount of a remaining solvent on the cellulose acylate film according to the invention is preferably in the range of 0 to 0.01%, more preferably in the range of 0 to 0.005%, and even more preferably in the range of 0 to 0.001%. It is preferable that a loss modulus coefficient of the cellulose acylate film according to the invention is relatively low, and a processible property thereof is relatively excellent when the loss modulus coefficient is in the range of 150 to 290 kg/mm$^2$. When the loss modulus coefficient is too high, the film is too hard, thus cracks are easily generated at the time of punching process.

(Addition into Hopper)

When the cellulose acylate film according to the invention is produced, it is preferable to use the cellulose acylate film palletized by the above-described method. In particular, before the melt-casting film formation, it is preferable to add the pellets into the hopper of a melt extruder after the water content of pellets is adjusted to be 1% or less, and more preferably 0.5% or less. At this time, a temperature of the hopper is set to preferably from 20 to 110° C., more preferably 40 to 100° C., and even more preferably from 50 to 90° C. In this step, it is preferable to fill the hopper with an inert gas such as nitrogen.

(Melt Extrusion)

With the above-described conditions, melt extrusion is performed. The diameter of a screw is preferably in the range of 10 to 300 mm, more preferably in the range of 20 to 200 mm, and even more preferably in the range of 30 to 100 mm. The ratio (L/D) of a screw length (L) to the diameter (D) of a screw outlet side is preferably in the range of 10 to 200, more preferably in the range of 15 to 100, and even more preferably in the range of 20 to 70. As described above, in order to obtain the maximum values and the minimum values of G', G", tan δ and η in an extruder, it is preferable to heat a barrel of the extruder by 3 to 20 divided heaters so as to melt cellulose acylate. A melting temperature is preferably in the range of 170 to 250° C., more preferably in the range of 175 to 240° C., and even more preferably in the range of 180 to 230° C. Preferable kneading time is from 2 to 60 minutes, more preferably from 3 to 40 minutes, and even more preferably from 4 to 30 minutes. It is more desirable that the inner atmosphere of the melt extruder is an inert gas (e.g., nitrogen), or an extruder with a vent is used and it is degassed to be in vacuum.

(Casting)

After the melted resin is passed through a gear pump, the melted resin is filtered through a filter or the like and extruded from a T die attached behind the filter into the shape of a sheet on a cooling drum. A single layer may be extruded, or multiple layers may be extruded by using a multi-manifold die or feed block die. In this operation, the thickness unevenness may be ameliorated by adjusting a gap between lips of the die.

Then, the resin is extruded on a casting drum. In this operation, it is preferable to use the static electricity applying method, air knife method, air chamber method, vacuum nozzle method, touch roll method or the like to enhance adhesion between the casting drum and the melt-extruded sheet. Such a method for enhancing adhesion may be performed for the total area of the melt-extruded sheet or a part of the sheet.

The casting drum is preferably at a temperature of 60 to 160° C., more preferably 70 to 150° C., still more preferably 80 to 140° C. After the casting, the sheet is peeled off from the casting drum, passed through a gap between nip rollers and rolled up. The rolling up speed is preferably 10 to 100 m/minute, more preferably 15 to 80 m/minute, still more preferably 20 to 70 m/minute.

The width of the formed film is preferably 0.7 to 5 m, more preferably 1 to 4 m, still more preferably 1.3 to 3 m. The unstretched film obtained as described above preferably has a thickness of 30 to 250 μm, more preferably 40 to 200 μm, still more preferably 50 to 180 μm. When the thickness is more than 250 μm, the amount of the melt becomes increase. In this case where the above-mentioned variation of the extruded amount was occurred, the V-shaped streaks were prevented from being made. The invention is effectively available when the extruded amount was small.

The sheet obtained as described above is preferably trimmed for the both side ends and then rolled up. The rolling up tension is preferably 1 kg/m/width to 50 kg/m/width, more preferably 2 kg/m/width to 40 kg/m/width. The trimmed portions may be reused as a raw material of films of the same type or different type after grinding or processing such as granulation, depolymerization and re-polymerization as required. Further, it is also preferable to provide a laminate film on at least one surface of the film before the rolling up in view of prevention of scratches.

(Physical Properties of Unstretched Cellulose Acylate Film)

Thus obtained, the unstretched cellulose acylate film preferably has Re=0 to 20 nm and Rth=0 to 80 nm, more preferably Re=0 to 15 nm and Rth=0 to 70 nm, and even more preferably Re=0 to 10 nm and Rth=0 to 60 nm. Re and Rth indicate the in-plane retardation and the thickness-direction retardation of the film, respectively. Preferably, the angle θ between the film-traveling direction (length direction) and the slow axis of Re of the film is nearer to 0° or +90° or −90°.

The thickness unevenness is preferably in the range of 0 to 4% both in the length direction and in the width direction, more preferably in the range of 0 to 3%, and even more preferably 0 to 2%.

(Stretching)

After the film formation in the above-mentioned method, the stretching was preferably attained to control the Re and Rth of the cellulose acylate film.

Stretching the film is attained preferably at Tg to (Tg+50° C.), more preferably at (Tg+3° C.) to (Tg+30° C.), even more preferably at (Tg+5° C.) to (Tg+20° C.). Preferably, the draw ratio in stretching is from 10% to 300% in at least one direction, more preferably from 15% to 200%, even more preferably from 20% to 150%. The stretching may be attained in one stage or in multiple stages. The draw ratio as referred to herein may be obtained according to the following formula:

$$\text{Draw Ratio }(\%)=100\times\{(\text{length after stretching})-(\text{length before stretching})\}/(\text{length before stretching}).$$

The stretching may be made in the machine direction (machine-direction stretching), using at least two pairs of nip rolls of which the peripheral speed on the take-out side is kept higher; or may be made in the cross direction (the direction perpendicular to the machine direction) (cross-direction stretching), with both edges of the film held zipped. A simultaneous biaxial stretching method as in JP-A-2000-37772, 2001-113591, 2002-103445 may also be employed herein.

For freely controlling the ratio of Rth/Re in machine-direction stretching, it may be attained by controlling the value obtained by dividing the nip roll distance by the film width (aspect ratio). Specifically, when the aspect ratio is made small, then the ratio Rth/Re may be made large. In cross-direction stretching, it may be controlled by stretching the film in the machine direction in addition to stretching it in the cross direction, or may be controlled by relaxing the film. Specifically, the ratio Rth/Re may be increased by stretching the film in the machine direction, or on the contrary, the ratio Rth/Re may be decreased by relaxing the film in the machine direction. Further, combining the machine-direction stretching and the cross-direction stretching makes it possible to control Re and Rth by reducing Re (the draw ratio in stretching in the machine direction is made nearer to that in the cross direction) with increasing Rth (the areal draw ratio (machine-direction draw ratio×cross-direction draw ratio) is increased). In the invention, it is desirable that the difference between the machine-direction draw ratio and the cross-direction draw ratio is from 10% to 100%, more preferably from 20% to 80%, even more preferably from 25% to 60% so that the film may be stretched asymmetrically. In this case, it is more desirable that the draw ratio in stretching in the cross direction is larger.

The stretching speed is preferably from 10%/min to 10000%/min, more preferably from 20%/min to 1000%/min, even more preferably from 30%/min to 800%/min.

Preferably, Re and Rth of the stretched cellulose acylate film satisfy the following formulae (1a) to (1c):

$$Re \leqq Rth; \quad \text{Formula (1a)}$$

$$0 \leqq Re \leqq 200; \text{ and} \quad \text{Formula (1b)}$$

$$0 \leqq Rth \leqq 500. \quad \text{Formula (1c)}$$

More preferably, Re and Rth satisfy the following formulae (2a) to (2c)

$$Re\times 1.1 \leqq Rth, \quad \text{Formula (2a)}$$

$$10 \leqq Re \leqq 150, \quad \text{Formula (2b)}$$

$$50 \leqq Rth \leqq 400. \quad \text{Formula (2c)}$$

Even more preferably, Re and Rth satisfy the following formulae (3a) to (3c)

$$Re\times 1.2 \leqq Rth, \quad \text{Formula (3a)}$$

$$20 \leqq Re \leqq 100, \quad \text{Formula (3b)}$$

$$80 \leqq Rth \leqq 350. \quad \text{Formula (3c)}$$

In this description, The retardation value Re and the retardation value Rth are computed based on the following: Re(λ) and Rth(λ) indicate the in-plane retardation and the thickness-direction retardation, respectively, of the film at a wavelength λ. Re(λ) may be determined by applying light having a wavelength of λ nm to the film in the normal direction of the film, using KOBRA 21ADH (by Oji Scientific Instruments). Rth(λ) is determined as follows: Based on the retardation data determined in three different directions, or that is, Re(λ) as above, a retardation value measured by applying light having a wavelength λ nm to the film in the direction tilted by +40° relative to the normal direction of the film with the slow axis (judged by KOBRA 21ADH) as the tilt axis (rotation axis) thereof, and a retardation value measured by applying light having a wavelength λ nm to the film in the direction tilted by −40° relative to the normal direction of the film with the slow axis as the tilt axis thereof, Rth(λ) is computed by KOBRA 21ADH. In this case, the estimated value of the mean refractive index of the film. For the mean refractivity data, referred to are the numerical data in Polymer Handbook (by John Wiley & and Sons, Inc.) or those in optical film catalogues. Materials of which the mean refractive index is unknown may be analyzed with an Abbe's refractiometer to determine their data. The mean refractive index of the optical films are as follows; cellulose acylate is 1.48; cyclo-olefin polymer (1.52), polycarbonate (1.59), polymethyl methacrylate (1.49), polystyrene (1.59).

Preferably, the angle θ formed by the film-traveling direction (machine direction) and the slow axis of Re of the film is nearer to 0°, +90° or −90°. Concretely, in machine-direction stretching, the angle is preferably nearer to 0°, more preferably to 0±3°, even more preferably to 0±2°, still more preferably to 0±10. In cross-direction stretching, the angle is preferably 90±3° or −90±3°, more preferably 90±2° or −90±2°, even more preferably 90±1° or −90±1°.

The thickness of the stretched cellulose acylate film is preferably from 15 μm to 200 μm, more preferably from 30 μm to 170 μm, even more preferably from 40 μm to 140 μm. Both stretched and unstretched, the thickness unevenness of the film is preferably from 0% to 2%, more preferably from 0% to 1.5%, even more preferably from 0% to 1% both in the machine direction and in the cross direction thereof.

(Physical Properties of Film)

Thus obtained, the unstretched cellulose acylate film preferably has preferably the tensile modulus of the film is from 1.5 kN/mm$^2$ to 2.9 kN/mm$^2$, more preferably from 1.7 kN/mm$^2$ to 2.8 kN/mm$^2$, further more preferably from 1.8 kN/mm$^2$ to 2.6 kN/mm$^2$. The elongation at break of the film is, more preferably from 5% to 80%, further more preferably from 8% to 50%. Tg of the film (Tg of the mixed compound of cellulose acylate and the additives) is preferably from 95° C. to 145° C., more preferably from 100° C. to 140° C., further more preferably from 105° C. to 135° C. The thickness of the film is preferably from 30 μm to 200 μm, more preferably from 40 μm to 180 μm, even more preferably from 50 μm to 150 μm. The haze of the film is preferably from 0% to 3%, more preferably from 0% to 2%, even more preferably from 0% to 1%. Preferably, the whole light transmittance of the film is from 85% to 100%, more preferably from 89% to 100%, even more preferably from 91% to 100%. The thermal dimensional change of the film at 80° C. for 1 day is preferably from 0% to ±1%, more preferably from 0% to ±0.5%, even more preferably from 0% to ±0.3%. The moisture permeability of the film at 40° C. and 90% RH is preferably from 450 g/m$^2$·day to 1000 g/m$^2$·day, more preferably from 500 g/m$^2$ day to 900 g/m$^2$·day, even more preferably from 550 g/m$^2$ day to 800 g/m$^2$·day. The equivalent water content of the film at 25° C. and 80% RH is preferably from 1% by mass to 4% by mass, more preferably from 1.2% by mass to 3% by mass even more preferably from 1.5% by mass to 2.5% by mass.

(Surface Treatment)

The cellulose acylate film may be optionally subjected to surface treatment to thereby improve the adhesiveness between the cellulose acylate film and various functional layers (e.g., undercoat layer, back layer) adjacent thereto. The surface treatment is, for example, glow discharge treatment, UV irradiation treatment, corona treatment, flame treatment, or acid or alkali treatment. The glow discharge treatment as referred to herein is preferably low-temperature plasma treatment to be effected under a low gas pressure of from $10^{-3}$ to 20 Torr, or plasma treatment under atmospheric pressure. The plasma-exciting vapor to be used in the plasma treatment is a vapor that is excited by plasma under the condition as above. The plasma-exciting vapor includes, for example, argon, helium, neon, krypton, xenon, nitrogen, carbon dioxide, flons such as tetrafluoromethane, and their mixtures. Their details are described in Hatsumei Kyokai Disclosure Bulletin (No. 2001-1745, published by the Hatsumei Kyokai on Mar. 15, 2001), pp. 30-32. For the plasma treatment under atmospheric pressure that has become specifically noted recently, preferably used is irradiation energy of from 20 to 500 KGy under 10 to 1000 Kev, more preferably from 20 to 300 KGy under 30 to 500 Kev. Of the above-mentioned treatments, more preferred is alkali saponification, and this is extremely effective for the surface treatment of cellulose acylate films.

For the alkali saponification, the film to be processed may be dipped in a saponification solution or may be coated with it. In the dipping method, the film may be led to pass through a tank of an aqueous NaOH or KOH solution having a pH of from 10 to 14 at 20 to 80° C., taking 0.1 minutes to 10 minutes, and then neutralized, washed with water and dried.

When the alkali saponification is attained according to a coating method, employable for it are a dip-coating method, a curtain-coating method, an extrusion-coating method, a bar-coating method and an E-type coating method. The solvent for the alkali saponification coating solution is preferably so selected that the saponification solution comprising it may well wet a transparent support to which the solution is applied, and that the solvent does not roughen the surface of the transparent support and may keep the support having a good surface condition. Concretely, alcohol solvents are preferred, and isopropyl alcohol is more preferred. An aqueous solution of surfactant may also be used as the solvent. The alkali to be in the alkali saponification coating solution is preferably an alkali soluble in the above-mentioned solvent. More preferably, it is KOH or NaOH. The pH of the saponification coating solution is preferably at least 10, more preferably at least 12. Regarding the reaction condition in alkali saponification, the reaction time is preferably from 1 second to 5 minutes at room temperature, more preferably from 5 seconds to 5 minutes, even more preferably from 20 seconds to 3 minutes. After the alkali saponification treatment, it is desirable that the saponification solution-coated surface of the film is washed with water or with an acid and then further washed with water. If desired, the coating saponification treatment may be effected continuously with the alignment film removal treatment that will be mentioned hereinunder. In that manner, the number of the processing steps in producing the film may be decreased. Concretely, for example, the saponification method is described in JP-A-2002-82226 and WO02/46809.

Preferably, the film of the invention is provided with an undercoat layer for improving the adhesiveness thereof to the functional layers to be formed thereon. The under coat layer may be formed on the film after the above-mentioned surface treatment, or may be directly formed thereon with no surface treatment. The details of the undercoat layer are described in Hatsumei Kyokai Disclosure Bulletin (No. 2001-1745, published on Mar. 15, 2001 by the Hatsumei Kyokai), p. 32.

The step of surface treatment and undercoat layer formation may be carried out singly or as combined with the last step in the process of film formation. Further, the step may also be carried out along with the step of forming the functional groups to be mentioned hereinunder.

<Application of Functional Layer>

Preferably, the cellulose acylate film of the invention is combined with functional layers described in detail in Hatsumei Kyokai Disclosure Bulletin (No. 2001-1745, published on Mar. 15, 2001 by the Hatsumei Kyokai), pp. 32-45. Above all, it is desirable that the film is provided with a polarizing layer (for polarizer), an optically-compensatory layer (for optical compensatory sheet) and an antireflection layer (for antireflection film).

The thickness of the cellulose acylate film of the invention can be determined by the use. It is not particularly limited. Preferable thickness is 30 μm or more and more preferable thickness is in the rage of 30 μm to 200 μm.

(1) Formation of Polarizing Layer (Construction of Polarizer)

[Materials used for Polarizing Film]

At present, one general method for producing commercially-available polarizing films comprises dipping a stretched polymer in a solution containing iodine or dichroic dye in a bath to thereby infiltrate iodine or dichroic dye into the binder. As the polarizing film, a coated polarizing film such as typically that by Optiva Inc. may be utilized. Iodine and dichroic dye in the polarizing film are aligned in the binder and express the polarization property. The dichroic dye includes azo dyes, stilbene dyes, pyrazolone dyes, triphenylmethane dyes, quinoline dyes, oxazine dyes, thiazine dyes and anthraquinone dyes. Preferably, the dichroic dye is soluble in water. Also preferably, the dichroic dye has a hydrophilic substituent (e.g., sulfo, amino, hydroxyl). For example, the compounds described in Hatsumei Kyokai Disclosure Bulletin (No. 2001-1745, published on Mar. 15, 2001 by the Hatsumei Kyokai), p. 58 may be used as the dichroic dye herein.

For the binder for the polarizing film, usable are a polymer that is crosslinkable by itself, and a polymer that is crosslinkable with a crosslinking agent. These polymers may be combined for use herein. The binder includes, for example, methacrylate copolymers, styrene copolymers, polyolefins, polyvinyl alcohols, modified polyvinyl alcohols, poly(N-methylolacrylamides), polyesters, polyimides, vinyl acetate copolymers, carboxymethyl cellulose and polycarbonates, as in JP-A-8-338913, [0022]. In addition, a silane coupling agent may also be used as the polymer. Above all, water-soluble polymers (e.g., poly(N-methylolacrylamide), carboxymethyl cellulose, gelatin, polyvinyl alcohol, modified polyvinyl alcohol) are preferred; gelatin, polyvinyl alcohol and modified polyvinyl alcohol are more preferred; and polyvinyl alcohol and modified polyvinyl alcohol are most preferred. Especially preferably, two different types of polyvinyl alcohols or modified polyvinyl alcohols having a different degree of polymerization are combined for use herein. Preferably, the degree of saponification of polyvinyl alcohol for use herein is from 70 to 100%, more preferably from 0.80 to 100%. Also preferably, the degree of polymerization of polyvinyl alcohol is from 100 to 5000. Modified polyvinyl alcohols are described in JP-A-8-338913, JP-A-9-152509 and JP-A-9-316127. Two or more different types of polyvinyl alcohols and modified polyvinyl alcohols may be combined for use herein.

Preferably, the lowermost limit of the thickness of the binder is 10 μm. Regarding the uppermost limit of the thickness thereof, it is preferably thinner from the viewpoint of the light leakage resistance of liquid-crystal display devices comprising it. Concretely, for example, it is desirable that the thickness of the polarizing film is not larger than the same level as that of currently commercially-available polarizers (about 30 μm), more preferably it is at most 25 μm, even more preferably at most 20 μm.

The binder of the polarizing film may be crosslinked. A polymer or a monomer having a crosslinking functional group may be incorporated into the binder, or the binder polymer may be so designed that it has a crosslinking functional group by itself. The crosslinking may be attained through exposure to light or heat or through pH change, and it gives a binder having a crosslinked structure therein. The crosslinking agent is described in U.S. Reissue Pat. No. 23,297. A boron compound (e.g., boric acid, borax) may also be used as a crosslinking agent. The amount of the crosslinking agent to be added to the binder is preferably from 0.1 to 20% by mass of the binder. Within the range, the alignment of the polarizer element and the wet heat resistance of the polarizing film are both good.

After the crosslinking reaction, it is desirable that the amount of the unreacted crosslinking agent still remaining in the polarizing film is at most 1.0% by mass, more preferably at most 0.5% by mass. Within the range, the polarizing film may have good weather resistance.

[Stretching of Polarizing Film]

Preferably, the polarizing film is stretched (according to a stretching process) or rubbed (according to a rubbing process), and then dyed with an iodine or dichroic dye.

In the stretching process, the draw ratio is preferably in the range of 2.5 to 30.0 times, more preferably in the range of 3.0 to 10.0 times. The stretching may be attained in dry in air. Contrary to this, the stretching may also be attained in wet while the film is dipped in water. Preferably, the draw ratio in dry stretching is in the range of 2.5 to 5.0 times, and the draw ratio in wet stretching is in the range of 3.0 to 10.0 times. The stretching may be performed in a direction parallel to a MD direction (according to a parallel stretching), or in an oblique direction (according to an oblique stretching). The stretching may be effected once, or a few times. When the stretching is effected a few times, then the film may be more uniformly stretched even at a high draw ratio. It is more preferable that the film is stretched in an oblique direction by 10 to 80 degrees.

(I) Parallel Stretching Method

Before stretched, PVA film is swollen. The degree of swelling of the film is from 1.2 to 2.0 times (in terms of the ratio by weight of the swollen film to the unswollen film). Next, the film is continuously conveyed via guide rolls, and led into a bath of an aqueous medium or into a dyeing bath of a dichroic substance solution. In the bath, in general, the film is stretched at a bath temperature of from 15 to 50° C., preferably from 17 to 40° C. The stretching may be effected by holding the film with two pairs of nip rolls, and the conveying speed of the latter-stage nip rolls is kept higher than that of the former-stage nip rolls. In view of the above-mentioned effects and advantages, the draw ratio in stretching, ratio of length of stretched film/length of initial film (the same shall apply hereinunder) is preferably from 1.2 to 3.5 times, more preferably from 1.5 to 3.0 times. Next, the stretched film is dried at 50 to 90° C. to be a polarizing film.

(II) Oblique Stretching Method:

For this, herein employable is a stretching method that uses a tenter stretched in the oblique direction, as in JP-A-2002-86554. According to this, the film is stretched in air, and therefore it must be wetted so as to be readily stretched. Preferably, the water content of the film is from 5% to 100%, more preferably from 10% to 100%.

The stretching temperature is preferably from 40° C. to 90° C., more preferably from 50° C. to 80° C.; and the relative humidity is preferably from 50% to 100%, more preferably from 70% to 100%, even more preferably from 80% to 100%. The traveling speed in the machine direction is preferably at least 1 m/min, more preferably at least 3 m/min.

After stretched, the film is dried at 50° C. to 100° C., more preferably at 60° C. to 90° C., for 0.5 minutes to 10 minutes, more preferably for 1 minute to 5 minutes.

Thus obtained, the absorption axis of the polarizing film is preferably from 10 degrees to 80 degrees, more preferably from 30 degrees to 60 degrees, even more preferably substantially 45 degrees (40 degrees to 50 degrees).

[Bonding]

The saponified cellulose acylate film is bonded to a polarizing film prepared by stretching to thereby produce a polarizer. The direction in which the saponified cellulose acylate film adheres to the polarizing film is preferably so controlled that the casting axis direction of the cellulose acylate film crosses the stretching axis direction of the polarizer at an angle of 45 degrees. In addition, the saponified cellulose acylate film is preferably so bonded to the polarizing film that the casting axis direction of the cellulose acylate film crosses the stretching axis direction of the polarizer at an angle of 0 or 90 degrees.

Preferable bonding layer structures are as follows:

A) A/P/A;

B) A/P/B;

C) A/P/T;

D) B/P/B; and

E) B/P/T.

A is the unstretched film according to the invention, B is the stretched film according to the invention, T is the cellulose triacetate film (particularly, TAC film produced by FUJI PHOTO FILM CO., LTD.: Fujitac TD 80U), and P is the polarizing film. All of A, P and T are the alkali-saponified films. In case of structures A) and B), A and B may be cellulose acetate having the same composition, or cellulose acetate having a different composition. In case of structure A), A may be cellulose acetate having the same composition, or cellulose acetate having a different composition, and may be cellulose acetate having the same draw ratio, or cellulose acetate having a different draw ratio. In case of structure D), B may be cellulose acetate having the same composition, or cellulose acetate having a different composition, and may be cellulose acetate having the same draw ratio, or cellulose acetate having a different draw ratio. When the structures are mounted on a liquid crystal display device to be used, any side of the mounted structure may be a liquid crystal surface. In case of structures B) and E), B becomes preferably a liquid crystal side.

In general, a substrate including a liquid crystal is disposed between two sheets of polarizing plates when mounted on a liquid crystal display device. It is possible to combine structures A) to E) according to the invention and the general polarizing plate (T/P/T} structure in any manner. However, a transparent hard coat layer, an antiglare film, and an antireflection film are preferably applied to the front film of the display side of the liquid crystal display device, and the following may be used.

An adhering method for a polarizing plate is not particularly limited, and can be produced by a general method. For example, a method for alkali-treating cellulose acylate films and bonding them to both surfaces of a polarizing plate with a fully saponified polyvinyl alcohol aqueous solution may be used. Instead of the alkali-treatment, an adhesion facilitating process described in JP-A-6-94915 and JP-A-6-118232 may be performed. An adhesive to be used for bonding the treated cellulose acylate film surfaces to the polarizing plate can be exemplified by a polyvinyl alcohol-based adhesive such as polyvinyl alcohol and polyvinyl butyral (including modified polyvinyl alcohol such as an acetoacetyl group, a sulfonate group, a carboxyl group and an oxyalkylene group), a vinyl latex such as butyl acrylate, a boron compound aqueous solution, or the like. Preferably, a polyvinyl alcohol-based adhesive is used. After a drying treatment, the thickness of an adhesive layer is preferably in the range of 0.01 to 10 μm, and more preferably in the range of 0.05 to 5 μm. A typical polarizing plate is configured with a polarizing plate and protecting films for protecting both surfaces thereof (cellulose acylate film), and additionally, is configured with a protective film bonded on one surface of the polarizing plate and a separate film bonded to the opposing surface. The protective film and the separate film are used to protect the polarizing plate when the polarizing plate is shipped and checked.

In this case, the protective film is bonded to protect the surface of the polarizing plate and disposed on the surface of the polarizing plate opposing to the surface to which a liquid crystal plate is bonded. The separate film is used to cover the adhesion layer to which the liquid crystal plate is bonded, and disposed on the surface of the polarizing plate to which the liquid crystal plate is bonded. In a liquid crystal display device, a substrate including a liquid crystal is generally disposed between two sheets of polarizing plates. However, the polarizing plate protecting film using the cellulose acylate film according to the invention can obtain an excellent display property even when it is arranged anywhere. In particular, since a transparent hard coat layer, an antiglare film, an antireflection film, etc. are provided on the polarizing plate protecting film of the front surface in the display side of the liquid crystal display device, the polarizing plate protecting film according to the invention is preferably used in such portion.

The light transmittance of the thus-obtained polarizer is preferably higher, and the degree of polarization thereof is also preferably higher. Concretely, the transmittance of the polarizer preferably falls between 30 and 50% for the light having a wavelength of 550 nm, more preferably between 35 and 50%, most preferably between 40 and 50%. The degree of polarization of the polarizer preferably falls between 90 and 100% for the light having a wavelength of 550 nm, more preferably between 95 and 100%, most preferably between 99 and 100%.

Further, the thus-constructed polarizer may be laminated with a λ/4 plate to form a circularly-polarizing plate. In this case, the two are so laminated that the slow axis of the λ/4 plate meets the absorption axis of the polarizer at an angle of 45 degrees. In this, the λ/4 plate is not specifically defined but preferably has a wavelength dependency of such that its retardation is smaller at a lower wavelength. Further, it is also desirable to use a λ/4 plate that comprises a polarizing film of which the absorption axis is inclined by 20 to 70° relative to the machine direction and an optically-anisotropic layer of a liquid-crystalline compound.

(2) Formation of Optical Compensatory Layer (Construction of Optical Compensatory Sheet):

An optically-anisotropic layer is for compensating the liquid-crystalline compound in a liquid-crystal cell at the time of black level of display in liquid-crystal display devices, and an optical compensatory sheet may be constructed by forming an alignment film on a cellulose acylate film followed by further forming thereon an optically-anisotropic layer.

[Alignment Film]

An alignment film is provided on the cellulose acylate optical film that has been processed for surface treatment as above. The film has the function of defining the alignment direction of liquid-crystal molecules. However, if a liquid-crystalline compound can be aligned and then its alignment state can be fixed as such, then the alignment film is not indispensable as a constitutive element, and may be therefore omitted as not always needed. In this case, only the optically-anisotropic layer on the alignment film of which the alignment state has been fixed may be transferred onto a polarizing element to construct the polarizer of the invention.

The alignment film may be formed, for example, through rubbing treatment of an organic compound (preferably polymer), oblique vapor deposition of an inorganic compound, formation of a microgrooved layer, or accumulation of an organic compound (e.g., ω-tricosanoic acid, dioctadecylmethylammonium chloride, methyl stearate) according to a Langmuir-Blodgett's method (LB film). Further, there are known other alignment films that may have an alignment function through impartation of an electric field or magnetic field thereto or through light irradiation thereto.

The alignment film is preferably formed through rubbing treatment of a polymer. In principle, the polymer to be used for the alignment film has a molecular structure that has the function of aligning liquid-crystalline molecules.

Preferably, the polymer for use in the invention has a crosslinking functional group (e.g., double bond)-having side branches bonded to the backbone chain thereof or has a crosslinking functional group having the function of aligning liquid-crystalline molecules introduced into the side branches thereof, in addition to having the function of aligning liquid-crystalline molecules.

The polymer to be used for the alignment film may be a polymer that is crosslinkable by itself or a polymer that is crosslinkable with a crosslinking agent, or may also be a combination of the two. Examples of the polymer are methacrylate copolymers, styrene copolymers, polyolefins, polyvinyl alcohols and modified polyvinyl alcohols, poly(N-methylolacrylamides), polyesters, polyimides, vinyl acetate copolymers, carboxymethyl cellulose and polycarbonates, as in JP-A-8-338913, [0022]. A silane coupling agent is also usable as the polymer. Preferably, the polymer is a water-soluble polymer (e.g., poly(N-methylolacrylamide), carboxymethyl cellulose, gelatin, polyvinyl alcohol, modified polyvinyl alcohol), more preferably gelatin, polyvinyl alcohol and modified polyvinyl alcohol, most preferably polyvinyl alcohol and modified polyvinyl alcohol. Especially preferably, two different types of polyvinyl alcohols or modified polyvinyl alcohols having a different degree of polymerization are combined for use as the polymer. Preferably, the degree of saponification of polyvinyl alcohol for use herein is from 70 to 100%, more preferably from 80 to 100%. Also preferably, the degree of polymerization of polyvinyl alcohol is from 100 to 5000.

The side branches having the function of aligning liquid-crystalline molecules generally have a hydrophobic group as the functional group. Concretely, the type of the functional group may be determined depending on the type of the liquid-crystalline molecules to be aligned and on the necessary alignment state of the molecules. For example, the modifying group of modified polyvinyl alcohol may be introduced into the polymer through copolymerization modification, chain transfer modification or block polymerization modification. Examples of the modifying group are a hydrophilic group (e.g., carboxylic acid group, sulfonic acid group, phosphonic acid group, amino group, ammonium group, amide group, thiol group), a hydrocarbon group having from 10 to 100 carbon atoms, a fluorine atom-substituted hydrocarbon group, a thioether group, a polymerizing group (e.g., unsaturated polymerizing group, epoxy group, aziridinyl group), and an alkoxysilyl group (e.g., trialkoxy group, dialkoxy group, monoalkoxy group). Specific examples of such modified polyvinyl alcohol compounds are described, for example, in JP-A-2000-155216, [0022] to [0145], and in JP-A-2002-62426, [0018] to [0022].

When crosslinking functional group-having side branches are bonded to the backbone chain of an alignment film polymer, or when a crosslinking functional group is introduced into the side chains of a polymer having the function of aligning liquid-crystalline molecules, then the polymer of the alignment film may be copolymerized with the polyfunctional monomer in an optically-anisotropic layer. As a result, not only between the polyfunctional monomers but also between the alignment film polymers, and even between the polyfunctional monomer and the alignment film polymer, they may be firmly bonded to each other in a mode of covalent bonding to each other. Accordingly, introducing such a crosslinking functional group into an alignment film polymer significantly improves the mechanical strength of the resulting optical compensatory sheet.

Preferably, the crosslinking functional group of the alignment film polymer contains a polymerizing group, like the polyfunctional monomer. Concretely, for example, those described in JP-A-2000-155216, [0080] to [0100] are referred to herein. Apart from the above-mentioned crosslinking functional group, the alignment film polymer may also be crosslinked with a crosslinking agent.

The crosslinking agent includes, for example, aldehydes, N-methylol compounds, dioxane derivatives, compounds capable of being active through activation of the carboxyl group thereof, active vinyl compounds, active halide compound, isoxazoles and dialdehyde starches. Two or more different types of crosslinking agents may be combined for use herein. Concretely, for example, the compounds described in JP-A-2002-62426, [0023] to [0024] are employable herein. Preferred are aldehydes of high reactivity, and more preferred is glutaraldehyde.

Preferably, the amount of the crosslinking agent to be added to polymer is from 0.1 to 20% by mass of the polymer, more preferably from 0.5 to 15% by mass. Also preferably, the amount of the unreacted crosslinking agent that may remain in the alignment film is at most 1.0% by mass, more preferably at most 0.5% by mass. When the crosslinking agent in the alignment film is controlled to that effect, then the film ensures good durability with no reticulation even though it is used in liquid-crystal display devices for a long period of time and even though it is left in a high-temperature high-humidity atmosphere for a long period of time.

Basically, the alignment film may be formed by applying the alignment film-forming material of the above-mentioned polymer to a crosslinking agent-containing transparent support, then heating and drying it (for crosslinking it) and then rubbing the thus-formed film. The crosslinking reaction may be effected in any stage after the film-forming material has been applied onto the transparent support, as so mentioned hereinabove. When a water-soluble polymer such as polyvinyl alcohol is used as the alignment film-forming material, then it is desirable that the solvent for the coating solution is a mixed solvent of a defoaming organic solvent (e.g., methanol) and water. The ratio by mass of water/methanol preferably falls between 0/100 and 99/1, more preferably between 0/100 and 91/9. The mixed solvent of the type is effective for preventing the formation of bubbles in the coating solution and, as a result, the surface defects of the alignment film and even the optically-anisotropic layer are greatly reduced.

For forming the alignment film, preferably employed is a spin-coating method, a dip-coating method, a curtain-coating method, an extrusion-coating method, a rod-coating method or a roll-coating method. Especially preferred is a rod-coating method. Also preferably, the thickness of the film is from 0.1 to 10 μm, after dried. The drying under heat may be effected at 20 to 110° C. For sufficient crosslinking, the heating temperature is preferably from 60 to 100° C., more preferably from 80 to 100° C. The drying time may be from 1 minute to 36 hours, but preferably from 1 to 30 minutes. The pH of the coating solution is preferably so defined that it is the best for the crosslinking agent used. For example, when glutaraldehyde is used, the pH of the coating solution is preferably from 4.5 to 5.5, more preferably 5.

The alignment film is provided on the transparent support or on the undercoat layer. The alignment film may be formed by crosslinking the polymer layer as above, and then rubbing the surface of the layer.

For the rubbing treatment, usable is any method widely employed for liquid crystal alignment treatment for LCD. Concretely, for example, the surface of the alignment film is rubbed in a predetermined direction by the use of paper, gauze, felt, rubber, nylon, or polyester fibers, whereby the film may be aligned in the intended direction. In general, a cloth uniformly planted with fibers having the same length and the same thickness is used, and the surface of the film is rubbed a few times with the cloth.

On an industrial scale, the operation may be attained by contacting a rolling rubbing roll to a polarizing layer-having film that is traveling in the system. Preferably, the circularity, the cylindricity, and the deflection (eccentricity) of the rubbing roll are all at most 30 μm each. Also preferably, the lapping angle of the film around the rubbing roll is from 0.1 to 90°. However, the film may be lapped at an angle of 360° or more for stable rubbing treatment, as in JP-A-8-160430. Preferably, the film traveling speed is from 1 to 100 m/min. The rubbing angle may fall between 0 and 60°, and it is desirable that a suitable rubbing angle is selected within the range. When the film is used in liquid-crystal display devices, the rubbing angle is preferably from 40 to 50°, more preferably 45°.

The thickness of the alignment film thus obtained is preferably from 0.1 to 10 μm.

Next, the liquid-crystalline molecules of the optically-anisotropic layer are aligned on the alignment film. Afterward, if desired, the polyfunctional monomers in the alignment film polymer and the optically-anisotropic layer are reacted, or the alignment film polymer is crosslinked with a crosslinking agent.

The liquid-crystalline molecules for use in the optically-anisotropic layer include rod-shaped liquid-crystalline molecules and discotic liquid-crystalline molecules. The rod-shaped liquid-crystalline molecules and the discotic liquid-crystalline molecules may be high-molecular liquid crystals or low-molecular liquid crystals. In addition, they include crosslinked low-molecular liquid crystals that do not exhibit liquid crystallinity.

[Rod-Shaped Liquid-Crystalline Molecules]

The rod-shaped liquid-crystalline molecules are preferably azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles.

The rod-shaped liquid-crystalline molecules include metal complexes. Liquid-crystal polymers that contain rod-shaped liquid-crystalline molecules in the repetitive units thereof are also usable herein as the rod-shaped liquid-crystalline molecules. In other words, the rod-shaped liquid-crystalline molecules for use herein may bond to a (liquid-crystal) polymer.

Rod-shaped liquid-crystalline molecules are described in Quarterly Journal of General Chemistry, Vol. 22, Liquid Crystal Chemistry (1994), Chaps. 4, 7 and 11, edited by the Chemical Society of Japan; Liquid Crystal Devices Handbook, edited by the 142nd Committee of the Nippon Academic Promotion, Chap. 3.

The birefringence of the rod-shaped liquid-crystalline molecule preferably falls between 0.001 and 0.7.

Preferably, the rod-shaped liquid-crystalline molecules have a polymerizing group for fixing their alignment state. The polymerizing group is preferably a radical-polymerizing unsaturated group or a cationic polymerizing group. Concretely, for example, there are mentioned the polymerizing groups and the polymerizing liquid-crystal compounds described in JP-A-2002-62427, [0064] to [0086].

[Discotic Liquid-Crystalline Molecules]

The discotic liquid-crystalline molecules include, for example, benzene derivatives as in C. Destrade et al's study report, Mol. Cryst., Vol. 71, p. 111 (1981); truxene derivatives as in C. Destrade et al's study report, Mol. Cryst., Vol. 122, p. 141 (1985), Physics Lett. A., Vol. 78, p. 82 (1990); cyclohexane derivatives as in B. Kohne et al's study report, Angew. Chem., Vol. 96, p. 70 (1984); and azacrown-type or phenylacetylene-type macrocycles as in J. M. Lehn et al's study report, J. Chem. Commun., p. 1794 (1985), J. Zhang et al's study report, J. Am. Chem. Soc., Vol. 116, p. 2655 (1994).

The discotic liquid-crystalline molecules include liquid-crystalline compounds in which the molecular center nucleus is radially substituted with side branches of a linear alkyl, alkoxy or substituted benzoyloxy group. Preferably, the molecules or the molecular aggregates of the compounds are rotary-symmetrical and may undergo certain alignment. It is not always necessary that, in the optically-anisotropic layer formed of such discotic liquid-crystalline molecules, the compounds that are finally in the optically-anisotropic layer are discotic liquid-crystalline molecules. For example, low-molecular discotic liquid-crystalline molecules may have a group capable of being reactive when exposed to heat or light, and as a result, they may polymerize or crosslink through thermal or optical reaction to give high-molecular compounds with no liquid crystallinity. Preferred examples of the discotic liquid-crystalline molecules are described in JP-A-8-50206. Polymerization of discotic liquid-crystalline molecules is described in JP-A-8-27284.

For fixing the discotic liquid-crystalline molecules through polymerization, the discotic core of the discotic liquid-crystalline molecules must be substituted with a polymerizing group. Preferably, the polymerizing group bonds to the discotic core via a linking group. Accordingly, the compounds of the type may keep their alignment state even after their polymerization. For example, there are mentioned the compounds described in JP-A-2000-155216, [0151] to [0168].

In hybrid alignment, the angle between the major axis (disc plane) of the discotic liquid-crystalline molecules and the plane of the polarizing film increases or decreases with the increase in the distance from the plane of the polarizing film in the depth direction of the optically-anisotropic layer. Preferably, the angle decreases with the increase in the distance. The angle change may be in any mode of continuous increase, continuous decrease, intermittent increase, intermittent decrease, change including continuous increase and continuous decrease, or intermittent change including increase and decrease. The intermittent change includes a region in which the tilt angle does not change in the midway of the thickness direction. The angle may include a region with no angle change so far as it increases or decreases as a whole. Preferably, the angle continuously varies.

The mean direction of the major axis of the discotic liquid-crystalline molecules on the polarizing film side may be controlled generally by suitably selecting the material of the discotic liquid-crystalline molecules or that of the alignment film or by suitably selecting the rubbing treatment method. The direction of the major axis of the discotic liquid-crystalline molecules (disc plane) on the surface side (on the external air side) may be controlled generally by suitably selecting the material of the discotic liquid-crystalline molecules or that of the additive to be used along with the discotic liquid-crystalline molecules. Examples of the additive that may be used along with the discotic liquid-crystalline molecules include, for example, plasticizer, surfactant, polymerizing monomer and polymer. Like in the above, the degree of the change of the major axis in the alignment direction may also be controlled by suitably selecting the liquid-crystalline molecules and the additive.

[Other Composition of Optically-Anisotropic Layer]

Along with the above-mentioned liquid-crystalline molecules, a plasticizer, a surfactant, a polymerizing monomer and others may be added to the optically-anisotropic layer for improving the uniformity of the coating film, the strength of the film and the alignment of the liquid-crystalline molecules in the film. Preferably, the additives have good compatibility with the liquid-crystalline molecules that constitute the layer and may have some influence on the tilt angle change of the liquid-crystalline molecules, not interfering with the alignment of the molecules.

The polymerizing monomer includes radical-polymerizing or cationic-polymerizing compounds. Preferred are polyfunctional radical-polymerizing monomers. Also preferred are those copolymerizable with the above-mentioned, polymerizing group-containing liquid-crystal compounds. For example, herein mentioned are the compounds described in JP-A-2002-296423, [0018] to [0020]. The amount of the compound to be added to the layer may be generally from 1 to 50% by mass of the discotic liquid-crystalline molecules in the layer, but preferably from 5 to 30% by mass.

The surfactant may be any known one, but is preferably a fluorine-containing compound. Concretely, for example, there are mentioned the compounds described in JP-A-2001-330725, [0028] to [0056].

The polymer that may be used along with the discotic liquid-crystalline molecules is preferably one capable of changing the tilt angle of the discotic liquid-crystalline molecules.

Examples of the polymer are cellulose esters. Preferred examples of cellulose esters are described in JP-A-2000-155216, [0178]. So as not to interfere with the alignment of the liquid-crystalline molecules in the layer, the amount of the polymer to be added to the layer is preferably from 0.1 to 10% by mass of the liquid-crystalline molecules, more preferably from 0.1 to 8% by mass.

Preferably, the discotic nematic liquid-crystal phase/solid phase transition temperature of the discotic liquid-crystalline molecules falls between 70 and 300° C., more preferably between 70 and 170° C.

[Formation of Optically-Anisotropic Layer]

The optically-anisotropic layer may be formed by applying a coating solution that contains liquid-crystalline molecules and optionally a polymerization initiator and other optional components mentioned below, on the alignment film.

The solvent to be used in preparing the coating solution is preferably an organic solvent. Examples of the organic solvent are amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone), ethers (e.g., tetrahydrofuran, 1,2-dimethoxyethane). Of those, preferred are alkyl halides and ketones. Two or more such organic solvents may be used as combined.

The coating solution may be applied onto the alignment film in any known method (e.g., wire bar coating, extrusion coating, direct gravure coating, reverse gravure coating, die coating).

The thickness of the optically-anisotropic layer is preferably from 0.1 to 20 μm, more preferably from 0.5 to 15 μm, most preferably from 1 to 10 μm.

[Fixation of Alignment State of Liquid-Crystalline Molecules]

The aligned liquid-crystalline molecules may be fixed as they are in an alignment state. Preferably, the fixation is effected through polymerization. The polymerization includes thermal polymerization with a thermal polymerization initiator and optical polymerization with an optical polymerization initiator. Preferred is optical polymerization.

The optical polymerization initiator includes, for example, α-carbonyl compounds (as in U.S. Pat. Nos. 2,367,661, 2,367,670), acyloin ethers (as in U.S. Pat. No. 2,448,828), α-hydrocarbon-substituted aromatic acyloin compounds (as in U.S. Pat. No. 2,722,512), polynuclear quinone compounds (as in U.S. Pat. Nos. 3,046,127, 2,951,758), combination of triarylimidazole dimer and p-aminophenylketone (as in U.S. Pat. No. 3,549,367), acridine compounds and phenazine compounds (as in JP-A-60-105667, U.S. Pat. No. 4,239,850), and oxadiazole compounds (as in U.S. Pat. No. 4,212,970).

The amount of the optical polymerization initiator to be added is preferably from 0.01 to 20% by mass of the solid content of the coating solution, more preferably from 0.5 to 5% by mass.

Preferably, UV rays are used for light irradiation for polymerization of liquid-crystalline molecules.

Preferably, the irradiation energy falls within a range of from 20 mJ/cm$^2$ to 50 J/cm$^2$, more preferably from 20 to 5000 mJ/cm$^2$, even more preferably from 100 to 800 mJ/cm$^2$. For promoting the optical polymerization, the light irradiation may be effected under heat.

A protective layer may be provided on the optically-anisotropic layer.

Preferably, the optical compensatory film may be combined with a polarizing film. Concretely, the above-mentioned optically-anisotropic layer-coating solution is applied onto the surface of a polarizing film to from an optically-anisotropic layer thereon. As a result, no polymer film exists between the polarizing film and the optically-anisotropic layer, and a thin polarizer is thus constructed of which the stress (strain×cross section×elasticity) to be caused by the dimensional change of the polarizing film is reduced. When the polarizer of the invention is fitted to large-size liquid-crystal display devices, then it does not produce a problem of light leakage and the devices can display high-quality images.

Preferably, the polarizing film and the optically-compensatory layer are so stretched that the tilt angle between the two may correspond to the angle formed by the transmission axis of the two polarizers to be stuck to both sides of the liquid crystal cell to constitute liquid crystal display device, and the machine direction or the transverse direction of the liquid crystal cells. In general, the tilt angle is 45°. Recently, however, some devices in which the tile angle is not always 45° have been developed for transmission-type, reflection-type or semi-transmission-type liquid crystal display devices, and it is desirable that the stretching direction is varied in any desired manner depending on the plan of liquid crystal display devices.

<Type of Liquid Crystal Display Device>

(Application to Liquid Crystal Display)

The cellulose acylate film according to the invention, and a retardation plate, the optical compensatory sheet and the polarizing plate using the cellulose acylate film can be used for various display modes of liquid crystal display devices. The display mode includes TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), and HAN (Hybrid Aligned Nematic). In addition, the display mode includes modes in which the alignment is divided in the above-mentioned display modes.

The cellulose acylate film according to the invention is effectively used in any display-type liquid crystal display device. In addition, it is also effectively used in any one of transmission-type, reflection-type and transreflection-type liquid crystal display devices. The cellulose acylate film according to the invention may be used as a support of an optical compensation sheet of a TN-type liquid crystal display device having a TN-mode liquid crystal cell. The cellulose acylate film according to the invention may be used as a support of an optical compensation sheet of a STN-type liquid crystal display device having a STN-mode liquid crystal cell.

In general, in the STN-type liquid crystal display device, rod-shaped liquid-crystalline molecules in the liquid crystal cell are aligned at an angle in the range of 90 to 360°, and the product (Δnd) of refractive index anisotropy (Δn) of the rod-shaped liquid-crystalline molecules and a cell gap (d) is in the range of 300 to 1500 nm. The optical compensation sheet used for the STN-type liquid crystal display device is described in JP-A-2000-105316. In particular, the cellulose acylate film according to the invention is advantageously used as a support of an optical compensation sheet of a VA-type liquid crystal display device having a VA-mode liquid crystal cell. The cellulose acylate film according to the invention is also advantageously used as supports of optical compensation sheets of an OCB-type liquid crystal display device having an OCB-mode liquid crystal cell and a HAN-type liquid crystal display device having a HAN-mode liquid crystal cell.

The cellulose acylate film according to the invention is also advantageously used as optical compensation sheets of reflective TN-type, STN-type, HAN-type, and GH (Guest-Host)-type liquid crystal display devices. The display modes are well known since early times. The TN-type reflection-type liquid crystal display device is described in JP-A-10-123478, Pamphlet of International Publication WO 98/48320, and Japanese Patent No. 3022477. The optical compensation sheet used for the reflection-type liquid crystal display device is described in Pamphlet of International Publication WO 00/65384. The cellulose acylate film according to the invention is also advantageously used as a support of an optical compensation sheet of an ASM-type liquid crystal display device having an ASM (Axially Symmetric Aligned Microcell)-mode liquid crystal cell. The ASM-mode liquid crystal cell is characterized in that the cell thickness thereof is held by a position-adjustable resin spacer.

Its other characteristics thereof are the same as those of the TN-mode liquid crystal cell. The ASM-mode liquid crystal cell and the ASM-type liquid crystal display device are described in a paper by Kume et al. (Kume et al., SID 98 Digest 1089 (1998)). The above-described use of the cellulose derivative film according to the invention is described in detail in Hatsumei Kyokai Disclosure Bulletin (No. 2001-1745, published by Hatsumei Kyokai, on Mar. 15, 2001) pages 45 to 59.

(TN-Mode Liquid-Crystal Display Device)

A TN-mode is most popularly utilized in color TFT liquid-crystal display devices, and this is described in a large number of references. The alignment state in the liquid-crystal cell at the time of black level of TN-mode display is as follows: The rod-shaped liquid-crystalline molecules stand up in the center of the cell, and they lie down at around the substrate of the cell.

(OCB-Mode Liquid-Crystal Display Device)

This is a bent-alignment mode liquid-crystal cell in which the rod-shaped liquid-crystalline molecules are aligned substantially in the opposite directions (symmetrically) between the upper part and the lower part of the liquid-crystal cell. The liquid-crystal display device that comprises such a bent-alignment mode liquid-crystal cell is disclosed in U.S. Pat. Nos. 4,583,825 and 5,410,422. In this, since the rod-shaped liquid-crystalline molecules are symmetrically aligned in the upper part and the lower part of the liquid-crystal cell, the bent-alignment mode liquid-crystal cell has a self-optically-compensatory function. Accordingly, the liquid-crystal mode of the type is referred to as an OCB (optically-compensatory bent) liquid-crystal mode.

Regarding the alignment state at the time of black level of display in the OCB-mode liquid-crystal cell, the rod-shaped liquid-crystalline molecules stand up in the center of the cell, and they lie down at around the substrate of the cell, like in the TN-mode liquid-crystal cell.

(VA-Mode Liquid-Crystal Display Device)

This is characterized in that the rod-shaped liquid-crystalline molecules therein are substantially vertically aligned in the absence of voltage application thereto. The VA-mode liquid-crystal cell includes (1) a VA-mode liquid-crystal cell in the narrow sense of the word, in which the rod-shaped liquid-crystalline molecules are substantially vertically aligned in the absence of voltage application thereto but are substantially horizontally aligned in the presence of voltage application thereto (as in JP-A-2-176625), further including in addition to it, (2) a multi-domain VA-mode (MVA-mode) liquid crystal cell for viewing angle expansion (as in SID97, Digest of Tech. Papers (preprint), 28 (1997) 845), (3) an n-ASM-mode liquid-crystal cell in which the rod-shaped liquid-crystalline molecules are substantially vertically aligned in the absence of voltage application thereto but are subjected to twisted multi-domain alignment in the presence of voltage application thereto (as in the preprint in the Nippon Liquid Crystal Discussion Meeting, 58-59 (1998)), and (4) a SURVAIVAL-mode liquid-crystal cell (as announced in LCD International 98).

(IPS-Mode Liquid Crystal Display Device)

An IPS-mode liquid crystal display device is characterized in that rod-shaped liquid-crystalline molecules are substantially horizontally aligned in an in-plane direction with no application of a voltage and this alignment changes an alignment direction of liquid crystal in accordance with whether a voltage is applied or not for switching. Specifically, the liquid crystal display devices described in JP-A-2004-365941, JP-A-2004-12731, JP-A-2004-215620, JP-A-2002-221726, JP-A-2002-55341, and JP-A-2003-195333 are employable herein.

(Other Liquid-Crystal Display Devices)

ECB-mode and STN-mode liquid-crystal display devices may be optically compensated in the same consideration as above.

<Antireflection Film>

In general, an antireflection film is constructed by forming a low-refractivity layer that functions as a stain-preventing layer, and at least one layer having a higher refractivity than that of the low-refractivity layer (high-refractivity layer or middle-refractivity layer) on a transparent substrate.

A multi-layer film is formed by laminating transparent thin films of inorganic compounds (e.g., metal oxides) having a different refractivity, for example, in a mode of chemical vapor deposition (CVD) or physical vapor deposition (PVD); or a film of colloidal metal oxide particles is formed according to a sol-gel process with a metal compound such as a metal oxide, and then this is post-treated (e.g., UV irradiation as in JP-A-9-157855, or plasma treatment as in JP-A-2002-327310) to give a thin film.

On the other hand, various types of antireflection films of high producibility are proposed, which are formed by laminating thin films of inorganic particles dispersed in a matrix. The antireflection films produced according to the above-mentioned coating methods may be further processed so that the surface of the outermost layer thereof is roughened to have an antiglare property.

The cellulose acylate film of the invention may be applied to any type as above. Especially preferably, the film is applied to film construction in a layers-coating system (layers-coated films).

[Layer Constitution of Layers-Coated Antireflection Film]

The antireflection film having a layer constitution of at least a middle-refractivity layer, a high-refractivity layer and a low-refractivity layer (outermost layer) formed in that order on a substrate is so planned that it satisfies the refractivity profile mentioned below.

Refractivity of high-refractivity layer>refractivity of middle-refractivity layer>refractivity of transparent support>refractivity of low-refractivity layer.

A hard coat layer may be disposed between the transparent support and the middle-refractivity layer.

Further, the film may comprise a middle-refractivity hard coat layer, a high-refractivity layer and a low-refractivity layer.

For example, JP-A-8-122504, JP-A-8-110401, JP-A-10-300902, JP-A-2002-243906, JP-A-2000-111706 are referred to. The constitutive layers may have other functions. For example, there are mentioned a stain-resistant low-refractivity layer and an antistatic high-refractivity layer (for example, as in JP-A-10-206603, JP-A-2002-243906).

Preferably, the haze of the antireflection film is at most 5%, more preferably at most 3%. Also preferably, the strength of the film is at least 1H measured in the pencil hardness test according to JIS K5400, more preferably at least 2H, most preferably at least 3H.

[High-Refractivity Layer and Middle-Refractivity Layer]

The high-refractivity layer of the antireflection film is formed of a cured film that contains at least ultrafine particles of an inorganic compound of high refractivity having a mean particle size of at most 100 nm and a matrix binder.

The high-refractivity inorganic compound particles are those of an inorganic compound having a refractivity of at least 1.65, preferably at least 1.9. The inorganic compound particles are, for example, those of a metal oxide with any of Ti, Zn, Sb, Sn, Zr, Ce, Ta, La and In, and those of a composite oxide with such metal atoms.

For example, the ultrafine particles may be processed with a surface-treating agent (e.g., silane coupling agent as in JP-A-11-295503, JP-A-11-153703, JP-A-2000-9908; anionic compound or organic metal coupling agent as in JP-A-2001-310432); or they may have a core/shell structure in which the core is a high-refractivity particle (e.g., as in JP-A-2001-166104); or they may be combined with a specific dispersant (e.g., as in JP-A-11-153703, U.S. Pat. No. 6,210,858 B1, JP-A-2002-2776069).

The material to from the matrix may be any known thermoplastic resin or curable resin film.

For the material, also preferred is at least one composition selected from a polyfunctional compound-containing composition in which the compound has at least two radical-polymerizing and/or cationic-polymerizing groups, and a composition of a hydrolyzing group-containing organic metal compound or its partial condensate. For these compounds, for example, referred to are the compounds described in JP-A-2000-47004, JP-A-2001-315242, JP-A-2001-31871 and JP-A-2001-296401.

Also preferred is a curable film formed of a colloidal metal oxide obtained from a hydrolyzed condensate of a metal alkoxide, and a metal alkoxide composition. For example, it is described in JP-A-2001-293818.

The refractivity of the high-refractivity layer is generally from 1.70 to 2.20. Preferably, the thickness of the high-refractivity layer is from 5 nm to 10 μm, more preferably from 10 nm to 1 μm.

The refractivity of the middle-refractivity layer is so controlled that it may be between the refractivity of the low-refractivity layer and that of the high-refractivity layer. Preferably, the refractivity of the middle-refractivity layer is from 1.50 to 1.70.

[Low-Refractivity Layer]

The low-refractivity layer is laminated on the high-refractivity layer in order. The refractivity of the low-refractivity layer may be, for example, from 1.20 to 1.55, but preferably from 1.30 to 1.50.

Preferably, the low-refractivity layer is constructed as the outermost layer having good scratch resistance and good stain resistance. For significantly increasing the scratch resistance of the layer, it is effective to lubricate the surface of the layer. For it, for example, employable is a method of forming a thin layer that contains a conventional silicone compound or fluorine-containing compound introduced thereinto.

Preferably, the refractivity of the fluorine-containing compound is from 1.35 to 1.50, more preferably from 1.36 to 1.47. Also preferably, the fluorine-containing compound has a crosslinking or polymerizing functional group that contains a fluorine atom in an amount of from 35 to 80% by mass.

For example, herein usable are the compounds described in JP-A-9-222503, [0018] to [0026]; JP-A-11-38202, [0019] to [0030]; JP-A-2001-40284, [0027] to [0028]; JP-A-2000-284102.

Preferably, the silicone compound has a polysiloxane structure in which the polymer chain contains a curable functional group or a polymerizing functional group, and it forms a film having a crosslinked structure therein. For example, it includes reactive silicones (e.g., Silaplane by Chisso), and polysiloxanes double-terminated with a silanol group (as in JP-A-11-258403).

Preferably, the crosslinking or polymerizing group-having, fluorine-containing and/or siloxane polymer is crosslinked or polymerized simultaneously with or after the coating operation with the coating composition to form the outermost layer that contains a polymerization initiator and a sensitizer, by exposing the coating layer to light or heat.

Also preferred is a sol-gel curable film which comprises an organic metal compound such as a silane coupling agent and a specific fluorine-containing hydrocarbon group-having silane coupling agent and in which they are condensed in the presence of a catalyst to cure the film.

For example, there are mentioned a polyfluoroalkyl group-containing silane compound or its partial hydrolyzed condensate (as in JP-A-58-142958, JP-A-58-147483, JP-A-58-147484, JP-A-9-157582, JP-A-11-106704), and a silyl compound having a fluorine-containing long-chain group, poly(perfluoroalkylether) group (as in JP-A-2000-117902, JP-A-2001-48590, JP-A-2002-53804).

As other additives than the above, the low-refractivity layer may contain a filler (e.g., low-refractivity inorganic compound of which the primary particles have a mean particle size of from 1 to 150 nm, such as silicon dioxide (silica), fluorine-containing particles (magnesium fluoride, calcium fluoride, barium fluoride); organic fine particles described in JP-A-11-3820, [0020] to [0038]), a silane coupling agent, a lubricant, a surfactant, etc.

When the low-refractivity layer is positioned below an outermost layer, then it may be formed according to a vapor-phase process (e.g., vacuum evaporation, sputtering, ion plating, plasma CVD). However, a coating method is preferred as it produces the layer at low costs.

Preferably, the thickness of the low-refractivity layer is from 30 to 200 nm, more preferably from 50 to 150 nm, most preferably from 60 to 120 nm.

[Hard Coat Layer]

A hard coat layer may be disposed on the surface of a transparent support for increasing the physical strength of the antireflection film to be thereon. In particular, the layer is preferably disposed between a transparent support and the above-mentioned high-refractivity layer.

Also preferably, the hard coat layer is formed through crosslinking or polymerization of an optical and/or thermal curable compound. The curable functional group is preferably a photopolymerizing functional group, and the hydrolyzing functional group-containing organic metal compound is preferably an organic alkoxysilyl compound.

Specific examples of the compounds may be the same as those mentioned hereinabove for the high-refractivity layer.

Specific examples of the constitutive composition for the hard coat layer are described in, for example, JP-A-2002-144913, JP-A-2000-9908, and WO00/46617.

The high-refractivity layer may serve also as a hard coat layer. In such a case, it is desirable that fine particles are added to and finely dispersed in the hard coat layer in the same manner as that mentioned hereinabove for the formation of the high-refractivity layer.

Containing particles having a mean particle size of from 0.2 to 10 μm, the hard coat layer may serve also as an antiglare layer (this will be mentioned hereinunder) having an antiglare function.

The thickness of the hard coat layer may be suitably determined in accordance with the use thereof. Preferably, for example, the thickness of the hard coat layer is from 0.2 to 10 μm, more preferably from 0.5 to 7 μm.

Preferably, the strength of the hard coat layer is at least 1H as measured in the pencil hardness test according to JIS K5400, more preferably at least 2H, most preferably at least 3H. Also preferably, the abrasion of the test piece of the layer before and after the taper test according to JIS K5400 is as small as possible.

[Front-Scattering Layer]

A front-scattering layer may be provided for improving the viewing angle on the upper and lower sides and on the right and left sides of liquid-crystal display devices to which the film is applied. Fine particles having a different refractivity may be dispersed in the hard coat layer, and the resulting hard coat layer may serve also as a front-scattering layer. For it, for example, referred to are JP-A-11-38208 in which the front-scattering coefficient is specifically defined; JP-A-2000-199809 in which the relative refractivity of transparent resin and fine particles is defined to fall within a specific range; and JP-A-2002-107512 in which the haze value is defined to be at least 40%.

[Other Layers]

In addition to the above-mentioned layers, the film may further has a primer layer, an antistatic layer, an undercoat layer, a protective layer, etc.

[Coating Method]

The constitutive layers of the antireflection film may be formed in various coating methods of, for example, dip coating, air knife coating, curtain coating, roller coating, wire bar coating, gravure coating, microgravure coating or extrusion coating (as in U.S. Pat. No. 2,681,294).

[Antiglare Function]

The antireflection film may have an antiglare function of scattering external light. The film may have the antiglare function by roughening its surface. When the antireflection film has the antiglare function, then its haze is preferably from 3 to 30%, more preferably from 5 to 20%, most preferably from 7 to 20%.

For roughening the surface of the antireflection film, employable is any method in which the roughened surface profile may be kept well. For example, there are mentioned a method of adding fine particles to a low-refractivity layer so as to roughen the surface of the layer (e.g., as in JP-A-2000-271878); a method of adding a small amount (from 0.1 to 50% by mass) of relatively large particles (having a particle size of from 0.05 to 2 μm) to the lower layer (high-refractivity layer, middle-refractivity layer or hard coat layer) below a low-refractivity layer to thereby roughen the surface of the lower layer, and forming a low-refractivity layer on it while keeping the surface profile of the lower layer (e.g., as in JP-A-2000-281410, JP-A-2000-95893, JP-A-2001-100004, JP-A-2001-281407); and a method of physically transferring a roughened profile onto the surface of the outermost layer (stain-resistant layer) (for example, according to embossing treatment as in JP-A-63-278839, JP-A-11-183710, JP-A-2000-275401).

<Measuring Method>

Hereinafter, a measuring method used in the invention will be described.

(1) G', G", Tan $\delta$, and $\eta$

Measurement was carried out under the following conditions using a viscoelasticity measuring instrument (e.g. modular compact rheometer "Physica MCR301" manufactured by Anton Paar Ltd.) which utilizes a cone-plate.

After sufficiently drying a resin so that the water content thereof was no greater than 0.1%, a measurement was carried out with a gap of 500 μm and a strain of 1% at a frequency of 1 Hz and a temperature of from 170 to 250° C. at the rate of 5° C./min.

At this time, from G', G", tan $\delta$, and $\eta$ at the maximum and minimum temperatures of the barrel of the melt extruder, the maximum and minimum values of G', G", tan $\delta$, and $\eta$, and a ratio of the maximum value and the minimum value (the maximum value/the minimum value) will be obtained.

(2) Amount of Remaining Solvent 300 mg of a sample film was dissolved in 30 ml of a dissolving solvent. The sample film was dissolved in a methyl acetate solvent when the solution-film formation was carried out with a chlorine-based solvent, and the sample film was dissolved in a dichloromethane solvent when the melt-casting film formation was carried out with a non-chlorine-based solvent.

This sample was measured by gas chromatography (GC) under the following conditions, and quantitatively determined using a calibration curve, from a peak area except for that of the dissolving solvent, and the aggregate was taken as the amount of a remaining solvent.

Column: DB-WAX (0.25 mmϕ×30 m, 0.25 μm of film thickness)

Column temperature: 50° C.

Carrier gas: nitrogen

Analysis time: 15 minutes

Sample injection amount: 1 μl (3) Substitution Degree of Cellulose Acylate:

The substitution degree for an acyl group of cellulose acylate is obtained through $^{13}$C-NMR, according to the method described in Carbohydr. Res. 273 (1995), 83-91 (Tezuka et al.)

(4) Re and Rth 10 points were sampled at regular intervals in a film-width direction, and were air conditioned at a temperature of 25° C. and a relative humidity of 60% for 4 hours. Then, retardation were measured at a temperature of 25° C. and a relative humidity of 60% by an automatic double refraction meter (KOBRA-21ADH: manufactured by Oji Scientific Instruments) so as to measure the retardation (Re) in an in-plane direction and the retardation (Rth) in a film thickness direction.

(5) Degree of Polymerization of Cellulose Acylate:

About 0.2 g of absolutely-dried cellulose acylate is accurately weighed, and dissolved in 100 ml of mixed solvent of methylene chloride/ethanol=9/1 (by mass). Using an Ostwald's viscometer, this is analyzed to determine the time (second) taken for its dropping at 25° C., and the degree of polymerization of the polymer is obtained according to the following formula:

$$\eta rel=T/T0$$

$$[\eta]=(\ln \eta rel)/C$$

$$DP=[\eta]/Km$$

Km: $6\times10^{-4}$,

T: time (second) taken by the sample for its dropping,

T0: time (second) taken by the solvent alone for its dropping,

C: concentration (g/l).

(6) Tg:

20 mg of a sample is put into a sample pan of DSC. This is heated from 30° C. up to 250° C. at 10° C./min, and then cooled to 30° C. at −10° C./min. Next, this is again heated from 30° C. up to 250° D. The temperature at which the base line starts to shift from the low temperature side indicates Tg of the sample.

EXAMPLES

The invention is described more concretely with reference to the following Examples and Comparative Examples. In the following Examples, the material used, its amount and ratio, the details of the treatment and the treatment process may be suitably modified or changed not overstepping the spirit and the scope of the invention. Accordingly, the invention should not be limited to the Examples mentioned below.

Synthesis Example 1

Synthesis of Cellulose Acetate Propionate 150 parts by mass of cellulose (hardwood pulp) and 75 parts by mass of acetic acid were added to a reaction vessel equipped with a reflux device and the mixture was stirred at an interior temperature of 40° C. for 2 hours. The cellulose subjected to the pre-treatment as above was swollen and dissolved to have a minute powder-feather form.

Separately, a mixture of 1545 parts by mass of a propionic anhydride and 10.5 parts by mass of a sulphuric acid was prepared as an acylating agent, and cooled to −30° C. After that, the mixture was added to the reaction vessel in which the cellulose subjected to the pre-treatment was placed. The interior temperature was adjusted to be 10° C. after 30 minutes and to be 23° C. after 2 hours from the adding of the acylating agent, and maintained to be 23° C. to additionally stir the mixture for 3 hours. Then, the interior temperature was cooled to 5° C., and 120 parts by mass of acetic acid having a water content of 25% by mass cooled at 5° C. was added to the vessel for 1 hour. The interior temperature was heated to 40° C., and the mixture in the vessel was stirred for 1.5 hours. A mixed solvent was prepared by adding and dissolving acetic acid and water in magnesium acetate tetrahydrate twice as much as a sulphuric acid catalyst in mol (1/1/1 by weight), and was added to the reaction vessel to be stirred for 30 minutes. To the mixture, 1,000 parts by mass of acetic acid having a water content of 25% by mass, 500 parts by mass of acetic acid having a water content of 33% by mass, 1,000 parts by mass of acetic acid having a water content of 50% by mass, and 1,000 parts by mass of water were added in such an order, thereby precipitating cellulose acetate propionate. The obtained precipitate of cellulose acetate propionate was sufficiently washed with warm water. After washing, the precipitate of cellulose acetate propionate was stirred in 0.005% by mass of calcium hydroxide aqueous solution at 20° C. for 0.5 hours. Subsequently, the precipitate of cellulose acetate propionate was washed again with water till the pH of a washing solution became 7 and vacuum dried at 70° C.

According to $^{1}$H-NMR and GPC measurement, the obtained cellulose acetate propionate had the substitution degree for an acetyl group of 0.30, the substitution degree for a propionyl group of 2.63, and the polymerization degree of 320.

Synthesis Example 2

Synthesis of Cellulose Acetate Butylate 100 parts by mass of cellulose (hardwood pulp) and 135 parts by mass of acetic acid were added to a reaction vessel equipped with a reflux device and the mixture was stirred at an interior temperature of 40° C. for 2 hours. The cellulose subjected to the pre-treatment as above was swollen and dissolved to have a minute powder-feather form.

Separately, a mixture of 1080 parts by mass of a butyric acid anhydride and 10 parts by mass of a sulphuric acid was prepared as an acylating agent, and cooled to −20° C. After that, the mixture was added to the reaction vessel in which the cellulose subjected to the pre-treatment was placed. The interior temperature was increased to 20° C. after 30 minutes, and the mixture was reacted for 5 hours. Then, the interior temperature was cooled to 5° C., and 2400 parts by mass of acetic acid having a water content of 12.5% by mass cooled to about 5° C. was added to the vessel for 1 hour. The interior temperature was heated to 30° C., and the mixture in the vessel was stirred for 1 hour. A mixed solvent was prepared by adding and dissolving acetic acid and water in magnesium acetate tetrahydrate twice as much as a sulphuric acid catalyst in mol (1/1/1 by weight), and was added to the reaction vessel to be stirred for 30 minutes. To the mixture, 1,000 parts by mass of acetic acid and 2500 parts by mass of acetic acid having a water content of 50% by mass were slowly added, thereby precipitating cellulose acetate butylate. The obtained precipitate of cellulose acetate butylate was sufficiently washed with warm water. After washing, the precipitate of cellulose acetate butylate was stirred in 0.005% by mass of calcium hydroxide aqueous solution at for 0.5 hours. Subsequently, the precipitate of cellulose acetate butylate was washed again with water till the pH of a washing solution became 7 and vacuum dried at 70° C. The obtained cellulose acetate butylate had the substitution degree for an acetyl group of 0.84, the substitution degree for a butyryl group of 2.12, and the polymerization degree of 268.

Example and Comparative Example (I)

(1) Preparation of Cellulose Acylate

Cellulose acylates having a different kind of acyl group and a different substitution degree described in Table 1 were prepared on the basis of the synthesis examples. At the time of preparation, a sulfuric acid (7.8 parts by weight of sulfuric acid is added to 100 parts by weight of cellulose) is added as a catalyst, and a carboxylic acid that is a raw material for an acyl substituent is added for acylation at 40° C. In this step, the kind and the amount of the carboxylic acid were adjusted to adjust the kind and the substitution degree for the acyl group. Aging was carried out at a temperature of 40° C. after acylation so as to prepare samples having a different polymerization degree (the polymerization degree was lowered in accordance with the aging being longer). The polymerization degrees of the cellulose acylates obtained in this manner were measured, and then the measurement result is described in Table 1.

(2) Pelletization of Cellulose Acylate

The cellulose acylates was dried at 120° C. for 3 hours to have a water content of 0.1% by mass or less, to which was added a low molecular compound selected from the following low molecular compounds (the kinds and the added amount are described in Table 1). Besides, triphenylphosphate and silicon dioxide particles (AEROSIL R972V) were added in a proportion of 2% by mass and in a proportion of 0.05% by mass, respectively.

In addition, the following low molecular compounds according to the invention (low molecular compounds including two or more of aromatic rings, which has a molecular weight in the range of 100 to 1000 and a melting point in the range of 55 to 250° C.) were added as described in Table 1.

Low Molecular Compound according to the Invention

L-1: Melting Point=110° C., Molecular Weight=372 (compound described in JP-A-2003-344655)

[Formula 21]

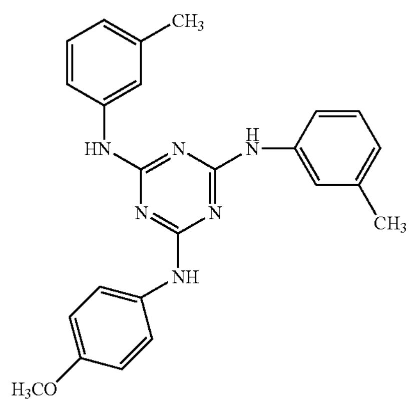

L-2: Melting Point=100° C., Molecular Weight=440 (compound described in JP-A-2003-248117)

[Formula 22]

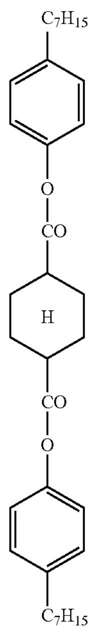

L-3: Melting Point=121° C., Molecular Weight=380 (The exemplified compound (A-12))

L-4: Melting Point=116° C., Molecular Weight=313 (The exemplified compound (A-2))

L-5: Melting Point=228° C., Molecular Weight=574 (The exemplified compound (A'-1))

L-6: Melting Point=200° C., Molecular Weight=814 (The exemplified compound (I))

L-7: Melting Point=80° C., Molecular Weight=597 (The exemplified compound (A-7))

Using a double-screw kneading extruder equipped with a vacuum-degasifier, these were extruded out through a die at a screw revolution speed of 300 rpm, and a kneading time of 40 seconds, and at an extrusion rate of 200 kg/hr, were solidified in water at 60° C., and then cut, thereby obtaining cylindrical pellets having a diameter of 2 mm and a length of 3 mm.

(3) Melt-Casting Film Formation

The cellulose acylate pellets prepared by the method were dried for 3 hours by a vacuum dryer at 110° C. The pellets were added to a hopper at 80° C., and then those were molten and extruded under the conditions described in Table 1. The diameter (outlet side) of the screw employed at this stage was 60 mm, L/D was 50, and the compression ratio was 4. The inlet side of the screw was cooled by circulating an oil at (Tg of the pellets −5)° C. by the length described in Table 1, in the interior of the screw. The residence time of resin in the barrel was 5 minutes. The temperature of the barrel was set so as to adjust the temperatures of the outlet and inlet thereof to be the highest temperature and the lowest temperature, respectively.

After melting, a melt was filtered, extruded through a die having a slit with a gap of 0.8 mm, and then was solidified using a casting drum at a temperature of (Tg −10)° C. In this step, an electrostatic application method (a 10 kV wire was disposed on a position apart from the landing point of the melt on the casting drum by 10 cm) was used to apply static electricity at both ends by 10 cm. The solidified melt was peeled off from the casing drum, and immediately before taking up, trimmed at both ends thereof (5% of the overall width at each end) and processed (knurled) at both ends to a width of 10 mm and a height of 50 μm. Then, 3000 m of the film was taken up at a rate of 30 m/min. The width of the unstretched film obtained in this manner was 1.5 m, and the thickness thereof was 120 μm.

TABLE 1

| | Cellulose Acylate | | | | | | | | Additive | |
|---|---|---|---|---|---|---|---|---|---|---|
| | Substitution Degree | | | | | | | | Low Molecular Compound | |
| | Acetyl group (X) | Propionyl group (Y1) | Butyryl group (Y2) | Pentanoyl group (Y3) | Hexanoyl group (Y4) | Y (Total of Y1 to Y4) | X + Y | Polymerization Degree | Kind | Added Amount (%) |
| The invention 1 | 1.0 | | 1.7 | | | 1.7 | 2.7 | 240 | L-6 | 5 |
| The invention 2 | 1.0 | | 1.7 | | | 1.7 | 2.7 | 240 | L-6 | 5 |
| The invention 3 | 1.0 | | 1.7 | | | 1.7 | 2.7 | 240 | L-6 | 5 |
| Comparative Example 1 | 1.0 | | 1.7 | | | 1.7 | 2.7 | 240 | L-6 | 5 |
| Comparative Example 2 | 1.0 | | 1.7 | | | 1.7 | 2.7 | 240 | L-6 | 5 |
| The invention 6 | 1.0 | | 1.7 | | | 1.7 | 2.7 | 240 | L-6 | 5 |
| The invention 7 | 1.0 | | 1.7 | | | 1.7 | 2.7 | 240 | L-6 | 5 |
| The invention 8 | 1.0 | | 1.7 | | | 1.7 | 2.7 | 240 | L-6 | 5 |
| The invention 9 | 1.0 | | 1.7 | | | 1.7 | 2.7 | 240 | L-6 | 5 |
| Comparative Example 3 | 1.0 | | 1.7 | | | 1.7 | 2.7 | 240 | L-6 | 5 |
| The invention 10 | 1.0 | | 1.7 | | | 1.7 | 2.7 | 240 | L-6 | 5 |
| The invention 11 | 1.0 | | 1.7 | | | 1.7 | 2.7 | 240 | L-6 | 5 |
| The invention 12 | 1.0 | | 1.7 | | | 1.7 | 2.7 | 240 | L-6 | 5 |
| The invention 13 | 1.0 | | 1.7 | | | 1.7 | 2.7 | 240 | — | 0 |
| The invention 14 | 1.0 | | 1.7 | | | 1.7 | 2.7 | 240 | L-5 | 1 |
| The invention 15 | 1.0 | | 1.7 | | | 1.7 | 2.7 | 240 | L-5 | 20 |
| The invention 16 | 1.0 | | 1.7 | | | 1.7 | 2.7 | 240 | L-1 | 5 |
| The invention 17 | 1.0 | | 1.7 | | | 1.7 | 2.7 | 240 | L-5 | 5 |
| The invention 18 | 1.0 | | 1.7 | | | 1.7 | 2.7 | 240 | L-7 | 5 |
| The invention 19 | 1.0 | | 1.7 | | | 1.7 | 2.7 | 240 | L-3 | 5 |
| The invention 20 | 1.0 | | 1.7 | | | 1.7 | 2.7 | 240 | L-6 | 5 |
| The invention 21 | 1.0 | | 1.7 | | | 1.7 | 2.7 | 240 | L-6 | 5 |
| The invention 22 | 1.0 | | 1.7 | | | 1.7 | 2.7 | 240 | L-6 | 5 |
| The invention 23 | 1.0 | | 1.7 | | | 1.7 | 2.7 | 240 | L-6 | 5 |
| The invention 24 | 1.0 | | 1.7 | | | 1.7 | 2.7 | 240 | L-6 | 5 |
| The invention 25 | 1.5 | | 1.3 | | | 1.3 | 2.8 | 220 | L-6 | 5 |
| The invention 26 | 1.6 | | 1.2 | | | 1.2 | 2.8 | 220 | L-6 | 5 |
| The invention 27 | 0.3 | | 2.5 | | | 2.5 | 2.8 | 220 | L-6 | 5 |
| The invention 28 | 0.9 | | 1.6 | | | 2.5 | 2.5 | 220 | L-6 | 5 |
| The invention 29 | 1.1 | | 1.9 | | | 2.5 | 3.0 | 220 | L-6 | 5 |
| The invention 30 | 1.0 | | 1.7 | | | 1.7 | 2.7 | 150 | L-6 | 5 |
| The invention 31 | 1.0 | | 1.7 | | | 1.7 | 2.7 | 260 | L-6 | 5 |
| The invention 32 | 1.8 | | | 0.5 | 0.5 | 1.0 | 2.8 | 400 | L-2 | 7 |
| The invention 33 | 0.5 | 1.2 | 1.2 | | | 2.4 | 2.9 | 330 | L-4 | 7 |
| The invention 34 | 0.2 | 2.5 | | | | 2.5 | 2.7 | 250 | L-6 | 4 |
| Comparative Example 4 | 0.2 | 2.5 | | | | 2.5 | 2.7 | 250 | — | 0 |
| Example 35 | 2.4 | 0.5 | | | | 0.5 | 2.9 | 220 | L-6 | 5 |
| Example 36 | 2.2 | 0.7 | | | | 0.7 | 2.9 | 220 | L-6 | 5 |
| Example 37 | 2.7 | 0.1 | | | | 0.1 | 2.8 | 220 | L-6 | 5 |
| Example 38 | 1.8 | 0.9 | | | | 0.9 | 2.7 | 220 | L-6 | 5 |
| Comparative Example 5 | 2.5 | 0.4 | | | | 0.4 | 2.9 | 250 | — | 0 |
| Example 39 | 2.5 | 0.4 | | | | 0.4 | 2.9 | 250 | L-6 | 5 |

| | Melting Condition | | | | | Properties of Molten Cellulose Acylate | | |
|---|---|---|---|---|---|---|---|---|
| | Screw | | Barrel Temperature | | | G' | | |
| | Feed zone/ Compression zone (Length Ratio) | Cooled Upper-stream side Length (To Entire Length) (%) | The Lowest Temperature (° C.) | The Highest Temperature (° C.) | The Highest Temperature − The lowest Temperature (° C.) | The lowest Value (Pa) | The highest Value (Pa) | The highest Value/ The lowest Value (Pa) |
| The invention 1 | 3 | 10 | 180 | 210 | 30 | 5000 | 50000 | 10 |
| The invention 2 | 1.2 | 10 | 180 | 210 | 30 | 5000 | 50000 | 10 |
| The invention 3 | 10 | 10 | 180 | 210 | 30 | 5000 | 50000 | 10 |

TABLE 1-continued

| | | | | | | | | |
|---|---|---|---|---|---|---|---|---|
| Comparative Example 1 | 1 | 10 | 180 | 210 | 30 | 5000 | 50000 | 10 |
| Comparative Example 2 | 12 | 10 | 180 | 210 | 30 | 5000 | 50000 | 10 |
| The invention 6 | 3 | 5 | 180 | 210 | 30 | 5000 | 50000 | 10 |
| The Invention 7 | 3 | 30 | 180 | 210 | 30 | 5000 | 50000 | 10 |
| The invention 8 | 3 | 0 | 180 | 210 | 30 | 5000 | 50000 | 10 |
| The invention 9 | 3 | 35 | 180 | 210 | 30 | 5000 | 50000 | 10 |
| Comparative Example 3 | 1 | 0 | 180 | 210 | 30 | 5000 | 50000 | 10 |
| The invention 10 | 3 | 10 | 170 | 250 | 80 | 1000 | 80000 | 80 |
| The invention 11 | 3 | 10 | 195 | 200 | 5 | 8000 | 32000 | 4 |
| The invention 12 | 3 | 10 | 200 | 200 | 0 | 8000 | 8000 | 1 |
| The invention 13 | 3 | 10 | 180 | 210 | 30 | 6000 | 75000 | 12.5 |
| The invention 14 | 3 | 10 | 180 | 210 | 30 | 5500 | 66000 | 12 |
| The invention 15 | 3 | 10 | 180 | 210 | 30 | 1500 | 12000 | 8 |
| The invention 16 | 3 | 10 | 180 | 210 | 30 | 4000 | 40000 | 10 |
| The invention 17 | 3 | 10 | 180 | 210 | 30 | 4500 | 40500 | 9 |
| The invention 18 | 3 | 10 | 180 | 210 | 30 | 5500 | 60500 | 11 |
| The invention 19 | 3 | 10 | 180 | 210 | 30 | 5000 | 50000 | 10 |
| The invention 20 | 3 | 10 | 180 | 210 | 30 | 5000 | 50000 | 10 |
| The invention 21 | 3 | 10 | 180 | 210 | 30 | 5000 | 50000 | 10 |
| The invention 22 | 3 | 10 | 180 | 210 | 30 | 5000 | 50000 | 10 |
| The invention 23 | 3 | 10 | 180 | 210 | 30 | 5000 | 50000 | 10 |
| The invention 24 | 3 | 10 | 180 | 210 | 30 | 5000 | 50000 | 10 |
| The invention 25 | 3 | 10 | 180 | 210 | 30 | 8000 | 32000 | 4 |
| The invention 26 | 3 | 10 | 180 | 210 | 30 | 12000 | 72000 | 6 |
| The invention 27 | 3 | 10 | 180 | 210 | 30 | 2500 | 50000 | 20 |
| The invention 28 | 3 | 10 | 180 | 210 | 30 | 6500 | 52000 | 8 |
| The invention 29 | 3 | 10 | 180 | 210 | 30 | 3500 | 28000 | 8 |
| The invention 30 | 3 | 10 | 180 | 210 | 30 | 2000 | 30000 | 15 |
| The invention 31 | 3 | 10 | 180 | 210 | 30 | 12000 | 72000 | 6 |
| The invention 32 | 7 | 25 | 180 | 230 | 50 | 10000 | 45000 | 4.5 |
| The invention 33 | 7 | 25 | 180 | 230 | 50 | 15000 | 37500 | 2.5 |
| The invention 34 | 3 | 10 | 200 | 245 | 45 | 9500 | 66500 | 7 |
| Comparative Example 4 | 1 | 0 | 245 | 245 | 0 | 9500 | 9500 | 1 |
| Example 35 | 5 | 15 | 220 | 240 | 20 | 7500 | 56250 | 7.5 |
| Example 36 | 5 | 15 | 220 | 240 | 20 | 5500 | 42900 | 7.8 |
| Example 37 | 5 | 15 | 220 | 240 | 20 | 8500 | 72200 | 7.6 |
| Example 38 | 5 | 15 | 220 | 240 | 20 | 4500 | 31500 | 7 |
| Comparative Example 5 | Preparation with Solution-Film Formation according to Example 1 in JP-A-2000-344904 | | | | | | | |
| Example 39 | 5 | 15 | 220 | 240 | 20 | 7000 | 56000 | 8 |

| | Properties of Molten Cellulose Acylate | | | | | | | | |
|---|---|---|---|---|---|---|---|---|---|
| | G'' | | | tan δ | | | η | | |
| | The lowest Value (Pa) | The highest Value (Pa) | The highest Value/The lowest Value (Pa) | The highest Value | The lowest Value | The highest Value/The lowest Value | The lowest Value (Pa · s) | The highest Value (Pa · s) | The highest Value/The lowest Value |
| The invention 1 | 7500 | 60000 | 8 | 1.5 | 0.6 | 2.5 | 7000 | 17500 | 3 |
| The invention 2 | 7500 | 60000 | 8 | 1.5 | 0.6 | 2.5 | 7000 | 17500 | 3 |
| The invention 3 | 7500 | 60000 | 8 | 1.5 | 0.6 | 2.5 | 7000 | 17500 | 3 |
| Comparative Example 1 | 7500 | 60000 | 8 | 1.5 | 0.6 | 2.5 | 7000 | 17500 | 3 |
| Comparative Example 2 | 7500 | 60000 | 8 | 1.5 | 0.6 | 2.5 | 7000 | 17500 | 3 |
| The invention 6 | 7500 | 60000 | 8 | 1.5 | 0.6 | 2.5 | 7000 | 17500 | 3 |
| The Invention 7 | 7500 | 60000 | 8 | 1.5 | 0.6 | 2.5 | 7000 | 17500 | 3 |
| The invention 8 | 7500 | 60000 | 8 | 1.5 | 0.6 | 2.5 | 7000 | 17500 | 3 |
| The invention 9 | 7500 | 60000 | 8 | 1.5 | 0.6 | 2.5 | 7000 | 17500 | 3 |
| Comparative Example 3 | 7500 | 60000 | 8 | 1.5 | 0.6 | 2.5 | 7000 | 17500 | 3 |
| The invention 10 | 2500 | 100000 | 40 | 6.0 | 0.5 | 12 | 1000 | 30000 | 30 |
| The invention 11 | 5000 | 5500 | 1.1 | 2.5 | 1.7 | 1.5 | 5000 | 7000 | 1.4 |
| The invention 12 | 8000 | 8000 | 1 | 2.5 | 2.5 | 1 | 5000 | 5000 | 1 |
| The invention 13 | 6500 | 84500 | 13 | 1.0 | 0.1 | 7 | 9000 | 29700 | 3.3 |
| The invention 14 | 5500 | 66000 | 12 | 1.1 | 0.2 | 5 | 8000 | 24800 | 3.1 |
| The invention 15 | 3500 | 21000 | 6 | 2.5 | 0.8 | 3 | 5000 | 12500 | 2.5 |
| The invention 16 | 3500 | 24500 | 7 | 1.1 | 0.2 | 6 | 6000 | 19800 | 3.3 |
| The invention 17 | 3000 | 21000 | 7 | 1.2 | 0.2 | 5 | 5000 | 17500 | 3.5 |
| The invention 18 | 3000 | 27000 | 9 | 1.6 | 0.4 | 4 | 8000 | 21600 | 2.7 |
| The invention 19 | 4000 | 32000 | 8 | 1.4 | 0.9 | 1.6 | 7500 | 22500 | 3 |
| The invention 20 | 7500 | 60000 | 8 | 1.5 | 1.0 | 1.5 | 7000 | 17500 | 3 |
| The invention 21 | 7500 | 60000 | 8 | 1.5 | 1.0 | 1.5 | 7000 | 17500 | 3 |
| The invention 22 | 7500 | 60000 | 8 | 1.5 | 1.0 | 1.5 | 7000 | 17500 | 3 |
| The invention 23 | 7500 | 60000 | 8 | 1.5 | 1.0 | 1.5 | 7000 | 17500 | 3 |
| The invention 24 | 7500 | 60000 | 8 | 1.5 | 1.0 | 1.5 | 7000 | 17500 | 3 |
| The invention 25 | 15000 | 60000 | 4 | 2.2 | 0.9 | 2.5 | 15000 | 33000 | 2.2 |
| The invention 26 | 30000 | 75000 | 2.5 | 2.8 | 1.4 | 2 | 20000 | 26000 | 1.3 |

TABLE 1-continued

| | | | | | | | | | |
|---|---|---|---|---|---|---|---|---|---|
| The invention 27 | 3000 | 45000 | 15 | 1.0 | 0.2 | 6.5 | 5000 | 25000 | 5 |
| The invention 28 | 7500 | 90000 | 12 | 1.2 | 0.5 | 2.5 | 9000 | 25200 | 2.8 |
| The invention 29 | 3500 | 35000 | 10 | 1.1 | 0.2 | 5 | 5000 | 16500 | 3.3 |
| The invention 30 | 2000 | 28000 | 14 | 1.0 | 0.3 | 3.8 | 3000 | 8700 | 2.9 |
| The invention 31 | 15000 | 90000 | 6 | 1.2 | 0.4 | 3 | 20000 | 26000 | 1.3 |
| The invention 32 | 20000 | 70000 | 3.5 | 2.5 | 0.5 | 5.5 | 10000 | 28000 | 2.8 |
| The invention 33 | 29000 | 95700 | 3.3 | 2.1 | 0.3 | 6.5 | 13000 | 28600 | 2.2 |
| The invention 34 | 5500 | 33000 | 6 | 0.7 | 0.4 | 2 | 9500 | 23750 | 2.5 |
| Comparative Example 4 | 5500 | 5500 | 1 | 0.9 | 0.9 | 1 | 9500 | 9500 | 1 |
| Example 35 | 12000 | 76800 | 6.4 | 2.5 | 1.0 | 2.5 | 5500 | 19250 | 3.5 |
| Example 36 | 9500 | 57000 | 6 | 2.8 | 1.4 | 2 | 4500 | 18000 | 4 |
| Example 37 | 15000 | 82500 | 5.5 | 2.3 | 0.7 | 3.3 | 7500 | 22500 | 3 |
| Example 38 | 6500 | 26000 | 4 | 3 | 1.7 | 1.8 | 3500 | 8750 | 2.5 |
| Comparative Example 5 | Preparation with Solution-Film Formation according to Example 1 in JP-A-2000-344904 | | | | | | | | |
| Example 39 | 10000 | 60000 | 6 | 2.2 | 1.0 | 2.3 | 6000 | 20400 | 3.4 |

The film obtained in this manner was passed through a space between orthogonal polarizing plates, and irradiated from a backside to be visually checked over an entire length. Then, the number of generated V-shaped streaks was counted and converted to the number of generated V-shaped streaks per 100 m to describe the result in Table 2. A cellulose acylate film having a thickness of 60 μm and a width of 0.7 m and a cellulose acylate film having a thickness of 200 μm and a width of 3 m were prepared and evaluated, and the same result was obtained. In addition, a cellulose acylate film in a roll shape left for one year was sampled, and 3 of the samples were stacked to be punched by a Thomson blade of 10 cm×10 cm. After that, the number of generated cracks is observed by a microscope and the sum total thereof is described in Table 2.

The films according to the invention all had good results. On the other hand, particularly Comparative Example 4 corresponding to the Example of No. 6 in JP-A-2000-352620, among Comparative Examples, had a great number of V-shaped streaks. In addition, cracks were generated. Example 34 according to the invention using cellulose acylate having the same composition as that of Comparative Example 4 had an excellent result. Comparative Example 5 as formed with a solution corresponding to Example 1 in JP-A-2000-344904 also had cracks. On the other hand, Example 39 according to the invention using cellulose acylate having the same composition as that of Comparative Example 5 had an excellent result. A sample was taken from a film after film formation, and measured by the method, thus Tg described in Table 1 was obtained as the measurement result.

(4) Stretching

The cellulose acylate film obtained in this manner was stretched at a draw ratio described in Table 2. Subsequentially, the film was trimmed by 5% of the overall width at both ends thereof. The number of V-shaped streaks, Re and Rth of the cellulose acylate film are described in Table 2. (where streaks are indicated as the number per 10 $m^2$, and described in Table 2). Stretching was performed at 300%/min and a temperature of (Tg measured above +10° C.). Example 34 and Comparative Example 4 corresponding to the Example 1 of sample No. 6 in JP-A-2000-352620 were stretched at a temperature of 160° C.

TABLE 2

| | Physical Properties of Formed Film | | | | Stretching Conditions | | Properties of Stretched Film | | | |
|---|---|---|---|---|---|---|---|---|---|---|
| | V-streak (Number/100 m) | Tg (° C.) | Remaining Solvent (% by mass) | Crack in Process (Number) | Draw Ratio MD (%) | Draw Ratio TD (%) | V-streak (Number/100 m) | Re (nm) | Rth (nm) | Streak in LCD (Number/100 m) |
| The invention 1 | 0 | 117 | 0 | 0 | 0 | 40 | 0 | 70 | 200 | 0 |
| The invention 2 | 2 | 117 | 0 | 0 | 0 | 40 | 2 | 60 | 190 | 2 |
| The invention 3 | 1 | 117 | 0 | 0 | 0 | 40 | 1 | 80 | 210 | 1 |
| Comparative Example 1 | 25 | 117 | 0 | 0 | 0 | 40 | 24 | 60 | 200 | 26 |
| Comparative Example 2 | 15 | 117 | 0 | 0 | 0 | 40 | 14 | 60 | 210 | 15 |
| The invention 6 | 1 | 117 | 0 | 0 | 0 | 40 | 1 | 70 | 210 | 1 |
| The invention 7 | 1 | 117 | 0 | 0 | 0 | 40 | 1 | 80 | 200 | 1 |
| The invention 8 | 6 | 117 | 0 | 0 | 0 | 40 | 6 | 80 | 190 | 6 |
| The invention 9 | 4 | 117 | 0 | 0 | 0 | 40 | 4 | 80 | 200 | 4 |
| Comparative Example 3 | 55 | 117 | 0 | 0 | 0 | 40 | 54 | 80 | 210 | 57 |
| The invention 10 | 2 | 117 | 0 | 0 | 0 | 40 | 2 | 70 | 200 | 2 |
| The invention 11 | 2 | 117 | 0 | 0 | 0 | 40 | 2 | 60 | 190 | 2 |
| The invention 12 | 6 | 117 | 0 | 0 | 0 | 40 | 6 | 60 | 180 | 6 |
| The invention 13 | 7 | 131 | 0 | 5 | 0 | 40 | 7 | 30 | 100 | 7 |
| The invention 14 | 1 | 128 | 0 | 1 | 0 | 40 | 1 | 50 | 150 | 1 |
| The invention 15 | 1 | 107 | 0 | 0 | 0 | 40 | 1 | 80 | 220 | 1 |
| The invention 16 | 0 | 118 | 0 | 0 | 0 | 40 | 0 | 50 | 180 | 0 |
| The invention 17 | 0 | 115 | 0 | 0 | 0 | 40 | 0 | 55 | 170 | 0 |
| The invention 18 | 0 | 116 | 0 | 0 | 0 | 40 | 0 | 55 | 160 | 0 |
| The invention 19 | 0 | 117 | 0 | 0 | 0 | 40 | 0 | 60 | 170 | 0 |
| The invention 20 | 0 | 117 | 0 | 0 | 0 | 0 | 0 | 0 | 30 | 0 |
| The invention 21 | 0 | 117 | 0 | 0 | 5 | 45 | 0 | 40 | 260 | 0 |

TABLE 2-continued

| | Physical Properties of Formed Film | | | | Stretching Conditions | | Properties of Stretched Film | | | |
|---|---|---|---|---|---|---|---|---|---|---|
| | V-streak (Number/ 100 m) | Tg (° C.) | Remaining Solvent (% by mass) | Crack in Process (Number) | Draw Ratio MD (%) | Draw Ratio TD (%) | V-streak (Number/ 100 m) | Re (nm) | Rth (nm) | Streak in LCD (Number/ 100 m) |
| The invention 22 | 0 | 117 | 0 | 0 | 15 | 80 | 0 | 60 | 360 | 0 |
| The invention 23 | 0 | 117 | 0 | 0 | 0 | 200 | 0 | 75 | 490 | 0 |
| The invention 24 | 0 | 117 | 0 | 0 | 50 | 290 | 0 | 190 | 360 | 0 |
| The invention 25 | 1 | 136 | 0 | 0 | 0 | 40 | 1 | 45 | 160 | 1 |
| The invention 26 | 6 | 145 | 0 | 0 | 0 | 40 | 6 | 35 | 110 | 6 |
| The invention 27 | 1 | 117 | 0 | 0 | 0 | 40 | 1 | 65 | 175 | 1 |
| The invention 28 | 1 | 135 | 0 | 0 | 0 | 40 | 1 | 125 | 240 | 1 |
| The invention 29 | 1 | 117 | 0 | 0 | 0 | 40 | 1 | 65 | 165 | 1 |
| The invention 30 | 1 | 122 | 0 | 0 | 0 | 40 | 1 | 70 | 190 | 1 |
| The invention 31 | 1 | 124 | 0 | 0 | 0 | 40 | 1 | 85 | 215 | 1 |
| The invention 32 | 1 | 141 | 0 | 0 | 0 | 40 | 1 | 55 | 155 | 1 |
| The invention 33 | 1 | 115 | 0 | 0 | 0 | 40 | 1 | 65 | 185 | 1 |
| The invention 34 | 0 | 136 | 0 | 0 | 50 | 50 | 0 | 60 | 155 | 0 |
| Comparative Example 4 | 57 | 140 | 0 | 9 | 50 | 50 | 56 | 20 | 80 | 55 |
| The invention 35 | 0 | 136 | 0 | 0 | 30 | 30 | 0 | 0 | 10 | 0 |
| The invention 36 | 0 | 143 | 0 | 0 | 30 | 30 | 0 | 0 | 5 | 0 |
| The invention 37 | 0 | 137 | 0 | 0 | 30 | 30 | 0 | 0 | 0 | 0 |
| The invention 38 | 0 | 132 | 0 | 0 | 30 | 30 | 0 | 5 | 10 | 0 |
| Comparative Example 5 | 12 | 155 | 0.5 | 53 | 30 | 30 | 11 | 0 | 10 | 11 |
| The invention 39 | 0 | 137 | 0 | 0 | 30 | 30 | 0 | 0 | 30 | 0 |

(5) Construction of Polarizer (5-1) Saponification of Cellulose Acylate Film:

The unstretched cellulose acylate film and the stretched cellulose acylate film were saponificated for surface hydrophilication according to the following dipping saponification method. In addition, the following coating saponification made on the films gave the same results as in the dipping saponification.

(i) Coating Saponification:

20 parts by weight of water was added to 80 parts by weight of iso-propanol, and KOH was dissolved therein to have a concentration of 2.5 mol/L. This was conditioned at 60° C. and used as a saponification solution. This was applied to the cellulose acylate film at 60° C. in an amount of 10 g/m$^2$, and the film was thus saponified for 1 minute. Next, this was washed by spraying thereon hot water at 50° C. in a degree of 10 L/m$^2$-min for 1 minute.

(ii) Dipping Saponification:

An aqueous NaOH (2.5 mol/L) solution was prepared as a saponification solution, and conditioned at 60° C. The cellulose acylate film was dipped in the solution for 2 minutes. Next, this was dipped in an aqueous sulfuric acid (0.05 mol/L) solution for 30 seconds, and then led to pass through a water-washing bath.

(5-2) Preparation of Polarizing Film:

According to Example 1 in JP-A-2001-141926, a film was stretched in the machine direction, between two pairs of nip rolls having a different peripheral speed to prepare a polarizing film having a thickness of 20 μm.

(5-3) Bonding

The polarizing plate obtained in this manner, and any one of the saponified, unstretched or stretched cellulose acylate films were bonded together by using an aqueous 3% PVA (PVA-117H, produced by KURARAY CO., LTD.) solution as an adhesive, in such a manner that the polarization axis could cross the length direction of the cellulose acylate film at 45 degrees (polarizing plate A). The films according to the invention all had good results, without detecting streak generation.

Instead of the unstretched cellulose acylate film, the saponified Fujitac TD80U (unstretched triacetate film) was used to produce a polarizing plate B, and the same result can be obtained.

(6) Production of Optical Compensatory film-Liquid Crystal Display Device

A viewer-side polarizing plate provided in a 22-inch liquid crystal display device using a VA-type liquid crystal cell (manufactured by SHARP CORPORATION) was peeled off from viewer side thereof, and then the retardation polarizing plate A or B was bonded to the viewer side using an adhesive, in such a manner that the cellulose acylate film became the liquid crystal cell side. The viewer-side polarizing plate and a back light-side polarizing plate were so disposed that the transmission axis of the former can be perpendicular to the transmission axis of the latter. Then, a liquid crystal display device was produced. The number of light streaks was counted in a dark room over an entire black displayed surface. This process was performed to 100 sheets of polarizing plates produced by the above method, and the number of light streak-shapes for each used cellulose acylate film area was converted to the number of streak-shapes per the entire width at the time of film formation×100 m to describe the result in Table 2. When the cellulose acylate film having 10 or less of V-shaped streaks was mounted on the liquid crystal display device, the V-shaped streaks were not detected with a visual check. However, streaks were visually detected in case of the cellulose acylate film having more than 10 of V-shaped streaks. The polarizing plates according to the invention all had good results without the generation of V-shaped streaks. In Table 2, measurement values for the polarizing plate A are shown, but the same results can be obtained in case of the polarizing plate B.

The cellulose acylate film according to the invention can obtain the same result when mounted on a VA-type liquid crystal display device in which alignment is divided as described in JP-A-10-123576.

When the stretched cellulose acylate film of the invention was used in place of the liquid-crystal layer-coated cellulose acetate film in Example 1 in JP-A-11-316378, then good optical compensatory films were produced.

Similarly, when the cellulose acylate film of the invention was used in place of the liquid-crystal layer-coated cellulose acetate film in Example 1 in JP-A-7-333433, then good optical compensatory filter films can be obtained.

A liquid crystal display device having an excellent visuality and no display unevenness associated with a heat and humidity can be obtained after the polarizing plate and the retardation polarizing plate according to the invention were used for a liquid crystal display device described in Example 1 in JP-A-10-48420, an optical anisotropic layer including discotic liquid crystal molecules and an alignment film to which polyvinyl alcohol is applied described in Example 1 in JP-A-9-26572, a 20-inch VA-type liquid crystal display device described in FIGS. 2 to 9 in JP-A-2000-154261, a 20-inch OCB-type liquid crystal display device described in FIGS. 10 to 15 in JP-A-2000-154261 and a IPS-type liquid crystal display device described in FIG. 11 in JP-A-2004-12731.

(7) Construction of Low-Refractivity Film

According to Example 47 in Hatsumei Kyokai Disclosure Bulletin (No. 2001-1745), the low-refractivity films stretched was constructed, and the films had good optical properties.

The low-refractivity film of the invention was stuck to the outermost surface layer of the liquid-crystal device of Example 1 in JP-A-10-48420, the 20-inch VA-mode liquid-crystal display device of FIGS. 2 to 9 in JP-A-2000-154261, and the 20-inch OCB-mode liquid-crystal display device of FIGS. 10-15 in JP-A-2000-154261, and the devices were tested. They were all good.

Example and Comparative Example (II)

(1) Preparation of Cellulose Acylate

Cellulose acylates having a different kind of acyl group and a different substitution degree described in Table 3 were prepared in the same manner as the 'Example and Comparative Example (I).

(2) Pelletization of Cellulose Acylate

The cellulose acylate was dried at 120° C. for 3 hours to have a water content of 0.1% by mass or less, to which was added an amount described in Table 3 of the compound (I). Then, a plasticizer (the kind and the amount of the plasticizer are described in Table 3) selected from the following plasticizers were added, and further, silicon dioxide particles (AEROSIL R972V) were added in a proportion of 0.05% by mass.

Plasticizer A: Polyethylene glycol (molecular weight 600)

Plasticizer B: Glycerin diacetateolate

Plasticizer C: Glycerin tetrakaprylate

Plasticizer D: Glycerin diacetatetraurate

Using a double-screw kneading extruder equipped with a vacuum-degasifier, these were extruded out through a die at a screw revolution speed of 300 rpm, and a kneading time of 40 seconds, and at an extrusion rate of 200 kg/hr, were solidified in water at 60° C., and then cut, thereby obtaining cylindrical pellets having a diameter of 2 mm and a length of 3 mm.

(3) Melt-Casting Film Formation

The cellulose acylate pellets prepared by the method were molten to form a film under the conditions described in Table 3, in the same manner as the 'Example and Comparative Example (I)'. Then, 3000 m of the film was taken up at a rate of 30 m/min. The width of the unstretched film obtained in this manner was 1.5 m, and the thickness thereof was 80 μm.

TABLE 3

| | Cellulose Acylate | | | | | | Additive | | |
|---|---|---|---|---|---|---|---|---|---|
| | Substitution Degree | | | | | | Added Amount of Low Molecular Compound (%) | Plasticizer | |
| | Acetyl group (X) | Propionyl group (Y1) | Butyryl group (Y2) | Y (Total of Y1 and Y2) | X + Y | Polymerization Degree | | Kind | Amount (%) |
| The invention a | 0.1 | 2.6 | | 2.6 | 2.7 | 180 | 0 | — | 0 |
| The invention b | 0.1 | 2.6 | | 2.6 | 2.7 | 180 | 0 | — | 0 |
| The invention c | 0.1 | 2.6 | | 2.6 | 2.7 | 180 | 0 | — | 0 |
| Comparative Example a | 0.1 | 2.6 | | 2.6 | 2.7 | 180 | 0 | — | 0 |
| Comparative Example b | 0.1 | 2.6 | | 2.6 | 2.7 | 180 | 0 | — | 0 |
| The invention d | 0.1 | 2.6 | | 2.6 | 2.7 | 140 | 0 | — | 0 |
| The invention e | 0.1 | 2.6 | | 2.6 | 2.7 | 140 | 0 | — | 0 |
| The invention f | 0.1 | 2.6 | | 2.6 | 2.7 | 140 | 0 | — | 0 |
| The invention g | 0.1 | 2.6 | | 2.6 | 2.7 | 140 | 0 | — | 0 |
| Comparative Example c | 0.1 | 2.6 | | 2.6 | 2.7 | 140 | 0 | — | 0 |
| The invention h | 0.1 | 2.6 | | 2.6 | 2.7 | 140 | 0 | A | 3 |
| The invention i | 0.1 | 2.6 | | 2.6 | 2.7 | 140 | 0 | B | 8 |
| The invention j | 0.1 | 2.6 | | 2.6 | 2.7 | 140 | 0 | C | 15 |
| The invention k | 0.1 | 2.6 | | 2.6 | 2.7 | 140 | 0 | D | 20 |
| The invention l | 0.1 | 2.6 | | 2.6 | 2.7 | 220 | 0 | — | 0 |
| The invention l' | 0.1 | 2.6 | | 2.6 | 2.7 | 220 | 0 | — | 0 |
| The invention l" | 0.1 | 2.6 | | 2.6 | 2.7 | 220 | 0 | — | 0 |
| The invention m | 0.1 | 2.6 | | 2.6 | 2.7 | 220 | 0 | — | 0 |
| The invention n | 0.1 | 2.6 | | 2.6 | 2.7 | 220 | 0 | — | 0 |
| The invention o | 0.1 | 2.6 | | 2.6 | 2.7 | 240 | 0 | — | 0 |
| The invention p | 0.1 | 2.6 | | 2.6 | 2.7 | 240 | 1 | — | 0 |
| The invention q | 0.1 | 2.6 | | 2.6 | 2.7 | 240 | 20 | — | 0 |
| The invention r | 0.1 | 2.6 | | 2.6 | 2.7 | 240 | 5 | — | 0 |
| The invention s | 1.1 | 1.5 | | 1.5 | 2.6 | 200 | 0 | — | 0 |
| The invention t | 0.8 | 1.9 | | 1.9 | 2.7 | 200 | 0 | — | 0 |
| The invention u | 0.5 | 2.3 | | 2.3 | 2.8 | 200 | 0 | — | 0 |

TABLE 3-continued

| | | | | | | | | | |
|---|---|---|---|---|---|---|---|---|---|
| The invention v | 0.1 | 2.84 | | 2.84 | 2.94 | 200 | 0 | — | 0 |
| The invention w | 0.5 | 2.3 | | 2.3 | 2.8 | 260 | 0 | — | 0 |
| The invention x | 1.1 | | 1.7 | 1.7 | 2.8 | 230 | 0 | — | 0 |
| The invention y | 1.5 | | 1.4 | 1.4 | 2.9 | 150 | 0 | — | 0 |
| The invention z | 0.8 | | 1.9 | 1.9 | 2.7 | 200 | 0 | — | 0 |

| | Melting Condition | | | | | Properties of Molten Cellulose Acylate | | |
|---|---|---|---|---|---|---|---|---|
| | Screw | | Barrel Temperature | | | G' | | |
| | Feed zone/ Compression zone (Length Ratio) | Cooled Upper-stream side Length (To Entire Length) (%) | The Lowest Temperature (° C.) | The Highest Temperature (° C.) | The Highest Temperature − The lowest Temperature (° C.) | The lowest Value (Pa) | The highest Value (Pa) | The highest Value/ The lowest Value (Pa) |
| The invention a | 3 | 10 | 180 | 210 | 30 | 3000 | 36000 | 12 |
| The invention b | 1.2 | 10 | 180 | 210 | 30 | 3000 | 36000 | 12 |
| The invention c | 10 | 10 | 180 | 210 | 30 | 3000 | 36000 | 12 |
| Comparative Example a | 1 | 10 | 180 | 210 | 30 | 3000 | 36000 | 12 |
| Comparative Example b | 12 | 10 | 180 | 210 | 30 | 3000 | 36000 | 12 |
| The invention d | 3 | 5 | 180 | 210 | 30 | 3000 | 36000 | 12 |
| The invention e | 3 | 30 | 180 | 210 | 30 | 3000 | 36000 | 12 |
| The invention f | 3 | 0 | 180 | 210 | 30 | 3000 | 36000 | 12 |
| The invention g | 3 | 35 | 180 | 210 | 30 | 3000 | 36000 | 12 |
| Comparative Example c | 1 | 0 | 180 | 210 | 30 | 3000 | 36000 | 12 |
| The invention h | 3 | 10 | 180 | 210 | 30 | 3000 | 36000 | 12 |
| The invention i | 3 | 10 | 180 | 210 | 30 | 3000 | 36000 | 12 |
| The invention j | 3 | 10 | 180 | 210 | 30 | 3000 | 36000 | 12 |
| The invention k | 3 | 10 | 180 | 210 | 30 | 3000 | 36000 | 12 |
| The invention l | 3 | 10 | 170 | 245 | 75 | 1000 | 85000 | 85 |
| The invention l' | 3 | 10 | 185 | 235 | 50 | 1200 | 78000 | 65 |
| The invention l'' | 3 | 10 | 170 | 220 | 50 | 1000 | 50000 | 50 |
| The invention m | 3 | 10 | 195 | 200 | 5 | 7000 | 35000 | 5 |
| The invention n | 3 | 10 | 200 | 200 | 0 | 7000 | 8400 | 1.2 |
| The invention o | 3 | 10 | 180 | 210 | 30 | 5500 | 71500 | 13 |
| The invention p | 3 | 10 | 180 | 210 | 30 | 5000 | 55000 | 11 |
| The invention q | 3 | 10 | 180 | 210 | 30 | 1800 | 12600 | 7 |
| The invention r | 3 | 10 | 180 | 210 | 30 | 3500 | 42000 | 12 |
| The invention s | 3 | 10 | 180 | 210 | 30 | 7000 | 59500 | 8.5 |
| The invention t | 3 | 10 | 180 | 210 | 30 | 5500 | 52250 | 9.5 |
| The invention u | 3 | 10 | 180 | 210 | 30 | 4000 | 50000 | 12.5 |
| The invention v | 3 | 10 | 180 | 210 | 30 | 3500 | 70000 | 20 |
| The invention w | 3 | 10 | 180 | 210 | 30 | 5000 | 50000 | 10 |
| The invention x | 3 | 10 | 180 | 210 | 30 | 3500 | 38500 | 11 |
| The invention y | 3 | 10 | 180 | 210 | 30 | 3000 | 57000 | 19 |
| The invention z | 3 | 10 | 180 | 210 | 30 | 7500 | 60000 | 8 |

| | Properties of Molten Cellulose Acylate | | | | | | | | |
|---|---|---|---|---|---|---|---|---|---|
| | G'' | | | tan δ | | | η | | |
| | The lowest Value (Pa) | The highest Value (Pa) | The highest Value/ The lowest Value (Pa) | The highest Value | The lowest Value | The highest Value/ The lowest Value | The lowest Value (Pa · s) | The highest Value (Pa · s) | The highest Value/ The lowest Value |
| The invention a | 5500 | 55000 | 10 | 2.1 | 0.6 | 3.5 | 6000 | 21000 | 3.5 |
| The invention b | 5500 | 55000 | 10 | 2.1 | 0.6 | 3.5 | 6000 | 21000 | 3.5 |
| The invention c | 5500 | 55000 | 10 | 2.1 | 0.6 | 3.5 | 6000 | 21000 | 3.5 |
| Comparative Example a | 5500 | 55000 | 10 | 2.1 | 0.6 | 3.5 | 6000 | 21000 | 3.5 |
| Comparative Example b | 5500 | 55000 | 10 | 2.1 | 0.6 | 3.5 | 6000 | 21000 | 3.5 |
| The invention d | 5500 | 55000 | 10 | 2.1 | 0.6 | 3.5 | 6000 | 21000 | 3.5 |
| The invention e | 5500 | 55000 | 10 | 2.1 | 0.6 | 3.5 | 6000 | 21000 | 3.5 |
| The invention f | 5500 | 55000 | 10 | 2.1 | 0.6 | 3.5 | 6000 | 21000 | 3.5 |
| The invention g | 5500 | 55000 | 10 | 2.1 | 0.6 | 3.5 | 6000 | 21000 | 3.5 |
| Comparative Example c | 5500 | 55000 | 10 | 2.1 | 0.6 | 3.5 | 6000 | 21000 | 3.5 |
| The invention h | 5500 | 55000 | 10 | 2.1 | 0.6 | 3.5 | 6000 | 21000 | 3.5 |
| The invention i | 5500 | 55000 | 10 | 2.1 | 0.6 | 3.5 | 6000 | 21000 | 3.5 |
| The invention j | 5500 | 55000 | 10 | 2.1 | 0.6 | 3.5 | 6000 | 21000 | 3.5 |

TABLE 3-continued

| | | | | | | | | | |
|---|---|---|---|---|---|---|---|---|---|
| The invention k | 5500 | 55000 | 10 | 2.1 | 0.6 | 3.5 | 6000 | 21000 | 3.5 |
| The invention l | 2000 | 98000 | 49 | 5.8 | 0.5 | 11 | 1000 | 29000 | 29 |
| The invention l' | 2200 | 99000 | 45 | 5.3 | 0.5 | 10 | 1100 | 27500 | 25 |
| The invention l" | 2800 | 98000 | 35 | 4.5 | 0.6 | 8 | 1700 | 25500 | 15 |
| The invention m | 4500 | 6750 | 1.5 | 2.3 | 1.2 | 2.0 | 4500 | 8100 | 1.8 |
| The invention n | 7000 | 6300 | 0.9 | 2.3 | 1.9 | 1.2 | 4500 | 4050 | 0.9 |
| The invention o | 6000 | 72000 | 12 | 1.2 | 0.2 | 8 | 8000 | 29600 | 3.7 |
| The invention p | 5000 | 50000 | 10 | 1.4 | 0.2 | 6 | 7000 | 24500 | 3.5 |
| The invention q | 3000 | 15000 | 5 | 2.8 | 0.7 | 4 | 4500 | 9900 | 2.2 |
| The invention r | 3000 | 24000 | 8 | 1.3 | 0.2 | 7 | 5500 | 17050 | 3.1 |
| The invention s | 11000 | 66000 | 6 | 2.1 | 0.6 | 3.5 | 9500 | 23750 | 2.5 |
| The invention t | 8500 | 76500 | 9 | 1.9 | 0.4 | 4.5 | 8500 | 23800 | 2.8 |
| The invention u | 6500 | 78000 | 12 | 1.5 | 0.3 | 6 | 7500 | 26250 | 3.5 |
| The invention v | 5500 | 93500 | 17 | 1.0 | 0.1 | 8 | 4500 | 24750 | 5.5 |
| The invention w | 7500 | 67500 | 9 | 1.2 | 0.2 | 5 | 8800 | 26400 | 3 |
| The invention x | 6500 | 52000 | 8 | 1.2 | 0.3 | 4 | 5000 | 19500 | 3.9 |
| The invention y | 4500 | 27000 | 6 | 1.0 | 0.2 | 6 | 3000 | 15000 | 5 |
| The invention z | 8500 | 85000 | 10 | 1.8 | 0.5 | 3.5 | 17000 | 27200 | 1.6 |

The film obtained in this manner was processed in the same manner as the 'Example and Comparative Example (I)', and evaluated to describe the number of V-shaped streaks, cracks in the process and Tg thereof in Table 3. The films according to the invention all had good results. Without using the "low molecular compound", when a propionyl substituent (particularly, high-substituent) was used, the number of V-shaped streaks was small as compared with a butyryl substituent, and the number of V-shaped streaks was smaller when a low polymer was used (Examples s to z).

In case of cellulose acetate propionate, a melting temperature is preferably less than 235° C., and the V-shaped streak generation frequency is also small (the invention l', l").

(4) Stretching

The cellulose acylate film obtained in this manner was stretched at a draw ratio described in Table 4, 300%/min, and a temperature of (Tg measure above +10° C.). After that, the film was trimmed by 5% of the overall width at both ends thereof. The number of V-shaped streaks, Re and Rth of the cellulose acylate film were described in Table 4 in the same manner as 'Example and Comparative Example (I)'. The films according to the invention all had good results.

TABLE 4

| | Physical Properties of Formed Film (Unstretched Film) | | | | | | Stretching Conditions | | Properties of Stretched Film | | | Streak in LCD |
|---|---|---|---|---|---|---|---|---|---|---|---|---|
| | V-streak | | Remaining | Crack in | | | Draw Ratio | | V-streak | | | LCD |
| | (Number/ 100 m) | Tg (° C.) | Solvent (% by mass) | Process (Number) | Re (nm) | Rth (nm) | MD (%) | TD (%) | (Number/ 100 m) | Re (nm) | Rth (nm) | (Number/ 100 m) |
| The invention a | 1 | 135 | 0 | 0 | 0 | 5 | 5 | 50 | 1 | 70 | 220 | 1 |
| The invention b | 4 | 135 | 0 | 0 | 0 | 10 | 5 | 50 | 3 | 65 | 225 | 3 |
| The invention c | 3 | 135 | 0 | 0 | 0 | 10 | 5 | 50 | 2 | 75 | 230 | 2 |
| Comparative Example a | 28 | 135 | 0 | 0 | 0 | 10 | 5 | 50 | 26 | 70 | 210 | 25 |
| Comparative Example b | 18 | 135 | 0 | 0 | 0 | 10 | 5 | 50 | 16 | 80 | 240 | 16 |
| The invention d | 2 | 135 | 0 | 0 | 0 | 20 | 80 | 5 | 2 | 90 | 295 | 2 |
| The invention e | 2 | 135 | 0 | 0 | 0 | 20 | 80 | 5 | 2 | 95 | 300 | 2 |
| The invention f | 8 | 135 | 0 | 0 | 0 | 20 | 80 | 5 | 6 | 100 | 310 | 5 |
| The invention g | 6 | 135 | 0 | 0 | 0 | 20 | 80 | 5 | 5 | 95 | 330 | 3 |
| Comparative Example c | 59 | 135 | 0 | 0 | 0 | 20 | 80 | 5 | 55 | 90 | 290 | 55 |
| The invention h | 1 | 130 | 0 | 0 | 0 | 15 | 30 | 100 | 1 | 115 | 350 | 1 |
| The invention i | 1 | 126 | 0 | 0 | 0 | 20 | 30 | 100 | 1 | 120 | 360 | 1 |
| The invention j | 1 | 120 | 0 | 0 | 0 | 25 | 30 | 100 | 1 | 125 | 380 | 1 |
| The invention k | 1 | 114 | 0 | 0 | 5 | 25 | 30 | 100 | 1 | 125 | 390 | 1 |
| The invention l | 9 | 135 | 0 | 0 | 0 | 9 | 280 | 0 | 7 | 170 | 480 | 9 |
| The invention l' | 7 | 135 | 0 | 0 | 0 | 7 | 280 | 0 | 7 | 180 | 480 | 6 |
| The invention l" | 4 | 135 | 0 | 0 | 0 | 3 | 280 | 0 | 3 | 185 | 470 | 3 |
| The invention m | 3 | 135 | 0 | 0 | 0 | 5 | 280 | 0 | 2 | 190 | 450 | 2 |
| The invention n | 8 | 135 | 0 | 0 | 0 | 5 | 280 | 0 | 7 | 170 | 430 | 6 |
| The invention o | 3 | 135 | 0 | 0 | 0 | 25 | 80 | 80 | 3 | 10 | 390 | 3 |
| The invention p | 1 | 133 | 0 | 0 | 0 | 25 | 80 | 80 | 1 | 15 | 410 | 1 |
| The invention q | 1 | 115 | 0 | 0 | 15 | 55 | 80 | 80 | 0 | 20 | 400 | 0 |
| The invention r | 0 | 128 | 0 | 0 | 3 | 30 | 80 | 80 | 0 | 10 | 380 | 0 |
| The invention s | 8 | 138 | 0 | 0 | 5 | 15 | 10 | 65 | 8 | 90 | 300 | 8 |
| The invention t | 3 | 130 | 0 | 0 | 0 | 10 | 10 | 65 | 4 | 80 | 280 | 4 |
| The invention u | 0 | 121 | 0 | 0 | 0 | 10 | 10 | 65 | 0 | 70 | 250 | 1 |
| The invention v | 0 | 110 | 0 | 0 | 0 | 10 | 10 | 65 | 0 | 30 | 180 | 1 |
| The invention w | 3 | 121 | 0 | 0 | 0 | 10 | 10 | 65 | 2 | 70 | 250 | 3 |
| The invention x | 6 | 130 | 0 | 0 | 0 | 15 | 10 | 65 | 5 | 85 | 200 | 6 |

TABLE 4-continued

| | Physical Properties of Formed Film (Unstretched Film) | | | | | | Stretching Conditions | | Properties of Stretched Film | | | Streak in |
|---|---|---|---|---|---|---|---|---|---|---|---|---|
| | V-streak | | Remaining | Crack in | | | Draw Ratio | | V-streak | | | LCD |
| | (Number/ 100 m) | Tg (° C.) | Solvent (% by mass) | Process (Number) | Re (nm) | Rth (nm) | MD (%) | TD (%) | (Number/ 100 m) | Re (nm) | Rth (nm) | (Number/ 100 m) |
| The invention y | 5 | 125 | 0 | 0 | 0 | 15 | 10 | 65 | 5 | 70 | 180 | 5 |
| The invention z | 7 | 115 | 0 | 0 | 0 | 15 | 10 | 65 | 7 | 65 | 160 | 7 |

(5) Production of Polarizing Plate and Production of Optical Compensatory film for Liquid Crystal Display Device Polarizing plates and an optical compensatory film-liquid crystal display device were produced in the same manner as the 'Example and Comparative Example (I)'. The polarizing plates according to the invention had good results without the generation of V-shaped streaks. In Table 4, measurement values for a polarizing plate A are shown, but the same results can be obtained in case of the polarizing plate B.

Polarizing Plate A: Unstretched Cellulose Acylate Film/ Polarizing Film/Fujitac TD80U Polarizing Plate B: Unstretched Cellulose Acylate Film/ Polarizing Film/Unstretched Cellulose Acylate Film The cellulose acylate film according to the invention can obtain an excellent result when mounted on the VA-type liquid crystal display device in which alignment is divided as described in JP-A-10-123576.

A cellulose acylate film produced in the same manner as the 'Example and Comparative Example (I)' was covered with a liquid crystal layer of Example 1 in JP-A-11-316378, thus an excellent optical compensatory film can be produced.

Instead of a cellulose acetate film covered with a liquid crystal layer of Example 1 in JP-A-7-333433, the cellulose acylate film according to the invention was used to produce an optical compensation filter film, thus an excellent optical compensatory film can be produced.

The polarizing plate and the retardation polarizing plate according to the invention were produced using the cellulose acylate film according to the invention, in the same manner as the 'Example and Comparative Example (I)', thus a liquid crystal display device having an excellent visuality and no display unevenness associated with a heat and humidity can be obtained.

A low-reflection film was prepared using the cellulose acylate film according to the invention, in the same manner as the 'Example and Comparative Example (I)', thus an excellent optical property can be obtained. The low-reflection film obtained in the manner was bonded to the front layers of VA, OCB, and IPS-type liquid crystal display devices in the same manner as the 'Example and Comparative Example (I)' to perform an evaluation, thus an excellent liquid crystal display devices can be obtained.

Industrial Applicability

When the cellulose acylate film according to the invention is mounted on a liquid crystal display device, display failure of the liquid crystal display device can be greatly prevented. In addition, the cellulose acylate film according to the invention is excellent in a processible property after conservation. Such cellulose acylate film can be efficiently manufactured in accordance with the invention. Accordingly, the cellulose acylate film and a manufacturing method thereof according to the invention have a high industrial applicability.

Brief Description of the Drawing

FIG. 1 Across-sectional diagram of a melt extruder having a screw. In the drawing, the reference number 22 is the melt extruder, 40 is a supply hole from a hopper, and 38 is the screw, and the reference sign A is a feed zone, B is a compression zone, and C is a metering zone.

The invention claimed is:

1. A method for producing a cellulose acylate film, comprising:

melt-casting a cellulose acylate satisfying Formulae (1) to (3) to form a film with use of a melt extruder having a screw in which a portion corresponding to 5 to 34% of the entire length of the screw from the most upstream end of the screw is cooled to a temperature of Tg or less of the cellulose acylate and the ratio of the length of a feeding zone to the length of a compression zone is in the range of 1.2:1 to 10:1, and wherein a temperature of an outlet side of a barrel including the screw of the melt extruder is higher than a temperature of an inlet side of the barrel including the screw of the melt extruder, by 5 to 80° C.:

$$2.6 \leqq X+Y \leqq 3.0; \quad \text{Formula (1)}$$

$$0 \leqq X \leqq 2.8; \text{ and} \quad \text{Formula (2)}$$

$$0.3 \leqq Y \leqq 3 \quad \text{Formula (3)}$$

wherein X represents a substitution degree for an acetyl group and Y represents the sum of the substitution degrees for a propionyl group, a butyryl group, a pentanoyl group and a hexanoyl group, and wherein the number of V-shaped thickness-uneven portions having a thickness variation in the thickness direction of 0.1 to 10% of a film thickness and a width in the in-plane direction of 1 to 20 mm is in the range of 0 to 5 per 100 m in the length direction of the film.

2. The method for producing the cellulose acylate film according to claim 1, wherein the film is formed under the condition that the ratio of the maximum value and the minimum value in storage rigidity (G') of the molten cellulose acylate in the melt extruder is in the range of 3:1 to 100:1 and the minimum value thereof is in the range of 1,000 Pa to 80,000 Pa.

3. The method for producing the cellulose acylate film according to claim 1, wherein the film is formed under the condition that the ratio of the maximum value and the minimum value in loss rigidity (G") of the molten cellulose acylate in the melt extruder is in the range of 1.1:1 to 50:1 and the maximum value thereof is in the range of 1,000 Pa to 100,000 Pa.

4. The method for producing the cellulose acylate film according to claim 1, wherein the film is formed under the condition that the ratio of the maximum value and the minimum value in tan δ(G"/G') of the molten cellulose acylate in the melt extruder is in the range of 1.5:1 to 12:1 and the maximum value thereof is in the range of 0.1 to 6.

5. The method for producing the cellulose acylate film according to claim 1, wherein the film is formed under the condition that the ratio of the maximum value and the minimum value in viscosity (η) of the molten cellulose acylate in the melt extruder is in the range of 1.2:1 to 30:1 and the maximum value thereof is in the range of 1,000 Pa·s to 23,000 Pa·s.

6. The method for producing the cellulose acylate film according to claim 1, which further comprises stretching the film in at least one direction by 1% to 300% after forming the film.

7. The method for producing the cellulose acylate film according to claim 1, wherein at least ½ of Y is a propionyl group and the cellulose acylate satisfies Formulae (4) to (6):

$$2.6 \leqq X+Y \leqq 2.95; \quad \text{Formula (4)}$$

$$0.1 \leqq X \leqq 1.45; \text{ and} \quad \text{Formula (5)}$$

$$1.5 \leqq Y \leqq 2.95. \quad \text{Formula (6)}$$

8. The method for producing the cellulose acylate film according to claim 1, wherein less than ½ of Y is a propionyl group and the cellulose acylate satisfies Formulae (10) to (12):

$$2.6 \leqq X+Y \leqq 2.95, \quad \text{Formula (10)}$$

$$0.5 \leqq X \leqq 1.8, \quad \text{Formula (11)}$$

$$1.3 \leqq Y \leqq 2.7. \quad \text{Formula (12)}$$

9. A method for producing a cellulose acylate film, comprising:

melt-casting a cellulose acylate satisfying Formulae (7) to (9) to form a film with use of a melt extruder having a screw in which a portion corresponding to 5 to 34% of the entire length of the screw from the most upstream end of the screw is cooled to a temperature of Tg or less of the cellulose acylate and the ratio of the length of a feeding zone to the length of a compression zone is in the range of 1.2:1 to 10:1, and wherein a temperature of an outlet side of a barrel including the screw of the melt extruder is higher than a temperature of an inlet side of the barrel including the screw of the melt extruder, by 5 to 80° C.:

$$2.6 \leqq X+Y \leqq 2.95; \quad \text{Formula (7)}$$

$$2 \leqq X \leqq 2.8; \text{ and} \quad \text{Formula (8)}$$

$$0.1 \leqq Y \leqq 1.1; \quad \text{Formula (9)}$$

wherein X represents a substitution degree for an acetyl group and Y represents the sum of the substitution degrees for a propionyl group, a butyryl group, a pentanoyl group and a hexanoyl group, wherein at least ½ of Y is a propionyl group, and wherein the number of V-shaped thickness-uneven portions having a thickness variation in the thickness direction of 0.1 to 10% of a film thickness and a width in the in-plane direction of 1 to 20 mm is in the range of 0 to 5 per 100 m in the length direction of the film.

* * * * *